United States Patent
Harris et al.

(10) Patent No.: US 10,395,256 B2
(45) Date of Patent: Aug. 27, 2019

(54) REPUTATION MANAGEMENT IN A TRANSACTION PROCESSING SYSTEM

(75) Inventors: Theodore Harris, San Francisco, CA (US); Patrick Faith, Pleasanton, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 934 days.

(21) Appl. No.: 13/485,637

(22) Filed: May 31, 2012

(65) Prior Publication Data

US 2012/0310831 A1 Dec. 6, 2012

Related U.S. Application Data

(60) Provisional application No. 61/492,765, filed on Jun. 2, 2011.

(51) Int. Cl.
*G06Q 40/00* (2012.01)
*G06Q 30/02* (2012.01)

(52) U.S. Cl.
CPC .................................. *G06Q 30/02* (2013.01)

(58) Field of Classification Search
CPC ....................................................... G06Q 30/02
USPC ...................................................... 705/10, 35
See application file for complete search history.

(56) References Cited

U.S. PATENT DOCUMENTS

| | | | |
|---|---|---|---|
| 5,564,546 A | 10/1996 | Molbak et al. | |
| 5,641,050 A | 6/1997 | Smith et al. | |
| 5,855,007 A | 12/1998 | Jovicic et al. | |
| 5,903,874 A | 5/1999 | Leonard et al. | |
| 6,024,288 A | 2/2000 | Gottlich et al. | |
| 6,076,069 A | 6/2000 | Laor | |
| 6,856,963 B1 * | 2/2005 | Hurwitz | G06Q 30/0201 705/7.29 |
| 7,016,860 B2 | 3/2006 | Modani et al. | |
| 7,184,972 B2 | 2/2007 | Flaherty | |
| 7,716,080 B2 | 5/2010 | Postrel | |

(Continued)

FOREIGN PATENT DOCUMENTS

| | | |
|---|---|---|
| JP | 2003006543 | 1/2003 |
| JP | 2010237897 | 10/2010 |

(Continued)

OTHER PUBLICATIONS

Dinstein, Its'Hak, "Cluster Analysis and Its Application to Imagery Data"; University of Kansas, ProQuest Dissertations Publishing, 1974.*

(Continued)

*Primary Examiner* — Edward Chang
(74) *Attorney, Agent, or Firm* — The Webb Law Firm

(57) ABSTRACT

A method includes: receiving information regarding a plurality of completed transactions from a plurality of users; receiving a query from a first user regarding a proposed transaction; determining at least one affinity between the first user and the plurality of users based on the information; determining a ranking or expectation of success for each of a plurality of potential entities for the proposed transaction based on the at least one affinity; selecting a plurality of selected entities based on the ranking or expectation of success for each of the potential entities; and sending, in response to the query, the plurality of selected entities to the first user.

10 Claims, 12 Drawing Sheets

(56) References Cited

U.S. PATENT DOCUMENTS

| | | |
|---|---|---|
| 7,720,720 B1 | 5/2010 | Sharma et al. |
| 7,849,020 B2 | 12/2010 | Johnson |
| 8,296,242 B1 | 10/2012 | Bar-Yam |
| 8,402,555 B2 | 3/2013 | Grecia |
| 8,533,860 B1 | 9/2013 | Grecia |
| 8,630,954 B2 | 1/2014 | Thaw |
| 8,887,308 B2 | 11/2014 | Grecia |
| 2001/0021927 A1 | 9/2001 | Laurent et al. |
| 2001/0042010 A1 | 11/2001 | Hassell |
| 2002/0010627 A1 | 1/2002 | Lerat |
| 2002/0091567 A1 | 7/2002 | Royston |
| 2003/0009368 A1 | 1/2003 | Kitts |
| 2003/0009393 A1 | 1/2003 | Norris |
| 2003/0014306 A1 | 1/2003 | Marko |
| 2003/0055726 A1 | 3/2003 | Sohya |
| 2004/0029569 A1 | 2/2004 | Khan et al. |
| 2004/0039633 A1 | 2/2004 | Nicholson |
| 2004/0128241 A1 | 7/2004 | Akama |
| 2004/0177003 A1 | 9/2004 | Liao |
| 2006/0265281 A1 | 11/2006 | Sprovieri |
| 2008/0010114 A1 | 1/2008 | Head |
| 2008/0052169 A1 | 2/2008 | O'Shea et al. |
| 2008/0097857 A1 | 4/2008 | Walker et al. |
| 2008/0294501 A1 | 11/2008 | Rennich |
| 2008/0319846 A1 | 12/2008 | Leming |
| 2009/0060199 A1 | 3/2009 | von Mueller et al. |
| 2009/0132428 A1 | 5/2009 | Wolf et al. |
| 2009/0288012 A1 | 11/2009 | Hertel et al. |
| 2009/0319333 A1* | 12/2009 | Dangaltchev ...... G06Q 30/0249 705/7.29 |
| 2010/0114663 A1 | 5/2010 | Casas et al. |
| 2010/0153205 A1 | 6/2010 | Retter et al. |
| 2010/0262602 A1 | 10/2010 | Dumon et al. |
| 2011/0054981 A1 | 3/2011 | Faith et al. |
| 2011/0208658 A1 | 8/2011 | Makhotin |
| 2011/0320344 A1 | 12/2011 | Faith et al. |
| 2012/0173431 A1 | 7/2012 | Ritchie et al. |
| 2012/0271770 A1 | 10/2012 | Harris et al. |
| 2012/0290376 A1 | 11/2012 | Dryer et al. |
| 2012/0310838 A1 | 12/2012 | Harris et al. |

FOREIGN PATENT DOCUMENTS

| | | |
|---|---|---|
| KR | 20040077077 | 9/2004 |
| KR | 1020040105269 | 12/2004 |
| KR | 1020050099707 | 10/2005 |
| WO | 2002069561 | 9/2002 |

OTHER PUBLICATIONS

International Patent Application PCT/US2012/034283, International Search Report and Written Opinion, dated Nov. 1, 2012.

International Patent Application PCT/US2012/040507, International Search Report and Written Opinion, dated Jan. 11, 2013.

International Patent Application PCT/US2012/040506, International Search Report and Written Opinion, dated Jan. 29, 2013.

Local Usage of Electronic Tokens in a Transaction Processing System, U.S. Appl. No. 13/485,645, filed May 31, 2012, Theodore Harris, et al.

Managing Electronic Tokens in a Transaction Precesing System, U.S. Appl. No. 13/450,828, filed Apr. 19, 2012, Theodore Harris, et al.

* cited by examiner

REPUTATION MANAGEMENT IN A TRANSACTION PROCESSING SYSTEM

RELATED APPLICATIONS

The present application claims priority to U.S. Provisional Patent Application Ser. No. 61/492,765, filed Jun. 2, 2011, entitled "Reputation Management in a Transaction Processing System," by Harris et al., the disclosure of which is incorporated herein by reference in its entirety.

FIELD OF THE TECHNOLOGY

At least some embodiments of the present disclosure relate to the processing of transactions, such as payments made via payment cards such as credit cards, debit cards, prepaid cards, etc., and the managing of reputations for various entities involved in these transactions or selected for potential involvement in proposed transactions.

BACKGROUND

Millions of transactions occur daily through the use of payment cards, such as credit cards, debit cards, prepaid cards, etc. Corresponding records of the transactions are recorded in databases for settlement and financial record keeping (e.g., to meet the requirements of government regulations). Such data can be analyzed for trends, statistics, and other analyses. Sometimes, such data are mined for specific advertising goals, such as to provide targeted offers to account holders, as described in PCT Pub. No. WO 2008/067543 A2, published on Jun. 5, 2008 and entitled "Techniques for Targeted Offers," which is hereby incorporated herein by reference.

In some cases, coupons (e.g., physical coupons distributed in published magazines with accompanying advertisements) may be used in some of these transactions. These coupons are typically targeted to individual consumers and offer a one-time discount for a single purchase of a good or service. However, consumers often view such coupons as being mundane or dull, and generating significant consumer interest in the coupons is frequently challenging to product marketers.

In other cases, prior to entering a new transaction with another party, whether known from prior activities together or unknown due to lack of any prior activity with that party, a person typically desires to perform some due diligence to learn about the background of the other party. This background may include, for example, comments about the reputation of the other party as learned from friends or research on the Internet. However, identifying and investigating the reputation of potential transactional parties is often time-consuming and may only provide information having poor accuracy.

BRIEF DESCRIPTION OF THE DRAWINGS

The embodiments are illustrated by way of example and not limitation in the figures of the accompanying drawings in which like references indicate similar elements.

DETAILED DESCRIPTION

Introduction

Figure 1:
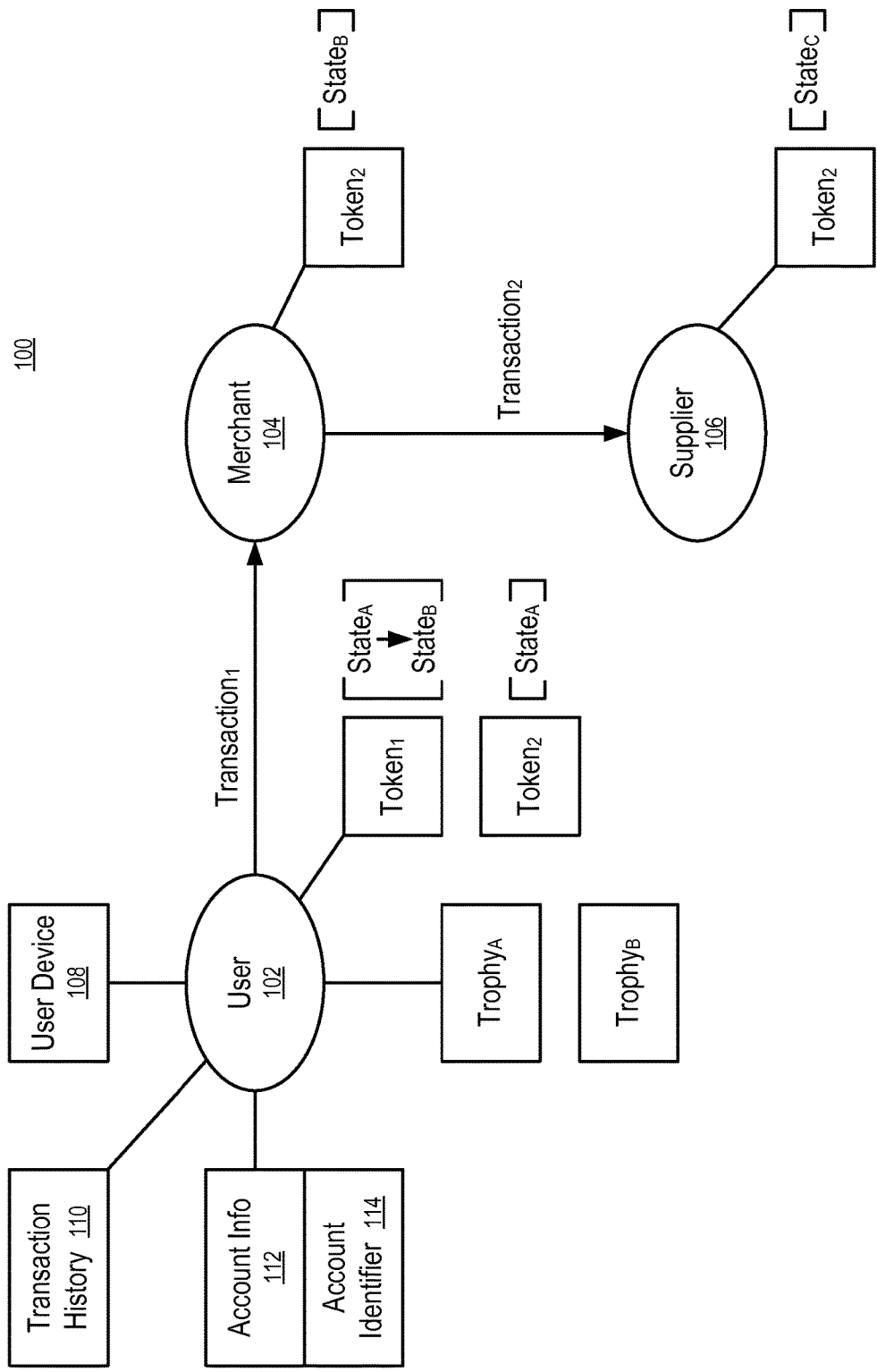
FIG. 1 illustrates a transactional flow involving multiple transactions and entities according to one embodiment.

At least some embodiments of the present disclosure relate to the processing of transactions, such as payments made via payment cards such as credit cards, debit cards, prepaid cards, etc., and the managing of electronic tokens associated with various entities (e.g., users of a transactional token processing system) involved in these transactions (e.g., using transaction data obtained during this processing, such as by a transaction handler). In one example, each of the tokens provides a benefit (e.g., a discount of 30%) to a consumer when making a purchase using a credit card or other payment card.

Other embodiments relate to providing a reputation score, an indication of the degree of matching, or an indication of the probability of success when two persons or entities are considering or planning to enter into a proposed transaction for goods or services (e.g., for personal services such as hiring a babysitter or for purchase of goods such as consumer products like appliances or cameras). The proposed transactions may use a currency or may be a barter transaction. In one embodiment, transactional tokens may be applied to some or all of the proposed transactions using the token processing system as described below.

In another embodiment, a single person or entity desires to enter into a proposed transaction, but the other party to the proposed transaction has not yet been identified (e.g., a person may be looking for potential service providers to provide a personal service such as babysitting or hair styling). A list of proposed parties with which the person/entity may transact (by barter or otherwise) is sent to and displayed on a user device of the single person/entity. The proposed parties are ranked by a likelihood or probability of success or extent or degree of matching based. The user may be provided a relative indication of the ranking (e.g., a 1-9 ranking, or some other indication according to a simplified classification).

In one embodiment, data collected from prior transactions (e.g., such as data received by the token processing system infrastructure described below) is used as a basis for data analysis in order to provide the reputation score or the indication of matching/expected success mentioned above. This data may be collected automatically without requiring any action or manual input by a person. In another embodiment, this data may include feedback from users of a reputation system (discussed further below), in which users provide textual, numerical, and/or other feedback to the reputation system subsequent to completion or settlement of a transaction (i.e., a transaction that began as a proposed transaction in the reputation system). Thus, this feedback enables the reputation system to dynamically update the reputation scores or indications of matching or expected success being provided as transactions are completed and feedback received. In one embodiment, an electronic transactional token as described below may be used as a basis for identifying correlations or affinities between persons or entities in different data clusters to provide further data for use in providing a reputation score or indication of matching or expected success.

In one embodiment, a method includes: receiving information regarding a plurality of completed transactions from a plurality of users; receiving a query from a first user (e.g., from a user device such as a mobile phone or tablet computer such as an iPad computer) regarding a proposed transaction; determining at least one affinity (e.g., a social and/or other graph) between the first user and the plurality of users based on the information; determining a ranking or expectation of success for each of a plurality of potential entities (e.g., a potential babysitter or merchant that sells appliances) for the proposed transaction based on the at least one affinity; selecting a plurality of selected entities based on the ranking or expectation of success for each of the potential entities; and sending, in response to the query, the plurality of selected entities to the first user (e.g., for display as a listing with expected success scores or probabilities on the mobile user device).

As used herein, "transactional token" refers generally to an electronic token that provides a benefit to an entity (e.g., when the token is applied to a transaction involving the entity, or when the token is accumulated with other tokens by a single user or entity). These transactional tokens may be generated and issued to various entities (e.g., consumers and merchants) by a token processing system (discussed in more detail below). In some embodiments, the transactional token may provide a benefit that is the same or similar to that of a coupon (e.g., a 10% off coupon), but transactional tokens are not limited to use solely as a coupon (e.g., transactional tokens may have other attributes and characteristics as described below). Entities to which tokens are issued may be users of the token processing system (e.g., a user that accesses the system via a user device or user terminal). These users may access information about their tokens, for example, by logging onto this system. When the user is merchant, the user may specify the particular goods or services and conditions under which a token may be used in a transaction involving the merchant's goods or services.

In one embodiment, the token processing system maintains data for the tokens of each user (e.g., a unique identifier for each token that is associated with that user). The token processing system may, for example, maintain data regarding various attributes for each token and also transaction histories associated with each token. For example, a first attribute for a token may be a discount to be applied to a purchase. Another attribute may be a loyalty reward point allocation that is associated with use of the token in a transaction. As a token is used, transaction data associated with its use may be stored as a token transaction history that remains permanently associated with the token.

In one embodiment, a method for the use of transactional tokens comprises the following steps: (i) generating transactional tokens (e.g., including a first token to offer a discount for making a purchase from a merchant); (ii) associating each of the transactional tokens with one of a group of users (e.g., the first token is associated with a first user); (iii) monitoring usage of the transactional tokens in a multitude of transactions by the users; and (iv) responsive to the monitoring, updating the first token from a first state (e.g., a discount of 30%) to a second state (e.g., the discount has been applied, but the purchaser now holds a trophy due to making the purchase). The tokens may be generated and monitored using a token processing system, which may interact with and use transaction data received by a transaction handler that is processing each of the transactions.

In one embodiment, the token processing system permits users to transfer tokens from one user or entity to another. These entities may be users of the token processing system, but in other embodiments, an entity that is not a user may receive the token.

In another embodiment, a transactional token may be used or applied to more than one transaction. The token may change state as each of these transaction occurs (i.e., as the token is applied to each of the transactions by the user that is currently holding the token). The token may further change state based on other data collected and/or analyzed by the token processing system (e.g., a change in merchant inventory, or purchases by other consumers of a particular product for which a discount has been offered). A token that changes state in this manner is sometimes described herein as an evolvable token. For example, the token may evolve based on consumer or merchant user interactions (e.g., a merchant request) with the token processing system.

There is a large variety of ways in which such a token may evolve. For example, the token may be a coupon with a discount for a product that changes based on current economic conditions or the remaining inventory of a merchant that is selling the product referenced in the coupon. Other examples of evolvable tokens (some for which the transactional token has an attribute of a coupon) include the following: depreciating or appreciating coupons; user ability to combine its various user coupons to generate new coupons; user ability to combine coupons of other users to create new coupons (e.g., by transfer of tokens from several users to a single recipient user); transactional tokens that grow in a game-like fashion to have new attributes and value; allowing users to share and transfer tokens amongst themselves; providing detailed reports to users or others on usage of tokens; and providing special loyalty rewards to frequent coupon users.

In another example, a user's token usage is tracked so that the user may accumulate a digital trophy collection (e.g., a set of electronic transactional tokens each having an attribute of a trophy). Also, tracking of this token usage enables coupons that change state based on the user's holding or acquiring other coupons, or based on the user's prior coupon usage.

FIG. 1 illustrates a transactional flow 100 involving multiple transactions (Transaction$_1$ and Transaction$_2$) and entities (user 102, merchant 104, and supplier 106) according to one embodiment. Here, user 102 may possess one or more transactional tokens (e.g., that were previously generated and that are managed by a token processing system as discussed below). Examples of such tokens may include Token$_1$ and Token$_2$ (e.g., each token may provide a percentage discount on a purchase). $Token_1$ has a first state ($State_A$) prior to being applied or used in $Transaction_1$. After being applied to $Transaction_1$, $Token_1$ changes to a second state ($State_B$), for example as updated in a memory of the token processing system.

User 102 may own or otherwise be associated with a user device 108 (e.g., a mobile device). User device 108 may store information (e.g., a unique identifier that identifies the tokens that the user 102 possesses). A transaction history 110 is associated with user 102 and its prior purchase history. Transaction history 110 may be stored in a memory of user device 108 and/or in a memory of the token processing system (or alternatively stored on yet another computing device or server).

Account information 112 is associated with user 102. Account information 112 may be, for example, information regarding a credit card or debit card account of the user, and account information 112 may be originally generated by an issuer. This credit or debit card may be used to make purchases in $Transaction_1$ and/or $Transaction_2$. Processing of a transaction using this credit or debit card may be handled by a transaction handler.

Account information 112 may be uniquely associated with user 102 by an account identifier 114 that is part of account information 112. Account information 112 may be stored on one or more of the following: user device 108, a computing device of the issuer, a computing device of a transaction handler, and the token processing system discussed herein.

In one embodiment, merchant 104 originally requests the generation of $Token_1$ as a user of the token processing system (e.g., via logging on electronically by a user terminal or device). User 102 may have acquired $Token_1$ as part of a marketing promotion (electronic or non-electronic) by merchant 104, in which a discount on purchase of a good was advertised. $Transaction_1$ may be, for example, for the purchase of a good from merchant 104. User 102 may apply $Token_1$ to obtain a discount on this purchase, and may make the purchase using a credit card or other payment card. The purchase may be processed by a transaction handler that passes the associated transaction data to the token processing system. The application of the $Token_1$ to the transaction may be implemented by providing the unique identifier of $Token_1$ to the transaction handler, which may communicate with the token processing system. The transaction handler applies a discount to the purchase so that the user gets the benefit of the application of $Token_1$.

After $Transaction_1$ is completed, user 102 retains possession of $Token_1$, but $Token_1$ no longer has the attribute of providing a discount for any further purchase. This is reflected and implemented by changing the state of $Token_1$ to a new state, $State_B$, which is a post-purchasing state for which no discount is provided to the user. User device 108 and the token processing system may be updated to reflect this new state of $Token_1$. Also, the transaction data from $Transaction_1$ may be sent to the token processing system to update a transaction history that is maintained for $Token_1$ (along with other tokens of user 102), as discussed further below.

In one embodiment, from the perspective of user 102, $Token_1$ will be the same token after $Transaction_1$, as discussed above, and have the same unique identifier following the transaction. However, from the perspective of the token processing system, there will be two unique identifiers. The first unique identifier is the parent identifier (ID), which does not change. This may be, for example, the parent ID assigned to the initial $Token_1$ (e.g., assigned at generation of the token).

The second unique identifier links to the first unique ID and represents the current state of $Token_1$ (e.g., $State_A$ or $State_B$). As $Token_1$ changes state, a new transactional token (having the second unique ID) is generated and is linked back to the first unique ID (i.e., the parent ID). In this manner, a full history of the token's evolution (e.g., through multiple transactions or other network events) can be stored in a memory of the token processing system.

Although $State_B$ of $Token_1$ provides no further discount, in some embodiments, the user is provided a trophy that reflects the completion of the purchase by user 102 in $Transaction_1$. The collection of various trophies by user 102 may be desirable for user 102 for entertainment or other personal reasons, and further may be used to reflect or record progress towards completion or vesting of a new benefit for user 102 that may be applied to future transactions. This benefit may be a financial or other commercial benefit (e.g., a user may collect 10 trophies and then exchange these trophies for a new transactional token, according to rules handled by the token processing system).

In one embodiment, user 102 may collect trophies in various ways, all as managed by the token processing system. For example, the trophies may be implemented as transactional tokens having the attribute or state of being a trophy, but without having any attribute that provides a discount or other benefit in a future transaction. However, a trophy may have an attribute such that the collection of two or more trophies does provide a transactional benefit as managed by the token processing system, or that the trophies may be exchanged for a transactional token that has the attribute of a coupon for a future purchase.

Examples of trophies held by user 102 are $Trophy_A$ and $Trophy_B$. $Token_1$ in $State_B$ above was described as being in the state of a trophy. In an alternative embodiment, after completion of $Transaction_1$, user 102 may be provided with $Trophy_A$ rather than retain $Token_1$ (in this case $Token_1$ may simply expire). Alternatively, user 102 may acquire $Trophy_A$ in addition to retaining $Token_1$ in $State_B$. $Trophy_B$ may, for example, have been provided to user 102 via a transfer from another user (e.g., a friend or a person in a social network of user 102, as defined on a social network website or server) of the token processing system.

In an alternative embodiment (using a cascading approach), rather than staying with user 102 after a transaction is completed, a transactional token may transfer (e.g., automatically via action of the token processing system upon receiving transaction data) from user 102 to merchant 104. In such a cascading system, a $Token_2$ is transferred to merchant 104 after the $Transaction_1$, and merchant 104 is then holding $Token_2$. The possession of $Token_2$ by merchant 104 will be updated in a memory of the token processing system.

Prior to $Transaction_1$, $Token_2$ has a $State_A$ (e.g., similar to that as discussed above with respect to $Token_1$). After $Transaction_1$, the state of $Token_2$ is changed to that of providing a discount for a future transaction (e.g., $Transaction_2$) by merchant 104 (e.g., this state is a new state, $State_B$, as illustrated). In this cascading system, user 102 may also get a trophy (e.g., $Trophy_B$), but the trophy is a new transactional token (having the attribute of a trophy) generated by the token processing system (a new token must be generated since user 102 no longer holds the $Token_2$).

$Token_2$ in $State_B$ may, for example, provide merchant 104 with a discount for a purchase from supplier 106. After $Transaction_2$ is completed (e.g., with transaction processing and data handling similarly handled as discussed above for $Transaction_1$), $Token_2$ is transferred to supplier 106 and has a new state, $State_C$, that may provide a transactional benefit to supplier 106 for a future transaction. After each transaction, the token processing system updates a memory to reflect the entity that is currently possessing $Token_2$. The cascading process described above may be repeated for yet further transactions with other new entities and/or entities that were previously in the transactional flow 100.

Various Token System Embodiments

As was discussed above, a token processing system may generate transactional tokens and associate each token with one or more users. The system may monitor usage of the tokens in one or more transactions by the users (e.g., user 102 and merchant 104). In response to data received from this monitoring, the system may update a given token from a first state (e.g., $State_A$ of $Token_1$ or $Token_2$) to a second state (e.g., $State_B$ of $Token_1$ or $Token_2$).

Various embodiments of this token processing system are now here discussed. In a first embodiment, the monitoring includes receiving transaction data from a first transaction (e.g., $Transaction_1$) of a first user (e.g., user 102), the first token being applied to the first transaction. In another embodiment, this first transaction is between the first user and a second user (e.g., merchant 104), and the method further comprises responsive to applying the first token to the first transaction, transferring the first token to the second user. The second state corresponds to a transactional benefit for a future transaction of the second user.

In one embodiment, the transactions are for one or more purchases from a merchant by users other than the first user (e.g., users in a social network or other defined network or group including the first user), the first state corresponds to a discount for a future purchase of the first user, and the second state corresponds to a change in the discount for the future purchase, the change corresponding to the purchases by these other users (e.g., the change may be an increase in the discount based on a dollar amount of purchases being below a predetermined or targeted threshold). In another embodiment, the purchases may be by persons that are not users of the token processing system.

In one embodiment, the first state corresponds to a discount for a purchase from a first merchant (e.g., merchant 104), and the second state corresponds to a discount for a purchase from a second merchant (e.g., supplier 106).

In one embodiment, the first token comprises a plurality of attributes including a first attribute, and when the first token is in the second state, the first attribute provides a percentage reduction in price for a future transaction of the first user. Also, the method further comprises sending data regarding the second state to a mobile device (e.g., user device 108) of the first user.

In one embodiment, the first token comprises a plurality of attributes including a first attribute representing a trophy (e.g., an attribute of $Trophy_A$ or of $Token_1$ in $State_B$), and the method further comprises, responsive to the first user collecting a predetermined number of trophies including the trophy, awarding a transactional token to the first user (e.g., a new token is generated and associated with the first user).

In one embodiment, the method further comprises associating a respective transaction history with each of the transactional tokens (e.g., this history may be stored in a memory accessible by the token processing system), and updating the respective transaction history based on transactions to which the respective token has been applied.

In one embodiment, the method further comprises, responsive to receiving a request from a merchant, updating the first token to a different state (e.g., the merchant may log in to the token processing system as a user to change the state of the token to correspond to different set of rules for obtaining a transactional benefit from application of the token to a transaction). In another embodiment, the method further comprises, responsive to receiving a request from a second user, updating the first token to a different state (e.g., a second user may log into the token processing system and provide input or a request to change the state of the first token).

In one embodiment, the users include a second user, the method further comprising responsive to receiving a request from the first user, transferring the first token to the second user. For example, user 102 may transfer its $Token_1$ and/or $Trophy_A$ to another user of the token processing system. In one embodiment, the method further comprises adding an attribute to the first token based on a history of prior transactions of the first user.

In one embodiment, the method further comprises defining a network (e.g., an online grouping of user devices, user accounts, or other objects or sources of data that are treated as a group or class), and associating the transactional tokens with the network. In another embodiment, the method further comprises associating a number of user devices with the network, and receiving transaction data from the user devices for transactions to which the transactional tokens are applied.

In one embodiment, the monitoring of the usage of the tokens further includes, responsive to receiving transaction data for two or more users of the plurality of users other than the first user, updating the first token to a different state based on purchases of the two or more users. For example, transaction data received from the purchases by a group of users (e.g., a two-level deep social network of the user that is associated with the token processing system) may be analyzed and used to change the percentage discount offered in a transactional token.

In one embodiment, the method further comprises collecting data associated with the users, correlating the data to identify a new transactional opportunity (e.g., identifying a product of expected purchasing interest for a target group of persons or entities), generating new transactional tokens each providing a transactional benefit for the new transactional opportunity, and sending the new transactional tokens to new users and/or to a target group of persons or entities.

In one embodiment, the receiving of the transaction data by the token processing system includes receiving the transaction data by a transaction handler configured to receive from acquirer processors authorization requests for payments to be made by issuer processors according to account identifiers of users, the issuer processors to make the payments on behalf of users, and the acquirer processors to receive the payments on behalf of merchants.

Token Processing System

Figure 2:
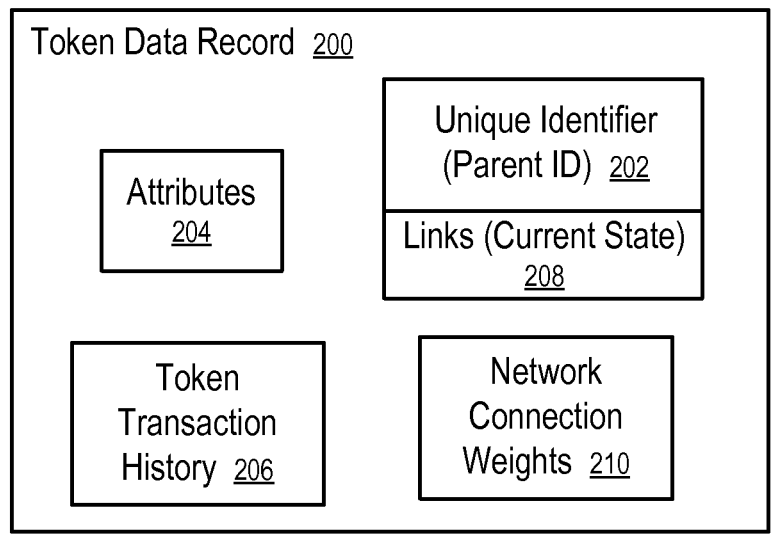
FIG. 2 illustrates token data record according to one embodiment.

FIG. 2 illustrates token data record 200 according to one embodiment. As mentioned above, the token processing system may maintain data regarding various attributes 204 for each transactional token. For example, one attribute may be a discount to be applied to a purchase. A different attribute may be a trophy or a loyalty reward point allocation. As a token is used, transaction data associated with its use may be stored as token transaction history 206, which may be stored in a memory or database.

Token data record 200 includes unique identifier 202 (i.e., the first unique identifier or parent ID created and associated with the token when it is first generated). Second and subsequent unique identifiers or links 208 that are linked to the parent ID, as discussed above, are used to define the current state of the token. Each link 208 points to a definition of the current state and its attributes 204.

As mentioned above, a token may be associated with one or more networks. Token data record 200 may include network connection weights 210 to indicate the strength of association or connection of this particular token with a given one or more of these networks.

In one embodiment, networks may be further organized into network groups for analysis (e.g., of transactions of persons in the network group). A network group is a well-defined or abstract grouping of several networks. This grouping defines a higher order structure to the networks. An example of a network group is the set of all people using a social website, and a network within that group is a set of all people directly connected to a particular person in that social website. The connection between a network and a network group also can indicate strength, which may be stored as one of network connection weights 210.

Figure 3:
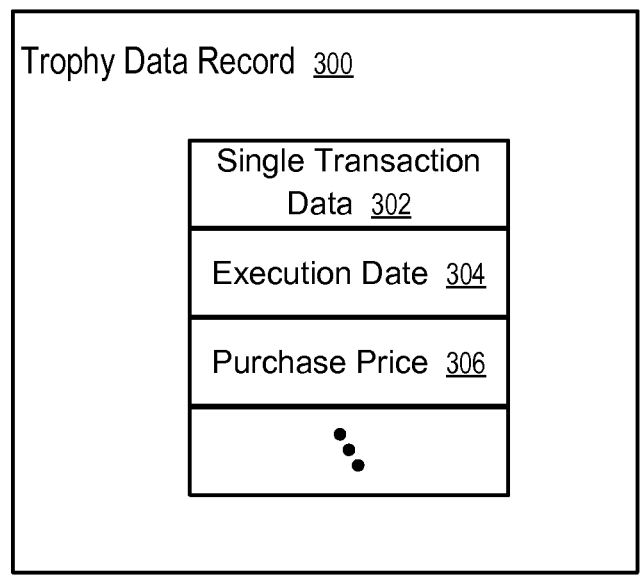
FIG. 3 illustrates a trophy data record according to one embodiment.

FIG. 3 illustrates a trophy data record 300 according to one embodiment. Data record 300 provides data and history for prior purchases associated with a uniquely identified trophy (e.g., $Token_1$ in $State_B$, or $Trophy_B$, each as discussed above). This data may include transaction data 302 for a single purchase (e.g., $Transaction_1$) that led to the existence of the trophy. This data may include the execution date 304 of the transaction and the purchase price 306 for the good or service purchased. In one embodiment, trophy data record 300 is incorporated into token data record 200.

Figure 4:
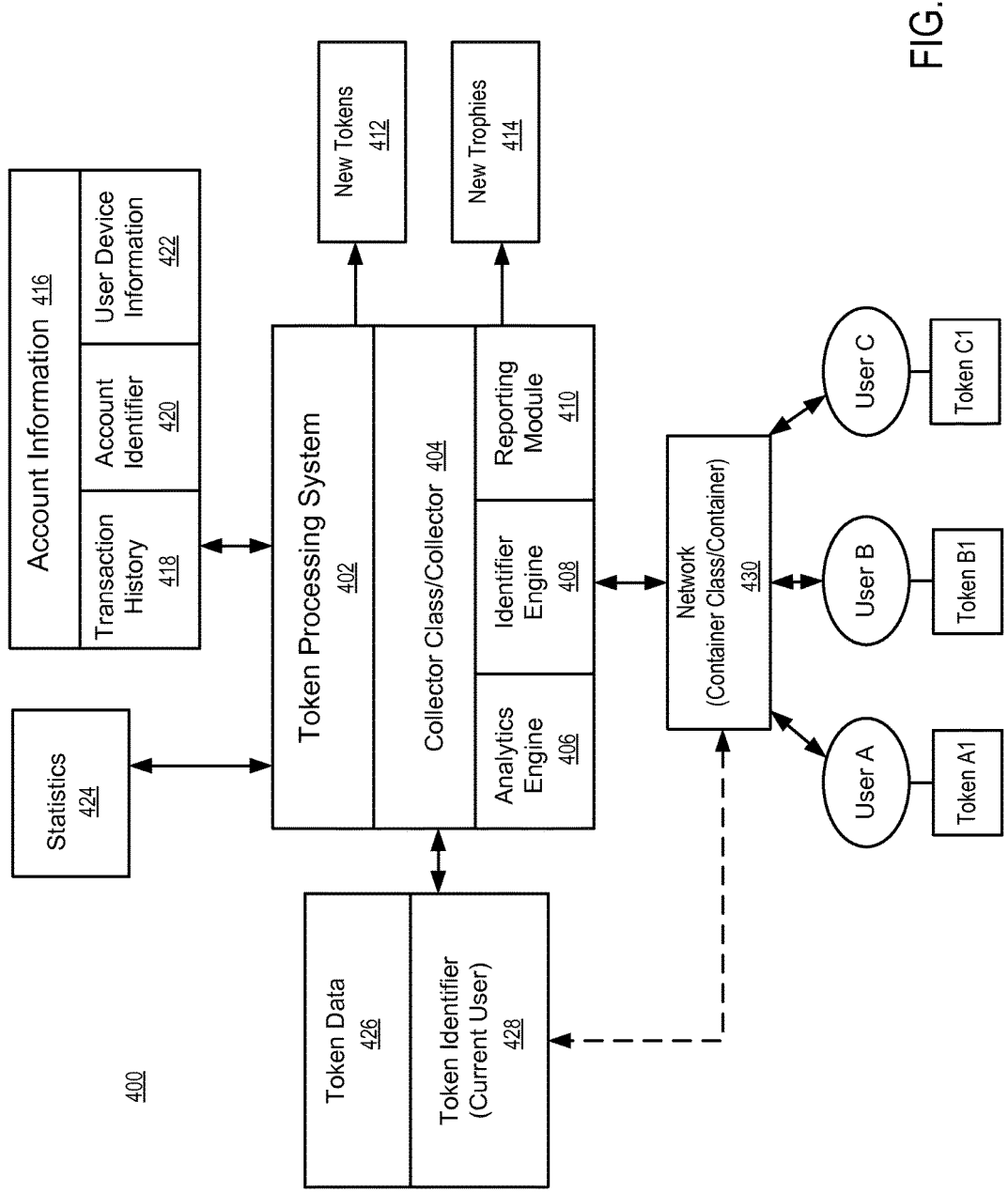
FIG. 4 illustrates a token processing infrastructure according to one embodiment.

FIG. 4 illustrates a token processing infrastructure 400 according to one embodiment, including a token processing system 402, suitable for implementing the systems and methods discussed above. Token processing system 402 generates new tokens 412 and new trophies 414. Data for new and existing tokens (e.g., Tokens A1, B1, and C1) is stored as token data 426, and each token is assigned a token identifier 428, which is associated with a current user (e.g., User A, B, or C, etc.). As a token may be transferred by a user or due to some other action or event, the current user of the token is updated in token data 426. Token identifier 428 may be generated, for example, as a hash of data (e.g., account number, etc.) associated with a user. Other methods may be used.

As discussed above, each of the tokens managed by token processing system 402 may be associated with a network 430 (or alternatively network group). These associations may be stored as part of token data 426.

In one embodiment, networks are a container for the tokens (a network is sometimes referred to herein as a container class or a container). Networks can be defined abstractly (e.g., people who are likely to buy shoes in the next month) or physically (e.g., all devices that share a certain IP address). The connection or association between a network and a token has a weight (e.g., one of network connection weights 210). This weight may indicate a strength of the relationship. For example, the connection weight between tokens and networks could indicate a degree of association, affiliation, or social unity or community, or a probability that the relationship is valid, or a propensity towards the behavior used as a basis for defining the network. For example, a value of one indicates a direct match to the network. The foregoing may be generally described in that networks are containers for data objects associated with a set of tokens. In some cases, a network may be viewed as a container that links multiple tokens (i.e., the tokens are associated with the container).

In one embodiment, token processing system 402 includes a collector class and a number of collectors 404.

The collector is a process that creates tokens (e.g., tokens 412) and networks (e.g., network 430) using predefined rules and functions. The collector may be implemented as an adaptable engine that populates the entities, defines the network relationships, defines how tokens are to evolve (change state), and controls how tokens interact with data and or events received from or associated with the network.

The collector class is the generic definition, while a specific collector (e.g., a home address collector) is specific to a certain data source (e.g., a social networking website). These collectors are XML configurable and hold the meta data definitions, models and data integrity rules.

A collector class may be a scoring model that builds statistical relationships between entities and networks and/or or creates direct connections (e.g., a connection between a person and a home address). One or more of a variety of known scoring models may be used to build these relationships. In general, the collectors build the data objects. A collector group is a higher order definition of collectors such as, for example, a group of social websites versus a single, particular social website.

Statistics 424 are stored in a memory or data store accessible to token processing system 402. Statistics 424 includes data used to build the statistical relationships (e.g., this data may be collected from user devices of users during transactions, or from third-party data sources such as demographic, business, or financial data). These relationships may be built in either real-time as transactions occur and/or in a batch mode. In one embodiment, both real-time and batch processing is done.

Account information 416 may be maintained in a data store (accessible to token processing system 402) and includes user data (e.g., account information 112). Account information 416 includes an account identifier 420 for each user, transaction history 418 for storing data from prior transactions (e.g., both for transactions to which tokens are applied and for other transactions), and user device information 422 to associate each user with a physical device of that user (e.g., a payment card or mobile device used by the user in a transaction). Token processing system 402 also includes analytics engine 406, identifier engine 408, and reporting module 410.

Exemplary Implementations

Various exemplary implementations and variations are now discussed below. These implementations are not to be interpreted as limiting the generality of the foregoing systems and methods.

In one example, an electronic or digital coupon is implemented as a transactional token that builds complex networks. The coupon evolves in an interconnected environment having a large number of devices connected to a common network (i.e., devices associated with a defined network or network group). This evolvable token starts with a 30% discount, then changes state to provide a benefit when used with particular type or provider of a web service, and then changes state again to yet some other benefit for the holder of the token. The token has a unique ID that is associated after processing with a container group (the ID associates the token with the container group and the token processing system stores this association).

In another example, a trophy has a different value depending on what person or merchant the trophy is currently associated with (i.e., the trophy changes state to have different attributes or benefits as it is transferred from one entity to another). The trophy has a different value depending on the person or entity that is holding the trophy.

In one example, the token processing system may use statistics and transaction data to determine persons that have not yet purchased a good or service. The value of a token in possession of such a person is increased relative to a person who frequently makes purchases from the same merchant.

In one example, a traditional coupon (which is a form of external token not yet entered into the system) may be entered into the token processing system and handled as a new token within the system. For example, the coupon may have an identifying bar code or square that may be scanned (e.g., using a mobile device camera) and used to obtain data needed to build the new token. Each such traditional coupon will have a unique identifier when generated (e.g., coupons typically have an ID numbering associated with them, for example, when they are provided in magazines).

For example, the above coupon may be entered into a user network that is associated with an iPhone or iPad mobile device. The coupon is associated with this network and is also associated with an ID for this mobile device. The mobile device ID may be referenced to a specific user or group of users of the mobile device (e.g., this reference may be stored in user device information 422).

In another example, data and statistics are carried along with a token as it moves from one person to another. The data and statistics may be stored as part of token transaction history 206.

In another example, a user of a mobile device may scan a coupon from a website. The coupon is associated with a transactional token managed by token processing system 402. The user then applies the token to a transaction at the merchant location associated with the coupon offer (e.g., 30% off at the merchant). The merchant can scan the coupon/token in at the point of sale. Token processing system 402 then changes the state of the token from a coupon into what was described above as a trophy. The trophy data stores when and where the user executed the coupon.

The trophy connotes a sense of recognition that an event has occurred (e.g., a purchase or other event such as here where the coupon was redeemed). The trophy stores transaction and other data associated with a redemption. Once the user is in possession of the token that was applied, this data stays with the token for as long as the user is in possession of the token. The token may continue to remain associated with either the particular mobile device used in the transaction or other event, or remain with the user (e.g., as may be stored in token data 426).

In another example, if a user redeems coupons in order to accumulate a predetermined number of trophies, then the collection of trophies can generate another new token/coupon (e.g., by the user exchanging the trophies for a new token 412). Alternatively, the trophies could be exchanged for some other business or consumer offer, or could enable the user to access a new section of a website (e.g., a premium section with more privileges; or an access token for a website).

These trophies also may be used to interface with social websites such as the Facebook website and/or other websites, or they could be used to implement an access method if the user has a certain number of tokens. The trophies and tokens are configurable in numerous ways (one coupon or token may generate another coupon, or it could turn into another coupon).

In one example, an ID for a new token is generated by hashing various pieces of data together such as the time of day, the user, the device, etc. to create the ID (e.g., a twenty byte hash).

In one example, when a token is used on a particular user device, the token is associated with that device. The device itself is part of a network, and so the token is then associated with that network. The user of the device or the device itself may be associated (e.g., via statistics 424 or account information 416) with an IP address and/or to a physical address, so that this data also may be associated with the network.

The foregoing and other various types of data associated with the network (e.g., email addresses and/or zip codes of users in the network) provide data inputs (e.g., transaction data of the user and other users in the network) to collector 404, which analyzes the data and makes changes to the state of tokens (either tokens now being generated or existing tokens) to reflect the business situation and conditions as inferred from the analyzed data (this collector may also point to other tokens such as the user's device token, or to the user's account number, or to the user's transaction history). This process sets up a closed data feedback loop in which tokens affect transactions, and data from the transactions and/or the users associated with the transactions affects the state of tokens (new and existing) as reflected by their various attributes (e.g., a real-time change by a merchant in the amount of discount for a purchase that is associated with all tokens in a given network).

In another example of a business loop using tokens, someone other than the user may use a token/coupon. For example, the user may be a member of a social group (e.g., club). When the other member uses the token, the user receives a newly-generated coupon based on usage of the token by the other member (or members). The social group may already be part of a previously-defined network and/or a new network may be defined that includes the social group and its users.

In another example of a social group, a user is a member of a car club (e.g., there may be thousands of clubs in the United States). Each club may be associated with a network or container class, and each club may have members that possess tokens as described above. Tokens possessed by members of the car club generate data when applied or used, as discussed above. This data may be used by the token processing system (e.g., via an artificial intelligence engine) to infer or make correlations to data in other networks (e.g., for a different club). These inferences or correlations may be used as a basis for generating new tokens (e.g., for the different club).

In the example above, new tokens are sent to all members of the car club (e.g., sent to 200 user devices and 50 email addresses of the members). As the new tokens are used, token processing system 402 receives data. In one case, the new token is not actually generated until the email is read by the club member, and the club member clicks on an icon to indicate it wants to acquire the token/coupon. It is at that time that a token would be generated. Usage of the new tokens leads to generation of other new tokens based on analysis of the data.

As part of the analysis of this data, the token processing system sees that the new token is used by 100 people. A new network group is defined that includes these 100 people. This network group may be used for analysis by the token processing system. So, in one case, a top-level network includes all of the devices and all of the email addresses associated with the car club that use the same token. The intelligence engine analyzes this network and draws inferences that lead to the generation or creation of another type of token/coupon (e.g., it identifies a relationship between malt shop tokens and old car parts tokens).

Data from transactions or other usage of tokens involving or related to the social group may be correlated with other data in the token processing system. Various members of the social group may hold various types of tokens and trophies as were described above. The token processing system analyzes these holdings in deciding what new tokens to generate, and/or how to change the state of existing tokens (e.g., tokens in a the network that includes the social group). For example, the rating of a token may be increased or decreased by this general process (and specific rules may define the specific increases or decreases to use).

In one example, the token processing system uses an artificial intelligence engine that is performing a variety of statistical and mathematic analysis. The engine has both batch and a real-time sides (e.g., the engine may be run on an entire population of users once a day, such as 100 million users). The outcome from the batch processing would determine the new coupons to be generated for the next day. The real-time generation of tokens would be based on transaction data as described above.

In one example, a transactional token points to multiple objects such as, for example, devices, consumers, and email addresses. The token may also further point to one or more networks or network groups. Thus, the token may be used as a basis for identifying a correlation between users in different networks or network groups.

Reputation Scoring

Figure 5:
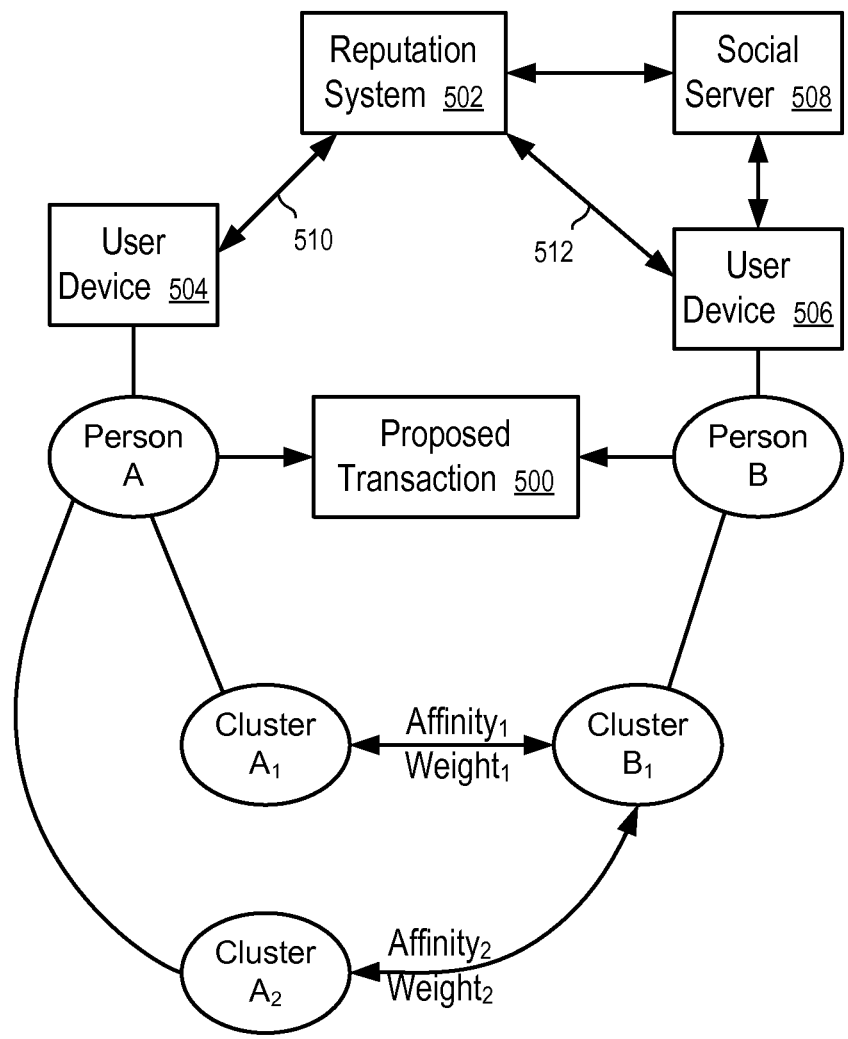
FIG. 5 illustrates a reputation scoring system infrastructure, including a user device, according to one embodiment.

FIG. 5 illustrates a reputation scoring system infrastructure, including a reputation (scoring or ranking) system 502 and user devices 504, 506, according to one embodiment. User devices 504, 506 may communicate with reputation system 502 via wireless connections 510, 512, or via other wired or network connections.

User device 506 may communicate with social server 508. Person B may have an account on a social network of server 508. Person B may authorize communication of its social graph/data to reputation system 502, which may receive and use such data as part of determining affinities for use in the systems and methods as described herein.

Reputation system 502 may be implemented as a computing device, apparatus or system as described herein, and may operate independently of token processing system 402. In other embodiments, reputation system may be incorporated into or be a part of token processing system 402.

In this embodiment, reputation system 502 receives information regarding a plurality of completed transactions from a plurality of users (e.g., including Person A and/or Person B—in some cases many other users having completed prior transactions have submitted information regarding completed transactions to reputation system 502 as described herein). Reputation system 502 receives a query from a first user (e.g., from Person A via user device 504) regarding a proposed transaction 500 with Person B. System 502 determines one or more affinities (e.g., a social and/or other graph) between the first user and the plurality of users based on the information.

It should be noted that in some embodiments, Person A does not identify Person B. Instead, reputation system 502 performs processing similarly as described herein on a set of potential entities (e.g., all or a subset of the entities stored in a database of reputation system 502).

For example, Person A may be associated with a Cluster $A_1$, and Person B may be associated with a Cluster $B_1$. An affinity (e.g., $Affinity_1$) between Cluster $A_1$ and Cluster $B_1$ may have been previously determined prior to the query regarding the proposed transaction 500. Similarly, an affinity, $Affinity_2$, may have been previously determined between a Cluster $A_2$ and Cluster $B_1$.

A ranking or expectation of success is determined for each of a plurality of potential entities (e.g., Person B, who may be a potential babysitter or merchant, or for other entities or persons) for the proposed transaction 500 based on the one or more affinities (e.g., $Affinity_1$ and/or $Affinity_2$). The ranking or expectation of success may also be based on other data regarding Person A and/or Person B that is available to reputation system 502 (e.g., from user account information, or from token processing system 402).

Reputation system 502 selects a set of selected entities based on the ranking or expectation of success determined for each of the potential entities. The selected entities are sent to Person A in response to the query (e.g. as a text message to user device 504). The selected entities may, for example, be displayed as a listing with expected success scores or probabilities on user device 504.

Person B may receive a communication from system 502 on user device 506 indicating that Person A desires to enter the proposed transaction 500 with Person B (e.g., this may be the first time that Person B is aware of the proposed transaction 500 with Person A). Persons A, B may use user devices 504, 506 to make payment for this transaction, and to enter feedback regarding the performance of the other party to the transaction after it is completed.

In one embodiment, the method further comprises sending, to Person A, an indication of the ranking or expectation of success for each of the plurality of selected entities (e.g., in the form of an emoticon).

In one embodiment, each cluster (e.g., Clusters $A_1$, $A_2$, and/or $B_1$) may be a network (e.g., network 430 discussed above), and the method further comprises defining each such network using token processing system 402 (as described above). In one embodiment, the receiving of the information by reputation system 502 comprises receiving data associated with transactions to which a transactional token is applied by one of the plurality of users. The method may further comprise storing a token data record (e.g., data record 200 above) for the transactional token in a memory or database of token processing system 402, wherein the determining the ranking or expectation of success comprises using information from the token data record. In another embodiment, a transaction token is associated with proposed transaction 500 and follows the transaction so that rankings of parties to the transaction are associated with the token.

In one embodiment, the method further comprises after the proposed transaction becomes a completed transaction, receiving feedback information regarding the completed transaction from the first user (e.g. Person A). The method may further comprise updating the one or more affinities based on the feedback information. The feedback information may be a text comment and/or a numerical ranking (e.g., a score from 1-9).

As feedback information is received, weights associated with each affinity may be varied. For example, $Weight_1$ may be increased and $Weight_2$ decreased. These updates may change the ranking of the selected entities.

In one embodiment, the plurality of users from which information on previously completed transactions is received may be the source of the plurality of potential entities. In other embodiments, potential entities may be obtained from other sources.

In one embodiment, the receiving of the information for completed transactions comprises receiving transaction data for the plurality of transactions by a transaction handler configured to receive from acquirer processors authorization requests for payments to be made by issuer processors according to account identifiers of users, the issuer processors to make the payments on behalf of users, and the acquirer processors to receive the payments on behalf of merchants.

Figure 6:
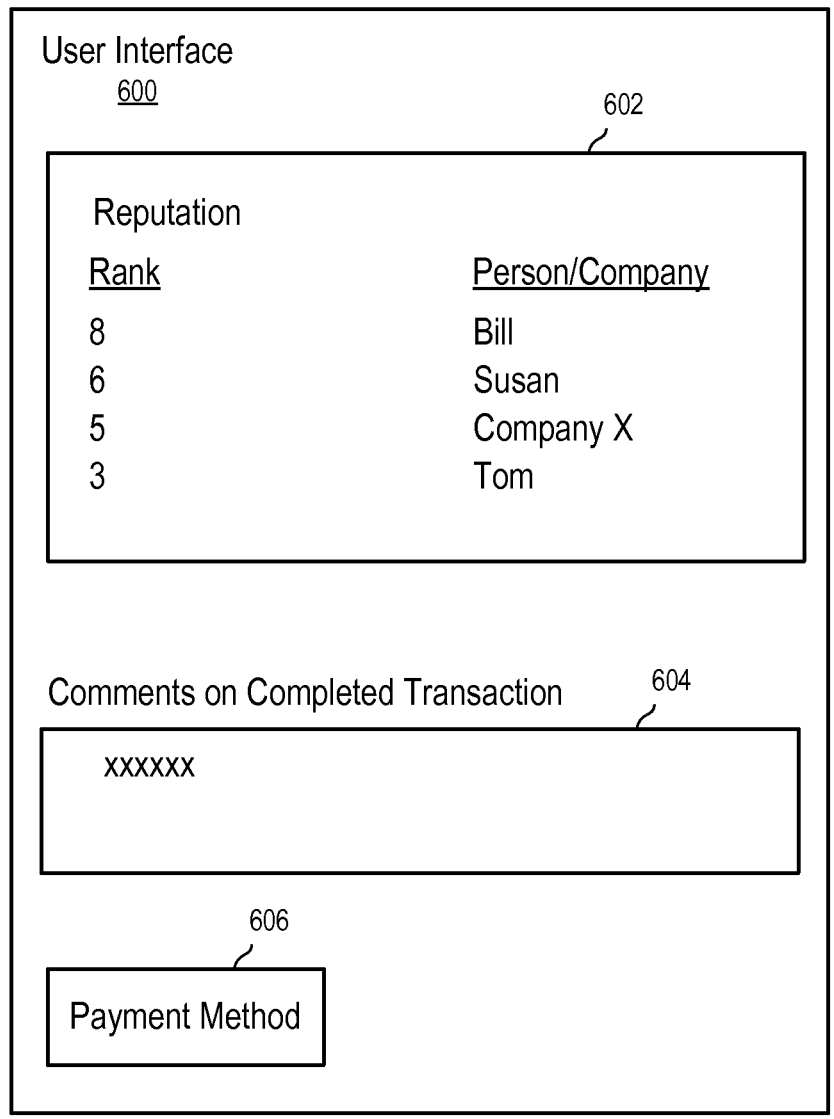
FIG. 6 illustrates a user interface of the user device of FIG. 5 according to one embodiment.

FIG. 6 illustrates a user interface 600 of user device 504 or 506, according to one embodiment. User interface 600 includes a ranking box 602 for presenting selected entities and a reputation rank. A box 604 permits entry by the user of feedback information for a completed transaction. A box 606 permits a user to provide payment information and authorization for a proposed transaction.

Exemplary Implementations of Reputation Scoring

Various exemplary implementations and variations for reputation system 502 are now discussed below. These implementations are not to be interpreted as limiting the generality of the foregoing systems and methods.

In one example, reputation system 502 is used to support transactions using barter instead of currency. Box 606 may indicate the terms of barter exchange. Thus, services may be provided in support of a barter economy (e.g., in a developing country). The transactions may relate to commodities, services, or other goods.

In another example, each user of the reputation system (e.g., Persons A and B) has a smart phone, and each user identifies itself through the system as wanting to enter a proposed transaction (and providing information about the characteristics of the transaction). Persons A and B do not need to know of each other. Reputation system 502 sends back a score to Person A identifying Person B as a potential party, and indicating a ranking and/or providing an indication of the probability of success for use of Person B (e.g., an indication or information regarding whether it is likely that, or the extent to which, Person A is expected to be satisfied with the goods or services provided in the transaction). Then, Person A can decide if it wants to engage or enter into the transaction (e.g., via an online contract). If the parties actually enter into the transaction, then the transaction as stored as active in reputation system 502. When the activity or transaction concludes, each user or party uses its smart phone to provide feedback information (e.g., a rating) regarding performance of, and any subsequent results from, that transaction. In lesser-developed countries, the user interface may be done through a text messaging system.

In one example, reputation system 502 reviews the actual performance or behavior of the persons in the transaction. For example, even though parties to a transaction may complain about a provider (the other party), if the party still does 50 contracts with that same provider, this provider's ranking may be relatively higher (and the provider may actually be one of the best available providers for the particular type of item or transaction involved). An entity is not simply graded globally. Instead, a prediction is provided that a party (or list of selected entities) are the best relative match (as compared to other potential parties) for this proposed transaction (e.g., based on geography, the type of situation, or numerous other business factors).

In one example, the selected entities predicted as a good match and provided as a listing to a person (e.g., Person A) that is making a query about a proposed transaction do not have to be in the same cluster or cluster group. For example, regarding babysitting services, a babysitter that provides services is usually not in the same cluster as the parent of the child. Although not in the same cluster, those clusters are related by prior data that has been received (e.g., related by affinities and/or weights). The affinity of the cluster to the babysitter may be in some cases as or more significant in ranking an entity as is the actual identification of the babysitter. The babysitter is associated to Person A's cluster or cluster group and there is a strength of that association that is used to determine the reputation score or expected success for the babysitter.

In one example, affinities are used to make selections of people instead of using global rankings of people. The affinity between cluster groups, and not the mere fact of being in the same cluster group, is the basis for selection of a selected entity. Reputation system 502 has previously collected various types of data on people from prior transactions or other data sources. System 502 relates these people to various clusters using that data. When a proposed transaction arises, system 502 looks at clusters that are naturally related to the proposed transaction.

In one example, Person A is not in a babysitter cluster, but he needs a babysitter. So, reputation system 502 determines which babysitter cluster or cluster group is closest to Person A, and then uses that cluster or cluster group to get a babysitter for Person A. The relationships between clusters are already all mapped out by reputation system 502 prior to the need to make this determination. System 502 knows how each cluster group(s) interacts with other cluster group(s). For example, system 502 can map four or five cluster groups onto an entity such as Person A. Clusters are mapped onto each entity in system 502.

In one example, the affinities or relationships between clusters are analyzed using signal-to-noise or information theory-based algorithms to determine the rankings for reputation of entities. Each entity has separate statistics. The ranking is typically different for the first time in interacting with a party in a transaction as compared to having used that party in a prior transaction (for which system 502 would have direct data that would affect the reputation scoring).

In one example, in providing options to a user, reputation system 502 provides a ranked order list, by the highest expectation of success. The list may be cut off below a certain predetermined ranking level or score.

Continuing with the babysitting example, Person A's cluster group may be a lawyer cluster group and Person B's cluster group may be an artist cluster group. System 502 then finds the nearest cluster group to Person A (using affinities) that has data residing in it, such as the parent cluster. System 502 has data on the linking of the parent cluster group to the babysitting cluster group from prior transactions. So, system 502 finds the artist babysitters associated with the lawyerly parents (and also may further use data such as a zip code or location of a party, and also data regarding a prior success rate for a given geographic region such as a given zip code).

In one example, system 502, at the request of Person A, selects Person B to do babysitting. Persons A and B enter a transaction, and that transaction is logged. Reputation system 502 may be configured to enter a first, authorization phase in which both parties have agreed to enter the proposed transaction, and then proceed to a second phase of the transaction for settlement, in which payment is provided to the provider. Other payment services operated by a system different from the reputation system 502 may be used for payment, but reputation system 502 may still be used for providing reputation scoring services (and receive data from this other system to support the reputation scoring).

In another example, if the babysitter is paid by cash, then reputation system 502 may send a prompt to the parent asking for rating information about the transaction. The transaction may also be based on barter in which one party agrees to do babysitting, and the other party provides a service or good in exchange for the services.

In one example, each party may provide a textual comment or a rating of one to five. System 502 may analyze the key words in this text.

In one example, the logging of the transaction by system 502 provides direct data that may be used in selecting persons for future proposed transactions. When there is a successful transaction (e.g., based on feedback) with a person, then reputation system 502 increases the weights of the lines to other people that were associated with that particular transaction. This increases the rating of that particular affinity relationship(s), or increases the rating between the graphs of those affinity relationship(s) (computationally there is a graph between the two relationships, and the rating is increased).

In one example, each party to a proposed transaction may see a reputation score for the other proposed party, and the respective score may be different on each side of the proposed transaction. For example, from the babysitter perspective, there is a ranked list of preferred parents, and from the parent side, there is a ranked list of babysitters (but each list is a different list).

In one example, reputation system 502 decides if an entity is a good or bad match or option depending on that entity's particular graph. The entity may be a good choice for one cluster, but not as good of a choice for another cluster (the reputation score is relative to the parties and clusters relevant to a particular proposed transaction).

In one example, data for use in clusters and other analysis is built using social network or other online data for users (e.g., a Twitter account), or even from other sources that provide data about potential parties to a transaction. A Twitter account is an example of data that provides a full graph of who a person follows, what subjects are followed, who the person does not follow, the interests of the person, and how often the person sends a tweet. All of this data may define a graph that system 502 can apply in numerous different proposed transaction contexts. In one example, the graph that reputation system 502 uses is more than a social graph as it includes a payment graph, an overlap to a physical zip code, and/or locations of particular buildings. This may further overlap to a device graph (e.g., what type of devices a person has at her house, or that the person uses).

In an alternative example, reputation system 502 provides reputation and identity verification services that can be accessed at a point of sale, over the phone via text messaging, or over any other Internet-enabled device. System 502 may permit verification of the identities and reputations of parties involved in contracts, barter exchanges, and other agreements. System 502 may enable users in non-industrial countries to build up a verifiable history that is portable between countries or other locations, and that may also be used to help gain access to loans and other resources. In addition, users may query for open contracts and available users to find new opportunities. System 502 may deliver a reputation score via text messaging (e.g., SMS) technology, as well as via the Internet, which enables access to the services across a range of applications and situations.

In one example, reputation system 502 authenticates parties involved, provides reputation data and allows parties to submit reputation reviews. Also, reputation system 502 provides a guard against identify theft by making it more difficult to compromise an identity and provides a means of identity recovery if a compromise occurs.

In one example, reputation system 502 maintains a database of user identity information and a history of past agreements with other users. When a user wants to verify another user's identity and/or reputation, the user accesses reputation system 502 either from a point of sale (POS) device, phone or any Internet device. If both parties agree to enter a contract, reputation system 502 tracks the transaction and allows users to submit reputation surveys about all parties involved. This information may be used to update each user's reputation. Reputation scores may be based on the user's tenure, the reputation of users they are involved with, the user's reviews of other users, and reviews submitted by other users about the user. Several levels of user information may be made available.

In one example, the base score may range from zero to nine. A zero indicates no information is available and nine indicates the highest ranking. Other detailed information about prior agreements may be made available for different service agreements. A user may only review other users after both users enter a contract. The user's score can be returned to system 502 via the Internet or text messaging.

In a first use case example, two people desire to exchange goods. If both parties have an account in reputation system 502, they can use system 502 to decide whether to formalize the agreement. Each party may enter its identifier (e.g., user ID) followed by the other party's or parties' ID via phone or the Internet. Reputation system 502 may authenticate each party, check on each party's status (e.g., account is suspended, in good standing, a high risk, etc.) and return this information. Once both parties have this information, each can decide whether to initiate the agreement. After their agreement is completed, the users may update the status of the transaction by providing feedback information. Reputation system 502 tracks this information and updates each user's standing.

In a second use case example, a user logs into reputation system 502 and looks for open contracts in its area. Based on the user's preferences and the preferences of the users who submitted the proposed transaction, a select query is returned. If the user finds a contract(s) that looks agreeable, the user can request contact with the submitter(s).

In a third use case example, a user is looking for nearby user(s) that have similar business interests and a reputation profile. Based on the preference of the users, a select query is returned. If the user finds another user(s) that meets its need, the user can request contact.

In a fourth use case example, a user is trying to get a small business loan with no prior credit history. The loan officer uses reputation system 502 to get the reputation score for the user to help make its final lending decision.

The following sections below provide exemplary embodiments (e.g., a transaction handler and a transaction-data-based portal, and various forms of data collection and data/cluster analysis) that may be used in various implementations with the transactional token processing and/or reputation scoring systems and methods described above, but the following sections do not limit the generality of these systems and methods. In some embodiments, the hardware described in the section titled "HARDWARE" below may be used to implement the systems and methods described above for the token processing infrastructure 400, or for the reputation scoring system 502.

Transaction Based Intelligence Information

Millions of transactions occur daily through the use of payment cards, such as credit cards, debit cards, prepaid cards, etc. Corresponding records of the transactions are recorded in databases for settlement and financial record keeping (e.g., to meet the requirements of government regulations). Such data can be mined and analyzed for trends, statistics, and other analyses. Sometimes such data are mined for specific advertising goals, such as to provide targeted offers to account holders, as described in PCT Pub. No. WO 2008/067543 A2, published on Jun. 5, 2008 and entitled "Techniques for Targeted Offers."

U.S. Pat. App. Pub. No. 2009/0216579, published on Aug. 27, 2009 and entitled "Tracking Online Advertising using Payment Services," discloses a system in which a payment service identifies the activity of a user using a payment card as corresponding with an offer associated with an online advertisement presented to the user.

U.S. Pat. No. 6,298,330, issued on Oct. 2, 2001 and entitled "Communicating with a Computer Based on the Offline Purchase History of a Particular Consumer," discloses a system in which a targeted advertisement is delivered to a computer in response to receiving an identifier, such as cookie, corresponding to the computer.

U.S. Pat. No. 7,035,855, issued on Apr. 25, 2006 and entitled "Process and System for Integrating Information from Disparate Databases for Purposes of Predicting Consumer Behavior," discloses a system in which consumer transactional information is used for predicting consumer behavior.

U.S. Pat. No. 6,505,168, issued on Jan. 7, 2003 and entitled "System and Method for Gathering and Standardizing Customer Purchase Information for Target Marketing," discloses a system in which categories and sub-categories are used to organize purchasing information by credit cards, debit cards, checks and the like. The customer purchase information is used to generate customer preference information for making targeted offers.

U.S. Pat. No. 7,444,658, issued on Oct. 28, 2008 and entitled "Method and System to Perform Content Targeting," discloses a system in which advertisements are selected to be sent to users based on a user classification performed using credit card purchasing data.

U.S. Pat. App. Pub. No. 2005/0055275, published on Mar. 10, 2005 and entitled "System and Method for Analyzing Marketing Efforts," discloses a system that evaluates the cause and effect of advertising and marketing programs using card transaction data.

U.S. Pat. App. Pub. No. 2008/0217397, published on Sep. 11, 2008 and entitled "Real-Time Awards Determinations," discloses a system for facilitating transactions with real-time awards determinations for a cardholder, in which the award may be provided to the cardholder as a credit on the cardholder's statement.

In one embodiment, transaction data, such as records of transactions made via credit accounts, debit accounts, prepaid accounts, bank accounts, stored value accounts and the like, is processed to provide information for various services, such as reporting, benchmarking, advertising, content or offer selection, customization, personalization, prioritization, etc. In one embodiment, users are required to enroll in a service program and provide consent to allow the system to use related transaction data and/or other data for the related services. The system is configured to provide the services while protecting the privacy of the users in accordance with the enrollment agreement and user consent.

In one embodiment, an advertising network is provided based on a transaction handler to present personalized or targeted advertisements/offers on behalf of advertisers. A computing apparatus of, or associated with, the transaction handler uses the transaction data and/or other data, such as account data, merchant data, search data, social networking data, web data, etc., to develop intelligence information about individual customers, or certain types or groups of customers. The intelligence information can be used to select, identify, generate, adjust, prioritize, and/or personalize advertisements/offers to the customers.

In one embodiment, the computing apparatus is to generate trigger records for a transaction handler to identify authorization requests that satisfy the conditions specified in the trigger records, identify communication references of the users associated with the identified authorization requests, and use the communication references to target real-time messages at the users in parallel with the transaction handler providing responses to the respective authorization requests. Details in one embodiment regarding the generation and delivery of messages in real-time with the processing of transactions are provided in the section entitled "REAL-TIME MESSAGES."

In one embodiment, the computing apparatus correlates transactions with activities that occurred outside the context of the transaction, such as online advertisements presented to the customers that at least in part cause the offline transactions. The correlation data can be used to demonstrate the success of the advertisements, and/or to improve intelligence information about how individual customers and/or various types or groups of customers respond to the advertisements.

In one embodiment, the computing apparatus correlates, or provides information to facilitate the correlation of, transactions with online activities of the customers, such as searching, web browsing, social networking and consuming advertisements, with other activities, such as watching television programs, and/or with events, such as meetings, announcements, natural disasters, accidents, news announcements, etc.

In one embodiment, the correlation results are used in predictive models to predict transactions and/or spending patterns based on activities or events, to predict activities or events based on transactions or spending patterns, to provide alerts or reports, etc.

In one embodiment, a single entity operating the transaction handler performs various operations in the services provided based on the transaction data. For example, in the presentation of the personalized or targeted advertisements, the single entity may perform the operations such as generating the intelligence information, selecting relevant intelligence information for a given audience, selecting, identifying, adjusting, prioritizing, personalizing and/or generating advertisements based on selected relevant intelligence information, and facilitating the delivery of personalized or targeted advertisements, etc. Alternatively, the entity operating the transaction handler cooperates with one or more other entities by providing information to these entities to allow these entities to perform at least some of the operations for presentation of the personalized or targeted advertisements.

System

Figure 7:
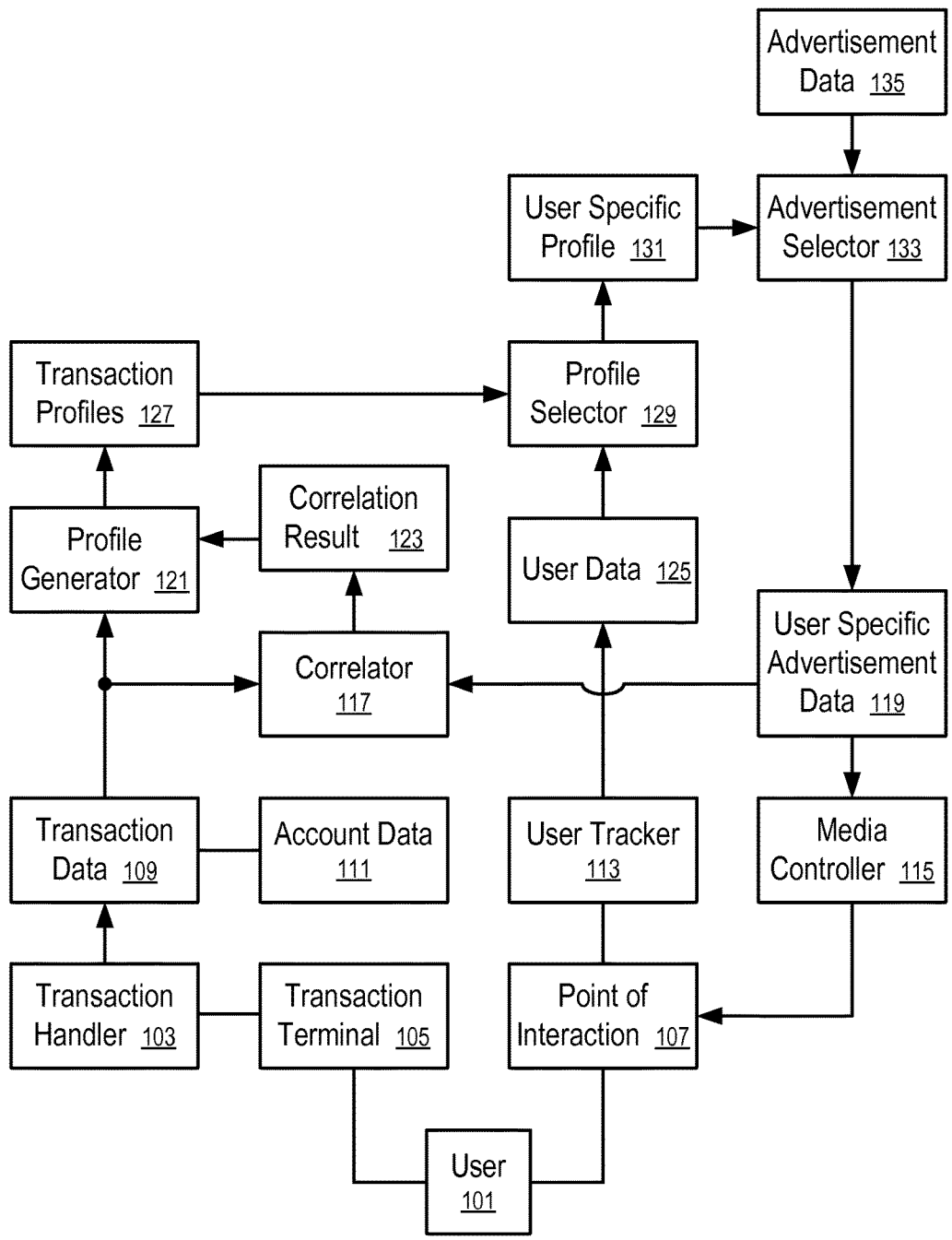
FIG. 7 illustrates a system to provide services based on transaction data according to one embodiment.

FIG. 7 illustrates a system to provide services based on transaction data according to one embodiment. In FIG. 7, the system includes a transaction terminal 105 to initiate financial transactions for a user 101, a transaction handler 103 to generate transaction data 109 from processing the financial transactions of the user 101 (and the financial transactions of other users), a profile generator 121 to generate transaction profiles 127 based on the transaction data 109 to provide information/intelligence about user preferences and spending patterns, a point of interaction 107 to provide information and/or offers to the user 101, a user tracker 113 to generate user data 125 to identify the user 101 using the point of interaction 107, a profile selector 129 to select a profile 131 specific to the user 101 identified by the user data 125, and an advertisement selector 133 to select, identify, generate, adjust, prioritize and/or personalize advertisements for presentation to the user 101 on the point of interaction 107 via a media controller 115.

In one embodiment, the system further includes a correlator 117 to correlate user specific advertisement data 119 with transactions resulting from the user specific advertisement data 119. The correlation results 123 can be used by the profile generator 121 to improve the transaction profiles 127.

Figure 8:
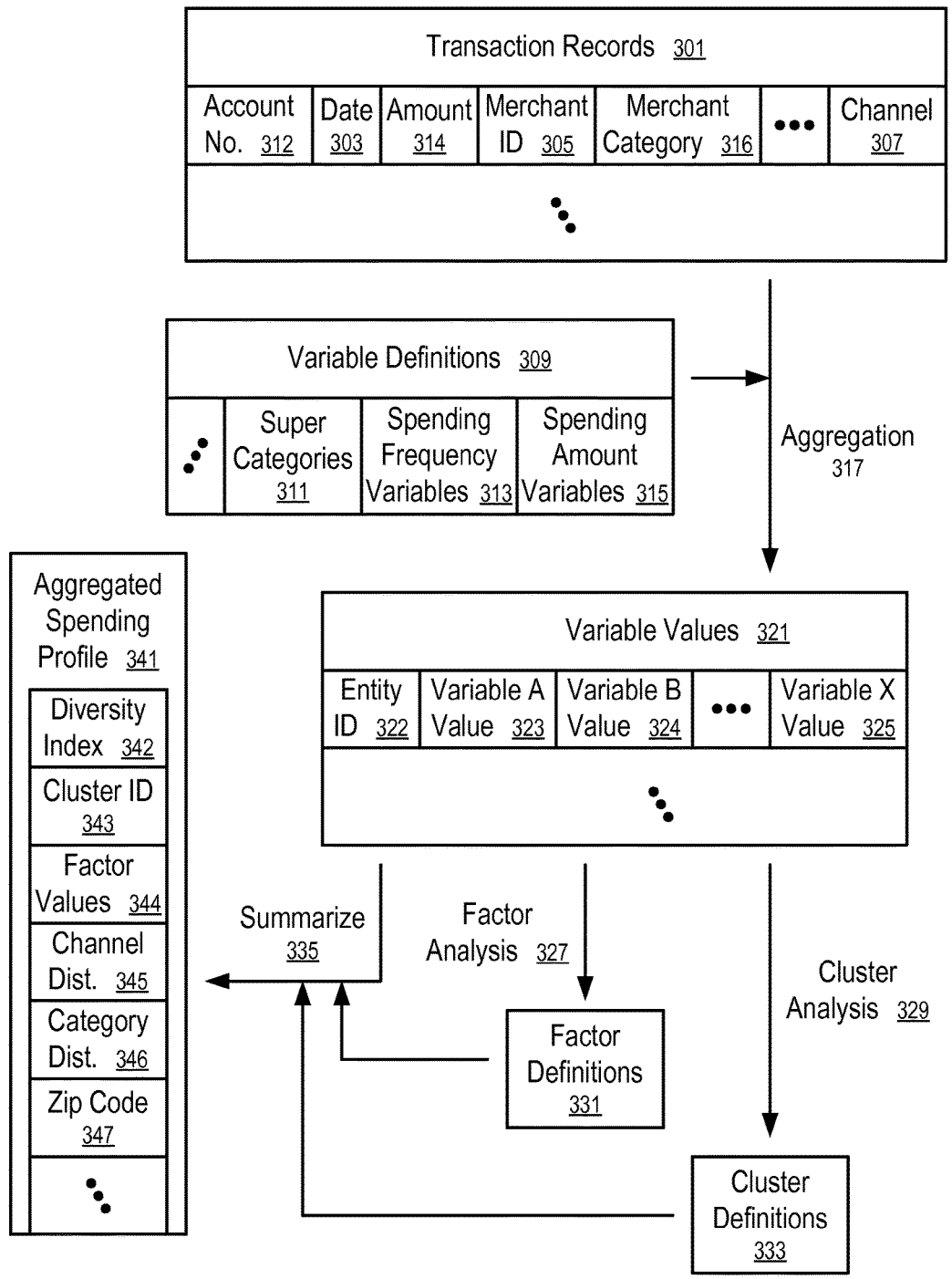
FIG. 8 illustrates the generation of an aggregated spending profile according to one embodiment.
Figure 9:
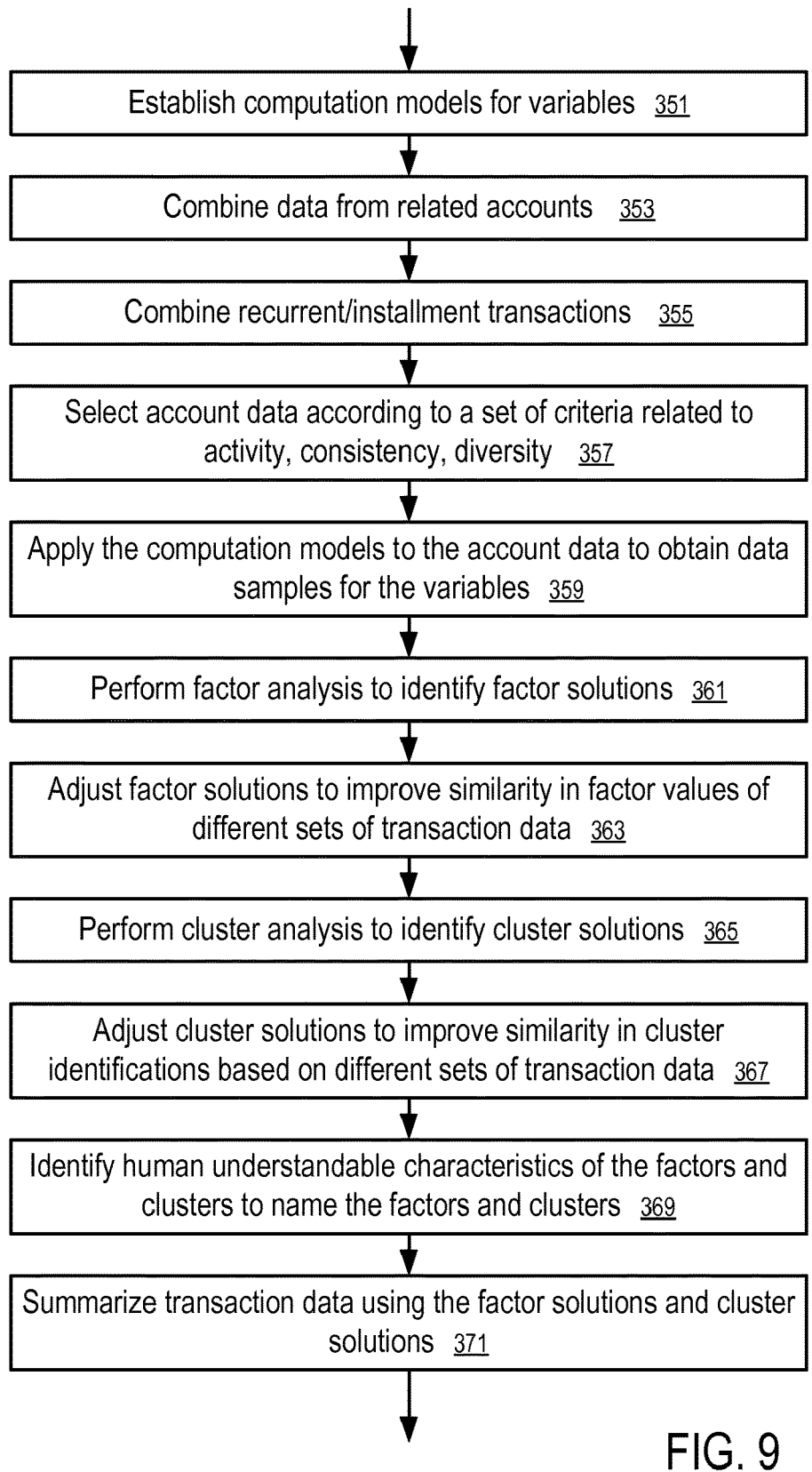
FIG. 9 shows a method to generate an aggregated spending profile according to one embodiment.

In one embodiment, the transaction profiles 127 are generated from the transaction data 109 in a way as illustrated in FIGS. 8 and 9. For example, in FIG. 9, an aggregated spending profile 341 is generated via the factor analysis 327 and cluster analysis 329 to summarize 335 the spending patterns/behaviors reflected in the transaction records 301.

Figure 10:
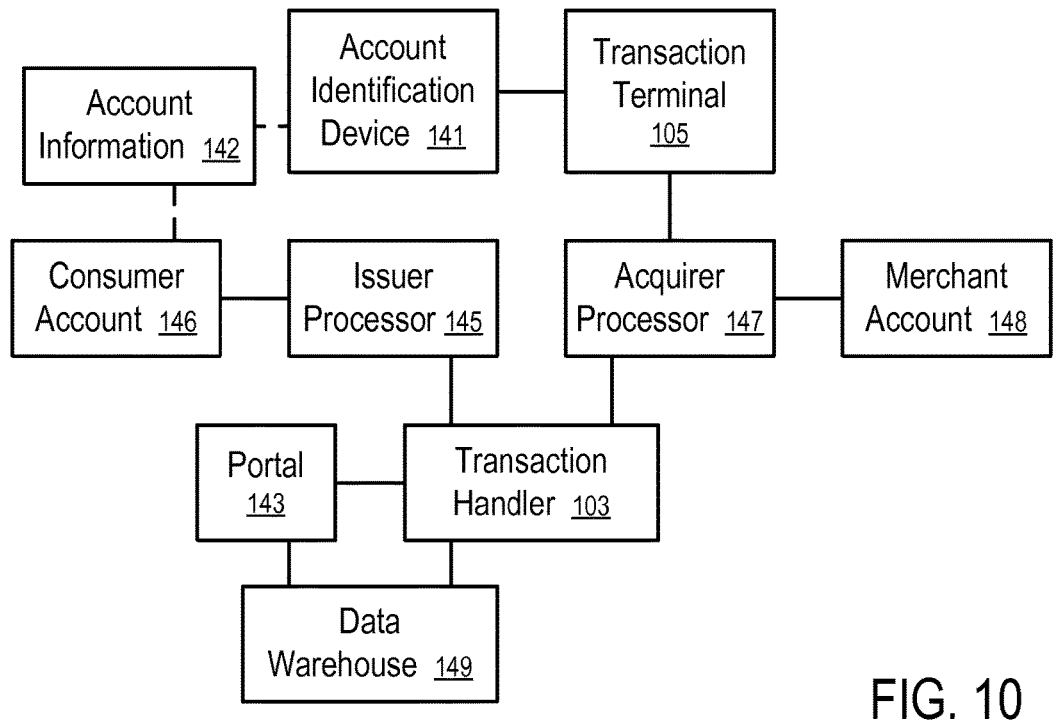
FIG. 10 shows a system to provide information based on transaction data according to one embodiment.

In one embodiment, a data warehouse 149 as illustrated in FIG. 10 is coupled with the transaction handler 103 to store the transaction data 109 and other data, such as account data 111, transaction profiles 127 and correlation results 123. In FIG. 10, a portal 143 is coupled with the data warehouse 149 to provide data or information derived from the transaction data 109, in response to a query request from a third party or as an alert or notification message.

In FIG. 10, the transaction handler 103 is coupled between an issuer processor 145 in control of a consumer account 146 and an acquirer processor 147 in control of a merchant account 148. An account identification device 141 is configured to carry the account information 142 that identifies the consumer account 146 with the issuer processor 145 and provide the account information 142 to the transaction terminal 105 of a merchant to initiate a transaction between the user 101 and the merchant.

Figure 11:
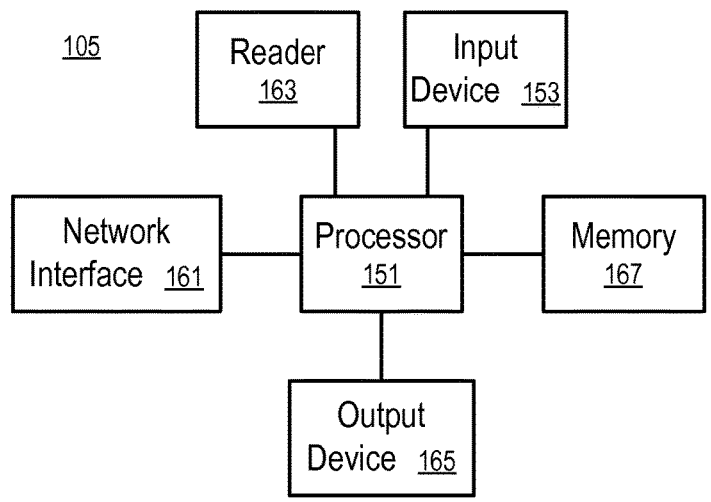
FIG. 11 illustrates a transaction terminal according to one embodiment.
Figure 12:
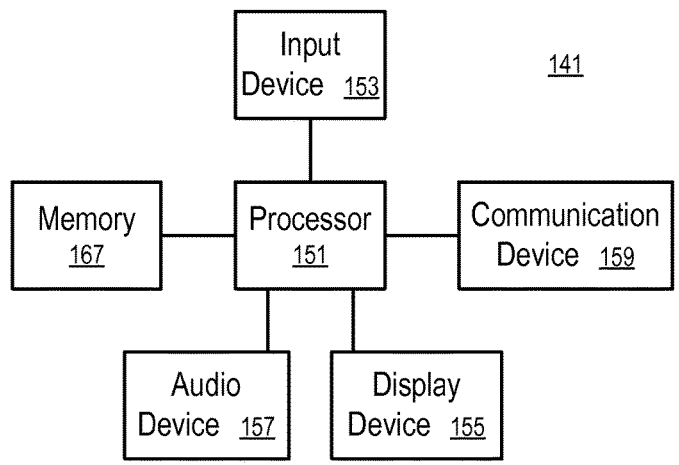
FIG. 12 illustrates an account identifying device according to one embodiment.
Figure 13:
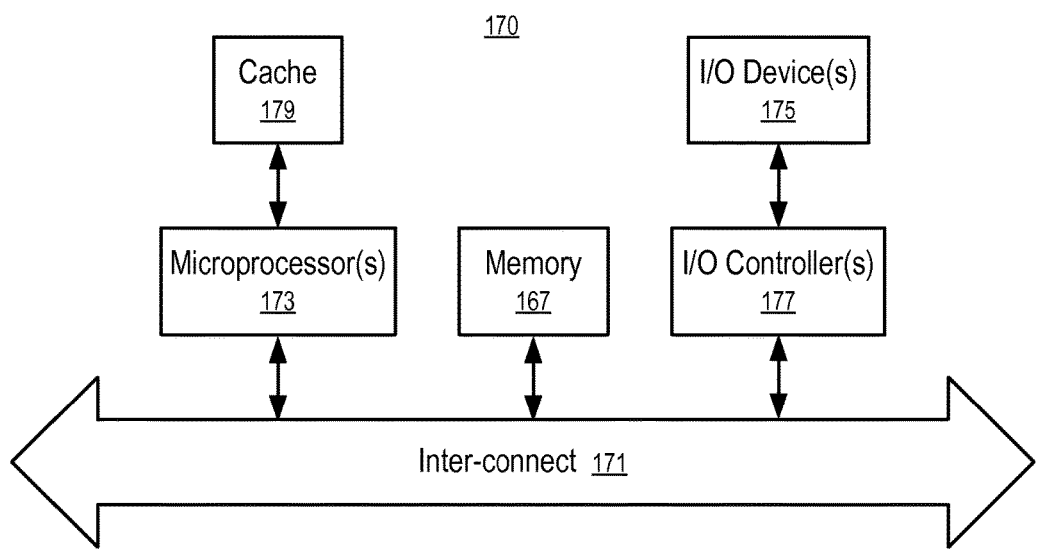
FIG. 13 illustrates a data processing system according to one embodiment.

FIGS. 11 and 12 illustrate examples of transaction terminals 105 and account identification devices 141. FIG. 13 illustrates the structure of a data processing system that can be used to implement, with more or fewer elements, at least some of the components in the system, such as the point of interaction 107, the transaction handler 103, the portal 143, the data warehouse, the account identification device 141, the transaction terminal 105, the user tracker 113, the profile generator 121, the profile selector 129, the advertisement selector 133, the media controller 115, etc. Some embodiments use more or fewer components than those illustrated in FIGS. 7 and 10-13, as further discussed in the section entitled "VARIATIONS."

In one embodiment, the transaction data 109 relates to financial transactions processed by the transaction handler 103; and the account data 111 relates to information about the account holders involved in the transactions. Further data, such as merchant data that relates to the location, business, products and/or services of the merchants that receive payments from account holders for their purchases, can be used in the generation of the transaction profiles (127, 341).

In one embodiment, the financial transactions are made via an account identification device 141, such as financial transaction cards (e.g., credit cards, debit cards, banking cards, etc.); the financial transaction cards may be embodied in various devices, such as plastic cards, chips, radio frequency identification (RFID) devices, mobile phones, personal digital assistants (PDAs), etc.; and the financial transaction cards may be represented by account identifiers (e.g., account numbers or aliases). In one embodiment, the financial transactions are made via directly using the account information 142, without physically presenting the account identification device 141.

Further features, modifications and details are provided in various sections of this description.

Centralized Data Warehouse

In one embodiment, the transaction handler 103 maintains a centralized data warehouse 149 organized around the transaction data 109. For example, the centralized data warehouse 149 may include, and/or support the determination of, spend band distribution, transaction count and amount, merchant categories, merchant by state, cardholder segmentation by velocity scores, and spending within merchant target, competitive set and cross-section.

In one embodiment, the centralized data warehouse 149 provides centralized management but allows decentralized execution. For example, a third party strategic marketing analyst, statistician, marketer, promoter, business leader, etc., may access the centralized data warehouse 149 to analyze customer and shopper data, to provide follow-up analyses of customer contributions, to develop propensity models for increased conversion of marketing campaigns, to develop segmentation models for marketing, etc. The centralized data warehouse 149 can be used to manage advertisement campaigns and analyze response profitability.

In one embodiment, the centralized data warehouse 149 includes merchant data (e.g., data about sellers), customer/business data (e.g., data about buyers), and transaction records 301 between sellers and buyers over time. The centralized data warehouse 149 can be used to support corporate sales forecasting, fraud analysis reporting, sales/customer relationship management (CRM) business intelligence, credit risk prediction and analysis, advanced authorization reporting, merchant benchmarking, business intelligence for small business, rewards, etc.

In one embodiment, the transaction data 109 is combined with external data, such as surveys, benchmarks, search engine statistics, demographics, competition information, emails, etc., to flag key events and data values, to set customer, merchant, data or event triggers, and to drive new transactions and new customer contacts.

Transaction Profile

In FIG. 7, the profile generator 121 generates transaction profiles 127 based on the transaction data 109, the account data 111, and/or other data, such as non-transactional data, wish lists, merchant provided information, address information, information from social network websites, information from credit bureaus, information from search engines, and other examples discussed in U.S. patent application Ser. No. 12/614,603, filed Nov. 9, 2009 and entitled "Analyzing Local Non-Transactional Data with Transactional Data in Predictive Models," the disclosure of which is hereby incorporated herein by reference.

In one embodiment, the transaction profiles 127 provide intelligence information on the behavior, pattern, preference, propensity, tendency, frequency, trend, and budget of the user 101 in making purchases. In one embodiment, the transaction profiles 127 include information about what the user 101 owns, such as points, miles, or other rewards currency, available credit, and received offers, such as coupons loaded into the accounts of the user 101. In one embodiment, the transaction profiles 127 include information based on past offer/coupon redemption patterns. In one embodiment, the transaction profiles 127 include information on shopping patterns in retail stores as well as online, including frequency of shopping, amount spent in each shopping trip, distance of merchant location (retail) from the address of the account holder(s), etc.

In one embodiment, the transaction handler 103 provides at least part of the intelligence for the prioritization, generation, selection, customization and/or adjustment of the advertisement for delivery within a transaction process involving the transaction handler 103. For example, the advertisement may be presented to a customer in response to the customer making a payment via the transaction handler 103.

Some of the transaction profiles 127 are specific to the user 101, or to an account of the user 101, or to a group of users of which the user 101 is a member, such as a household, family, company, neighborhood, city, or group identified by certain characteristics related to online activities, offline purchase activities, merchant propensity, etc.

In one embodiment, the profile generator 121 generates and updates the transaction profiles 127 in batch mode periodically. In other embodiments, the profile generator 121 generates the transaction profiles 127 in real-time, or just in time, in response to a request received in the portal 143 for such profiles.

In one embodiment, the transaction profiles 127 include the values for a set of parameters. Computing the values of the parameters may involve counting transactions that meet one or more criteria, and/or building a statistically-based model in which one or more calculated values or transformed values are put into a statistical algorithm that weights each value to optimize its collective predictiveness for various predetermined purposes.

Further details and examples about the transaction profiles 127 in one embodiment are provided in the section entitled "AGGREGATED SPENDING PROFILE."

Non-Transactional Data

In one embodiment, the transaction data 109 is analyzed in connection with non-transactional data to generate transaction profiles 127 and/or to make predictive models.

In one embodiment, transactions are correlated with non-transactional events, such as news, conferences, shows, announcements, market changes, natural disasters, etc. to establish cause and effect relations to predict future transactions or spending patterns. For example, non-transactional data may include the geographic location of a news event, the date of an event from an events calendar, the name of a performer for an upcoming concert, etc. The non-transactional data can be obtained from various sources, such as newspapers, websites, blogs, social networking sites, etc.

In one embodiment, when the cause and effect relationships between the transactions and non-transactional events are known (e.g., based on prior research results, domain knowledge, expertise), the relationships can be used in predictive models to predict future transactions or spending patterns, based on events that occurred recently or are happening in real-time.

In one embodiment, the non-transactional data relates to events that happened in a geographical area local to the user 101 that performed the respective transactions. In one embodiment, a geographical area is local to the user 101 when the distance from the user 101 to locations in the geographical area is within a convenient range for daily or regular travel, such as 20, 50 or 100 miles from an address of the user 101, or within the same city or zip code area of an address of the user 101. Examples of analyses of local non-transactional data in connection with transaction data 109 in one embodiment are provided in U.S. patent application Ser. No. 12/614,603, filed Nov. 9, 2009 and entitled "Analyzing Local Non-Transactional Data with Transactional Data in Predictive Models," the disclosure of which is hereby incorporated herein by reference.

In one embodiment, the non-transactional data is not limited to local non-transactional data. For example, national non-transactional data can also be used.

In one embodiment, the transaction records 301 are analyzed in frequency domain to identify periodic features in spending events. The periodic features in the past transaction records 301 can be used to predict the probability of a time window in which a similar transaction would occur. For example, the analysis of the transaction data 109 can be used to predict when a next transaction having the periodic feature would occur, with which merchant, the probability of a repeated transaction with a certain amount, the probability of exception, the opportunity to provide an advertisement or offer such as a coupon, etc. In one embodiment, the periodic features are detected through counting the number of occurrences of pairs of transactions that occurred within a set of predetermined time intervals and separating the transaction pairs based on the time intervals. Some examples and techniques for the prediction of future transactions based on the detection of periodic features in one embodiment are provided in U.S. patent application Ser. No. 12/773,770, filed May 4, 2010 and entitled "Frequency-Based Transaction Prediction and Processing," the disclosure of which is hereby incorporated herein by reference.

Techniques and details of predictive modeling in one embodiment are provided in U.S. Pat. Nos. 6,119,103, 6,018,723, 6,658,393, 6,598,030, and 7,227,950, the disclosures of which are hereby incorporated herein by reference.

In one embodiment, offers are based on the point-of-service to offeree distance to allow the user 101 to obtain in-person services. In one embodiment, the offers are selected based on transaction history and shopping patterns in the transaction data 109 and/or the distance between the user 101 and the merchant. In one embodiment, offers are provided in response to a request from the user 101, or in response to a detection of the location of the user 101. Examples and details of at least one embodiment are provided in U.S. patent application Ser. No. 11/767,218, filed Jun. 22, 2007, assigned Pub. No. 2008/0319843, and entitled "Supply of Requested Offer Based on Point-of Service to Offeree Distance," U.S. patent application Ser. No. 11/755,575, filed May 30, 2007, assigned Pub. No. 2008/0300973, and entitled "Supply of Requested Offer Based on Offeree Transaction History," U.S. patent application Ser. No. 11/855,042, filed Sep. 13, 2007, assigned Pub. No. 2009/0076896, and entitled "Merchant Supplied Offer to a Consumer within a Predetermined Distance," U.S. patent application Ser. No. 11/855,069, filed Sep. 13, 2007, assigned Pub. No. 2009/0076925, and entitled "Offeree Requested Offer Based on Point-of Service to Offeree Distance," and U.S. patent application Ser. No. 12/428,312, filed Apr. 22, 2009 and entitled "Receiving an Announcement Triggered by Location Data," the disclosures of which applications are hereby incorporated herein by reference.

Targeting Advertisement

In FIG. 7, an advertisement selector 133 prioritizes, generates, selects, adjusts, and/or customizes the available advertisement data 135 to provide user specific advertisement data 119 based at least in part on the user specific profile 131. The advertisement selector 133 uses the user specific profile 131 as a filter and/or a set of criteria to generate, identify, select and/or prioritize advertisement data for the user 101. A media controller 115 delivers the user specific advertisement data 119 to the point of interaction 107 for presentation to the user 101 as the targeted and/or personalized advertisement.

In one embodiment, the user data 125 includes the characterization of the context at the point of interaction 107. Thus, the use of the user specific profile 131, selected using the user data 125, includes the consideration of the context at the point of interaction 107 in selecting the user specific advertisement data 119.

In one embodiment, in selecting the user specific advertisement data 119, the advertisement selector 133 uses not only the user specific profile 131, but also information regarding the context at the point of interaction 107. For example, in one embodiment, the user data 125 includes information regarding the context at the point of interaction 107; and the advertisement selector 133 explicitly uses the context information in the generation or selection of the user specific advertisement data 119.

In one embodiment, the advertisement selector 133 may query for specific information regarding the user 101 before providing the user specific advertisement data 119. The queries may be communicated to the operator of the transaction handler 103 and, in particular, to the transaction handler 103 or the profile generator 121. For example, the queries from the advertisement selector 133 may be transmitted and received in accordance with an application programming interface or other query interface of the transaction handler 103, the profile generator 121 or the portal 143 of the transaction handler 103.

In one embodiment, the queries communicated from the advertisement selector 133 may request intelligence information regarding the user 101 at any level of specificity (e.g., segment level, individual level). For example, the queries may include a request for a certain field or type of information in a cardholder's aggregate spending profile 341. As another example, the queries may include a request for the spending level of the user 101 in a certain merchant category over a prior time period (e.g., six months).

In one embodiment, the advertisement selector 133 is operated by an entity that is separate from the entity that operates the transaction handler 103. For example, the advertisement selector 133 may be operated by a search engine, a publisher, an advertiser, an ad network, or an online merchant. The user specific profile 131 is provided to the advertisement selector 133 to assist the customization of the user specific advertisement data 119.

In one embodiment, advertising is targeted based on shopping patterns in a merchant category (e.g., as represented by a Merchant Category Code (MCC)) that has high correlation of spending propensity with other merchant categories (e.g., other MCCs). For example, in the context of a first MCC for a targeted audience, a profile identifying second MCCs that have high correlation of spending propensity with the first MCC can be used to select advertisements for the targeted audience.

In one embodiment, the aggregated spending profile 341 is used to provide intelligence information about the spending patterns, preferences, and/or trends of the user 101. For example, a predictive model can be established based on the aggregated spending profile 341 to estimate the needs of the user 101. For example, the factor values 344 and/or the cluster ID 343 in the aggregated spending profile 341 can be used to determine the spending preferences of the user 101. For example, the channel distribution 345 in the aggregated spending profile 341 can be used to provide a customized offer targeted for a particular channel, based on the spending patterns of the user 101.

In one embodiment, mobile advertisements, such as offers and coupons, are generated and disseminated based on aspects of prior purchases, such as timing, location, and nature of the purchases, etc. In one embodiment, the size of the benefit of the offer or coupon is based on purchase volume or spending amount of the prior purchase and/or the subsequent purchase that may qualify for the redemption of the offer. Further details and examples of one embodiment are provided in U.S. patent application Ser. No. 11/960,162, filed Dec. 19, 2007, assigned Pub. No. 2008/0201226, and entitled "Mobile Coupon Method and Portable Consumer Device for Utilizing Same," the disclosure of which is hereby incorporated herein by reference.

In one embodiment, conditional rewards are provided to the user 101; and the transaction handler 103 monitors the transactions of the user 101 to identify redeemable rewards that have satisfied the respective conditions. In one embodiment, the conditional rewards are selected based on transaction data 109. Further details and examples of one embodiment are provided in U.S. patent application Ser. No. 11/862,487, filed Sep. 27, 2007 and entitled "Consumer Specific Conditional Rewards," the disclosure of which is hereby incorporated herein by reference. The techniques to detect the satisfied conditions of conditional rewards can also be used to detect the transactions that satisfy the conditions specified to locate the transactions that result from online activities, such as online advertisements, searches, etc., to correlate the transactions with the respective online activities.

Further details about targeted offer delivery in one embodiment are provided n U.S. patent application Ser. No. 12/185,332, filed Aug. 4, 2008, assigned Pub. No. 2010/0031644, and entitled "Targeted Advertising by Payment Processor History of Cashless Acquired Merchant Transaction on Issued Consumer Account," and in U.S. patent application Ser. No. 12/849,793, filed Aug. 3, 2010 and entitled "Systems and Methods for Targeted Advertisement Delivery," the disclosures of which are hereby incorporated herein by reference.

Profile Matching

In FIG. 7, the user tracker 113 obtains and generates context information about the user 101 at the point of interaction 107, including user data 125 that characterizes and/or identifies the user 101. The profile selector 129 selects a user specific profile 131 from the set of transaction profiles 127 generated by the profile generator 121, based on matching the characteristics of the transaction profiles 127 and the characteristics of the user data 125. For example, the user data 125 indicates a set of characteristics of the user 101; and the profile selector 129 selects the user specific profile 131 that is for a particular user or a group of users and that best matches the set of characteristics specified by the user data 125.

In one embodiment, the profile selector 129 receives the transaction profiles 127 in a batch mode. The profile selector 129 selects the user specific profile 131 from the batch of transaction profiles 127 based on the user data 125. Alternatively, the profile generator 121 generates the transaction profiles 127 in real-time; and the profile selector 129 uses the user data 125 to query the profile generator 121 to generate the user specific profile 131 in real-time, or just in time. The profile generator 121 generates the user specific profile 131 that best matches the user data 125.

In one embodiment, the user tracker 113 identifies the user 101 based on the user activity on the transaction terminal 105 (e.g., having visited a set of websites, currently visiting a type of web pages, search behavior, etc.).

In one embodiment, the user data 125 includes an identifier of the user 101, such as a global unique identifier (GUID), a personal account number (PAN) (e.g., credit card number, debit card number, or other card account number), or other identifiers that uniquely and persistently identify the user 101 within a set of identifiers of the same type. Alternatively, the user data 125 may include other identifiers, such as an Internet Protocol (IP) address of the user 101, a name or user name of the user 101, or a browser cookie ID, which identify the user 101 in a local, temporary, transient and/or anonymous manner. Some of these identifiers of the user 101 may be provided by publishers, advertisers, ad networks, search engines, merchants, or the user tracker 113. In one embodiment, such identifiers are correlated to the user 101 based on the overlapping or proximity of the time period of their usage to establish an identification reference table.

In one embodiment, the identification reference table is used to identify the account information 142 (e.g., account number 312) based on characteristics of the user 101 captured in the user data 125, such as browser cookie ID, IP addresses, and/or timestamps on the usage of the IP addresses. In one embodiment, the identification reference table is maintained by the operator of the transaction handler 103. Alternatively, the identification reference table is maintained by an entity other than the operator of the transaction handler 103.

In one embodiment, the user tracker 113 determines certain characteristics of the user 101 to describe a type or group of users of which the user 101 is a member. The transaction profile of the group is used as the user specific profile 131. Examples of such characteristics include geographical location or neighborhood, types of online activities, specific online activities, or merchant propensity. In one embodiment, the groups are defined based on aggregate information (e.g., by time of day, or household), or segment (e.g., by cluster, propensity, demographics, cluster IDs, and/or factor values). In one embodiment, the groups are defined in part via one or more social networks. For example, a group may be defined based on social distances to one or more users on a social network website, interactions between users on a social network website, and/or common data in social network profiles of the users in the social network website.

In one embodiment, the user data 125 may match different profiles at a different granularity or resolution (e.g., account, user, family, company, neighborhood, etc.), with different degrees of certainty. The profile selector 129 and/or the profile generator 121 may determine or select the user specific profile 131 with the finest granularity or resolution with acceptable certainty. Thus, the user specific profile 131 is most specific or closely related to the user 101.

In one embodiment, the advertisement selector 133 uses further data in prioritizing, selecting, generating, customizing and adjusting the user specific advertisement data 119. For example, the advertisement selector 133 may use search data in combination with the user specific profile 131 to provide benefits or offers to a user 101 at the point of interaction 107. For example, the user specific profile 131 can be used to personalize the advertisement, such as adjusting the placement of the advertisement relative to other advertisements, adjusting the appearance of the advertisement, etc.

Browser Cookie

In one embodiment, the user data 125 uses browser cookie information to identify the user 101. The browser cookie information is matched to account information 142 or the account number 312 to identify the user specific profile 131, such as aggregated spending profile 341 to present effective, timely, and relevant marketing information to the user 101, via the preferred communication channel (e.g., mobile communications, web, mail, email, POS, etc.) within a window of time that could influence the spending behavior of the user 101. Based on the transaction data 109, the user specific profile 131 can improve audience targeting for online advertising. Thus, customers will get better advertisements and offers presented to them; and the advertisers will achieve better return-on-investment for their advertisement campaigns.

In one embodiment, the browser cookie that identifies the user 101 in online activities, such as web browsing, online searching, and using social networking applications, can be matched to an identifier of the user 101 in account data 111, such as the account number 312 of a financial payment card of the user 101 or the account information 142 of the account identification device 141 of the user 101. In one embodiment, the identifier of the user 101 can be uniquely identified via matching IP address, timestamp, cookie ID and/or other user data 125 observed by the user tracker 113.

In one embodiment, a look up table is used to map browser cookie information (e.g., IP address, timestamp, cookie ID) to the account data 111 that identifies the user 101 in the transaction handler 103. The look up table may be established via correlating overlapping or common portions of the user data 125 observed by different entities or different user trackers 113.

For example, in one embodiment, a first user tracker 113 observes the card number of the user 101 at a particular IP address for a time period identified by a timestamp (e.g., via an online payment process); a second user tracker 113 observes the user 101 having a cookie ID at the same IP address for a time period near or overlapping with the time period observed by the first user tracker 113. Thus, the cookie ID as observed by the second user tracker 113 can be linked to the card number of the user 101 as observed by the first user tracker 113. The first user tracker 113 may be operated by the same entity operating the transaction handler 103 or by a different entity. Once the correlation between the cookie ID and the card number is established via a database or a look up table, the cookie ID can be subsequently used to identify the card number of the user 101 and the account data 111.

In one embodiment, the portal 143 is configured to observe a card number of a user 101 while the user 101 uses an IP address to make an online transaction. Thus, the portal 143 can identify a consumer account 146 based on correlating an IP address used to identify the user 101 and IP addresses recorded in association with the consumer account 146.

For example, in one embodiment, when the user 101 makes a payment online by submitting the account information 142 to the transaction terminal 105 (e.g., an online store), the transaction handler 103 obtains the IP address from the transaction terminal 105 via the acquirer processor 147. The transaction handler 103 stores data to indicate the use of the account information 142 at the IP address at the time of the transaction request. When an IP address in the query received in the portal 143 matches the IP address previously recorded by the transaction handler 103, the portal 143 determines that the user 101 identified by the IP address in the request is the same user 101 associated with the account of the transaction initiated at the IP address. In one embodiment, a match is found when the time of the query request is within a predetermined time period from the transaction request, such as a few minutes, one hour, a day, etc. In one embodiment, the query may also include a cookie ID representing the user 101. Thus, through matching the IP address, the cookie ID is associated with the account information 142 in a persistent way.

In one embodiment, the portal 143 obtains the IP address of the online transaction directly. For example, in one embodiment, a user 101 chooses to use a password in the account data 111 to protect the account information 142 for online transactions. When the account information 142 is entered into the transaction terminal 105 (e.g., an online store or an online shopping cart system), the user 101 is connected to the portal 143 for the verification of the password (e.g., via a pop up window, or via redirecting the web browser of the user 101). The transaction handler 103 accepts the transaction request after the password is verified via the portal 143. Through this verification process, the portal 143 and/or the transaction handler 103 obtain the IP address of the user 101 at the time the account information 142 is used.

In one embodiment, the web browser of the user 101 communicates the user provided password to the portal 143 directly without going through the transaction terminal 105 (e.g., the server of the merchant). Alternatively, the transaction terminal 105 and/or the acquirer processor 147 may relay the password communication to the portal 143 or the transaction handler 103.

In one embodiment, the portal 143 is configured to identify the consumer account 146 based on the IP address identified in the user data 125 through mapping the IP address to a street address. For example, in one embodiment, the user data 125 includes an IP address to identify the user 101; and the portal 143 can use a service to map the IP address to a street address. For example, an Internet service provider knows the street address of the currently assigned IP address. Once the street address is identified, the portal 143 can use the account data 111 to identify the consumer account 146 that has a current address at the identified street address. Once the consumer account 146 is identified, the portal 143 can provide a transaction profile 131 specific to the consumer account 146 of the user 101.

In one embodiment, the portal 143 uses a plurality of methods to identify consumer accounts 146 based on the user data 125. The portal 143 combines the results from the different methods to determine the most likely consumer account 146 for the user data 125.

Details about the identification of consumer account 146 based on user data 125 in one embodiment are provided in U.S. patent application Ser. No. 12/849,798, filed Aug. 3, 2010 and entitled "Systems and Methods to Match Identifiers," the disclosure of which is hereby incorporated herein by reference.

Close the Loop

In one embodiment, the correlator 117 is used to "close the loop" for the tracking of consumer behavior across an on-line activity and an "off-line" activity that results at least in part from the on-line activity. In one embodiment, online activities, such as searching, web browsing, social networking, and/or consuming online advertisements, are correlated with respective transactions to generate the correlation result 123 in FIG. 7. The respective transactions may occur offline, in "brick and mortar" retail stores, or online but in a context outside the online activities, such as a credit card purchase that is performed in a way not visible to a search company that facilitates the search activities.

In one embodiment, the correlator 117 is to identify transactions resulting from searches or online advertisements. For example, in response to a query about the user 101 from the user tracker 113, the correlator 117 identifies an offline transaction performed by the user 101 and sends the correlation result 123 about the offline transaction to the user tracker 113, which allows the user tracker 113 to combine the information about the offline transaction and the online activities to provide significant marketing advantages.

For example, a marketing department could correlate an advertising budget to actual sales. For example, a marketer can use the correlation result 123 to study the effect of certain prioritization strategies, customization schemes, etc. on the impact on the actual sales. For example, the correlation result 123 can be used to adjust or prioritize advertisement placement on a web site, a search engine, a social networking site, an online marketplace, or the like.

In one embodiment, the profile generator 121 uses the correlation result 123 to augment the transaction profiles 127 with data indicating the rate of conversion from searches or advertisements to purchase transactions. In one embodiment, the correlation result 123 is used to generate predictive models to determine what a user 101 is likely to purchase when the user 101 is searching using certain keywords or when the user 101 is presented with an advertisement or offer. In one embodiment, the portal 143 is configured to report the correlation result 123 to a partner, such as a search engine, a publisher, or a merchant, to allow the partner to use the correlation result 123 to measure the effectiveness of advertisements and/or search result customization, to arrange rewards, etc.

Illustratively, a search engine entity may display a search page with particular advertisements for flat panel televisions produced by companies A, B, and C. The search engine entity may then compare the particular advertisements presented to a particular consumer with transaction data of that consumer and may determine that the consumer purchased a flat panel television produced by Company B. The search engine entity may then use this information and other information derived from the behavior of other consumers to determine the effectiveness of the advertisements provided by companies A, B, and C. The search engine entity can determine if the placement, the appearance, or other characteristic of the advertisement results in actual increased sales. Adjustments to advertisements (e.g., placement, appearance, etc.) may be made to facilitate maximum sales.

In one embodiment, the correlator 117 matches the online activities and the transactions based on matching the user data 125 provided by the user tracker 113 and the records of the transactions, such as transaction data 109 or transaction records 301. In another embodiment, the correlator 117 matches the online activities and the transactions based on the redemption of offers/benefits provided in the user specific advertisement data 119.

In one embodiment, the portal 143 is configured to receive a set of conditions and an identification of the user 101, determine whether there is any transaction of the user 101 that satisfies the set of conditions, and if so, provide indications of the transactions that satisfy the conditions and/or certain details about the transactions, which allows the requester to correlate the transactions with certain user activities, such as searching, web browsing, consuming advertisements, etc.

In one embodiment, the requester may not know the account number 312 of the user 101; and the portal 143 is to map the identifier provided in the request to the account number 312 of the user 101 to provide the requested information. Examples of the identifier being provided in the request to identify the user 101 include an identification of an iFrame of a web page visited by the user 101, a browser cookie ID, an IP address and the day and time corresponding to the use of the IP address, etc.

The information provided by the portal 143 can be used in pre-purchase marketing activities, such as customizing content or offers, prioritizing content or offers, selecting content or offers, etc., based on the spending pattern of the user 101. The content that is customized, prioritized, selected, or recommended may be the search results, blog entries, items for sale, etc.

The information provided by the portal 143 can be used in post-purchase activities. For example, the information can be used to correlate an offline purchase with online activities. For example, the information can be used to determine purchases made in response to media events, such as television programs, advertisements, news announcements, etc.

Details about profile delivery, online activity to offline purchase tracking, techniques to identify the user specific profile 131 based on user data 125 (such as IP addresses), and targeted delivery of advertisement/offer/benefit in some embodiments are provided in U.S. patent application Ser. No. 12/849,789, filed Aug. 3, 2010 and entitled "Systems and Methods for Closing the Loop between Online Activities and Offline Purchases," the disclosure of which application is incorporated herein by reference.

Matching Advertisement & Transaction

In one embodiment, the correlator 117 is configured to receive information about the user specific advertisement data 119, monitor the transaction data 109, identify transactions that can be considered results of the advertisement corresponding to the user specific advertisement data 119, and generate the correlation result 123, as illustrated in FIG. 7.

When the advertisement and the corresponding transaction both occur in an online checkout process, a website used for the online checkout process can be used to correlate the transaction and the advertisement. However, the advertisement and the transaction may occur in separate processes and/or under control of different entities (e.g., when the purchase is made offline at a retail store, while the advertisement is presented outside the retail store). In one embodiment, the correlator 117 uses a set of correlation criteria to identify the transactions that can be considered as the results of the advertisements.

In one embodiment, the correlator 117 identifies the transactions linked or correlated to the user specific advertisement data 119 based on various criteria. For example, the user specific advertisement data 119 may include a coupon offering a benefit contingent upon a purchase made according to the user specific advertisement data 119. The use of the coupon identifies the user specific advertisement data 119, and thus allows the correlator 117 to correlate the transaction with the user specific advertisement data 119.

In one embodiment, the user specific advertisement data 119 is associated with the identity or characteristics of the user 101, such as global unique identifier (GUID), personal account number (PAN), alias, IP address, name or user name, geographical location or neighborhood, household, user group, and/or user data 125. The correlator 117 can link or match the transactions with the advertisements based on the identity or characteristics of the user 101 associated with the user specific advertisement data 119. For example, the portal 143 may receive a query identifying the user data 125 that tracks the user 101 and/or characteristics of the user specific advertisement data 119; and the correlator 117 identifies one or more transactions matching the user data 125 and/or the characteristics of the user specific advertisement data 119 to generate the correlation result 123.

In one embodiment, the correlator 117 identifies the characteristics of the transactions and uses the characteristics to search for advertisements that match the transactions. Such characteristics may include GUID, PAN, IP address, card number, browser cookie information, coupon, alias, etc.

In FIG. 7, the profile generator 121 uses the correlation result 123 to enhance the transaction profiles 127 generated from the profile generator 121. The correlation result 123 provides details on the purchases and/or indicates the effectiveness of the user specific advertisement data 119.

In one embodiment, the correlation result 123 is used to demonstrate to the advertisers the effectiveness of the advertisements, to process incentive or rewards associated with the advertisements, to obtain at least a portion of advertisement revenue based on the effectiveness of the advertisements, to improve the selection of advertisements, etc.

Coupon Matching

In one embodiment, the correlator 117 identifies a transaction that is a result of an advertisement (e.g., 119) when an offer or benefit provided in the advertisement is redeemed via the transaction handler 103 in connection with a purchase identified in the advertisement.

For example, in one embodiment, when the offer is extended to the user 101, information about the offer can be stored in association with the account of the user 101 (e.g., as part of the account data 111). The user 101 may visit the portal 143 of the transaction handler 103 to view the stored offer.

The offer stored in the account of the user 101 may be redeemed via the transaction handler 103 in various ways. For example, in one embodiment, the correlator 117 may download the offer to the transaction terminal 105 via the transaction handler 103 when the characteristics of the transaction at the transaction terminal 105 match the characteristics of the offer.

After the offer is downloaded to the transaction terminal 105, the transaction terminal 105 automatically applies the offer when the condition of the offer is satisfied in one embodiment. Alternatively, the transaction terminal 105 allows the user 101 to selectively apply the offers downloaded by the correlator 117 or the transaction handler 103. In one embodiment, the correlator 117 sends reminders to the user 101 at a separate point of interaction 107 (e.g., a mobile phone) to remind the user 101 to redeem the offer. In one embodiment, the transaction handler 103 applies the offer (e.g., via statement credit), without having to download the offer (e.g., coupon) to the transaction terminal 105. Examples and details of redeeming offers via statement credit are provided in U.S. patent application Ser. No. 12/566,350, filed Sep. 24, 2009 and entitled "Real-Time Statement Credits and Notifications," the disclosure of which is hereby incorporated herein by reference.

In one embodiment, the offer is captured as an image and stored in association with the account of the user 101. Alternatively, the offer is captured in a text format (e.g., a code and a set of criteria), without replicating the original image of the coupon.

In one embodiment, when the coupon is redeemed, the advertisement presenting the coupon is correlated with a transaction in which the coupon is redeemed, and/or is determined to have resulted in a transaction. In one embodiment, the correlator 117 identifies advertisements that have resulted in purchases, without having to identify the specific transactions that correspond to the advertisements.

Details about offer redemption via the transaction handler 103 in one embodiment are provided in U.S. patent application Ser. No. 12/849,801, filed Aug. 3, 2010 and entitled "Systems and Methods for Multi-Channel Offer Redemption," the disclosure of which is hereby incorporated herein by reference.

On ATM & POS Terminal

In one example, the transaction terminal 105 is an automatic teller machine (ATM), which is also the point of interaction 107. When the user 101 approaches the ATM to make a transaction (e.g., to withdraw cash via a credit card or debit card), the ATM transmits account information 142 to the transaction handler 103. The account information 142 can also be considered as the user data 125 to select the user specific profile 131. The user specific profile 131 can be sent to an advertisement network to query for a targeted advertisement. After the advertisement network matches the user specific profile 131 with user specific advertisement data 119 (e.g., a targeted advertisement), the transaction handler 103 may send the advertisement to the ATM, together with the authorization for cash withdrawal.

In one embodiment, the advertisement shown on the ATM includes a coupon that offers a benefit that is contingent upon the user 101 making a purchase according to the advertisement. The user 101 may view the offer presented on a white space on the ATM screen and select to load or store the coupon in a storage device of the transaction handler 103 under the account of the user 101. The transaction handler 103 communicates with the bank to process the cash withdrawal. After the cash withdrawal, the ATM prints the receipt which includes a confirmation of the coupon, or a copy of the coupon. The user 101 may then use the coupon printed on the receipt. Alternatively, when the user 101 uses the same account to make a relevant purchase, the transaction handler 103 may automatically apply the coupon stored under the account of the user 101, or automatically download the coupon to the relevant transaction terminal 105, or transmit the coupon to the mobile phone of the user 101 to allow the user 101 to use the coupon via a display of the coupon on the mobile phone. The user 101 may visit a web portal 143 of the transaction handler 103 to view the status of the coupons collected in the account of the user 101.

In one embodiment, the advertisement is forwarded to the ATM via the data stream for authorization. In another embodiment, the ATM makes a separate request to a server of the transaction handler 103 (e.g., a web portal) to obtain the advertisement. Alternatively, or in combination, the advertisement (including the coupon) is provided to the user 101 at separate, different points of interactions, such as via a text message to a mobile phone of the user 101, via an email, via a bank statement, etc.

Details of presenting targeted advertisements on ATMs based on purchasing preferences and location data in one embodiment are provided in U.S. patent application Ser. No. 12/266,352, filed Nov. 6, 2008 and entitled "System Including Automated Teller Machine with Data Bearing Medium," the disclosure of which is hereby incorporated herein by reference.

In another example, the transaction terminal 105 is a point of sale (POS) terminal at the checkout station in a retail store (e.g., a self-service checkout register). When the user 101 pays for a purchase via a payment card (e.g., a credit card or a debit card), the transaction handler 103 provides a targeted advertisement having a coupon obtained from an advertisement network. The user 101 may load the coupon into the account of the payment card and/or obtain a hardcopy of the coupon from the receipt. When the coupon is used in a transaction, the advertisement is linked to the transaction.

Details of presenting targeted advertisements during the process of authorizing a financial payment card transaction in one embodiment are provided in U.S. patent application Ser. No. 11/799,549, filed May 1, 2007, assigned Pub. No. 2008/0275771, and entitled "Merchant Transaction Based Advertising," the disclosure of which is hereby incorporated herein by reference.

In one embodiment, the user specific advertisement data 119, such as offers or coupons, is provided to the user 101 via the transaction terminal 105 in connection with an authorization message during the authorization of a transaction processed by the transaction handler 103. The authorization message can be used to communicate the rewards qualified for by the user 101 in response to the current transaction, the status and/or balance of rewards in a loyalty program, etc. Examples and details related to the authorization process in one embodiment are provided in U.S. patent application Ser. No. 11/266,766, filed Nov. 2, 2005, assigned Pub. No. 2007/0100691, and entitled "Method and System for Conducting Promotional Programs," the disclosure of which is hereby incorporated herein by reference.

In one embodiment, when the user 101 is conducting a transaction with a first merchant via the transaction handler 103, the transaction handler 103 may determine whether the characteristics of the transaction satisfy the conditions specified for an announcement, such as an advertisement, offer or coupon, from a second merchant. If the conditions are satisfied, the transaction handler 103 provides the announcement to the user 101. In one embodiment, the transaction handler 103 may auction the opportunity to provide the announcements to a set of merchants. Examples and details related to the delivery of such announcements in one embodiment are provided in U.S. patent application Ser. No. 12/428,241, filed Apr. 22, 2009 and entitled "Targeting Merchant Announcements Triggered by Consumer Activity Relative to a Surrogate Merchant," the disclosure of which is hereby incorporated herein by reference.

On Third Party Site

In a further example, the user 101 may visit a third party website, which is the point of interaction 107 in FIG. 7. The third party website may be a web search engine, a news website, a blog, a social network site, etc. The behavior of the user 101 at the third party website may be tracked via a browser cookie, which uses a storage space of the browser to store information about the user 101 at the third party website. Alternatively, or in combination, the third party website uses the server logs to track the activities of the user 101. In one embodiment, the third party website may allow an advertisement network to present advertisements on portions of the web pages. The advertisement network tracks the user behavior using its server logs and/or browser cookies. For example, the advertisement network may use a browser cookie to identify a particular user across multiple websites. Based on the referral uniform resource locators (URL) that cause the advertisement network to load advertisements in various web pages, the advertisement network can determine the online behavior of the user 101 via analyzing the web pages that the user 101 has visited. Based on the tracked online activities of the user 101, the user data 125 that characterizes the user 101 can be formed to query the profiler selector 129 for a user specific profile 131.

In one embodiment, the cookie identity of the user 101 as tracked using the cookie can be correlated to an account of the user 101, the family of the user 101, the company of the user 101, or other groups that include the user 101 as a member. Thus, the cookie identity can be used as the user data 125 to obtain the user specific profile 131. For example, when the user 101 makes an online purchase from a web page that contains an advertisement that is tracked with the cookie identity, the cookie identity can be correlated to the online transaction and thus to the account of the user 101. For example, when the user 101 visits a web page after authentication of the user 101, and the web page includes an advertisement from the advertisement network, the cookie identity can be correlated to the authenticated identity of the user 101. For example, when the user 101 signs in to a web portal of the transaction handler 103 to access the account of the user 101, the cookie identity used by the advertisement network on the web portal can be correlated to the account of the user 101.

Other online tracking techniques can also be used to correlate the cookie identity of the user 101 with an identifier of the user 101 known by the profile selector 129, such as a GUID, PAN, account number, customer number, social security number, etc. Subsequently, the cookie identity can be used to select the user specific profile 131.

Multiple Communications

In one embodiment, the entity operating the transaction handler 103 may provide intelligence for providing multiple communications regarding an advertisement. The multiple communications may be directed to two or more points of interaction with the user 101.

For example, after the user 101 is provided with an advertisement via the transaction terminal 105, reminders or revisions to the advertisements can be sent to the user 101 via a separate point of interaction 107, such as a mobile phone, email, text message, etc. For example, the advertisement may include a coupon to offer the user 101 a benefit contingent upon a purchase. If the correlator 117 determines that the coupon has not been redeemed, the correlator 117 may send a message to the mobile phone of the user 101 to remind the user 101 about the offer, and/or revise the offer.

Examples of multiple communications related to an offer in one embodiment are provided in U.S. patent application Ser. No. 12/510,167, filed Jul. 27, 2009 and entitled "Successive Offer Communications with an Offer Recipient," the disclosure of which is hereby incorporated herein by reference.

Auction Engine

In one embodiment, the transaction handler 103 provides a portal to allow various clients to place bids according to clusters (e.g., to target entities in the clusters for marketing, monitoring, researching, etc.)

For example, the cardholders may register in a program to receive offers, such as promotions, discounts, sweepstakes, reward points, direct mail coupons, email coupons, etc. The cardholders may register with issuers, or with the portal 143 of the transaction handler 103. Based on the transaction data 109 or transaction records 301 and/or the registration data, the profile generator 121 is to identify the clusters of cardholders and the values representing the affinity of the cardholders to the clusters. Various entities may place bids according to the clusters and/or the values to gain access to the cardholders, such as the user 101. For example, an issuer may bid on access to offers; an acquirer and/or a merchant may bid on customer segments. An auction engine receives the bids and awards segments and offers based on the received bids. Thus, the customers can get great deals; and merchants can get customer traffic and thus sales.

Some techniques to identify a segment of users 101 for marketing are provided in U.S. patent application Ser. No. 12/288,490, filed Oct. 20, 2008, assigned Pub. No. 2009/0222323, and entitled "Opportunity Segmentation," U.S. patent application Ser. No. 12/108,342, filed Apr. 23, 2008, assigned Pub. No. 2009/0271305, and entitled "Payment Portfolio Optimization," and U.S. patent application Ser. No. 12/108,354, filed Apr. 23, 2008, assigned Pub. No. 2009/0271327, and entitled "Payment Portfolio Optimization," the disclosures of which applications are hereby incorporated herein by reference.

Social Network Validation

In one embodiment, the transaction data 109 is combined with social network data and/or search engine data to provide benefits (e.g., coupons) to a consumer. For example, a data exchange apparatus may identify cluster data based upon consumer search engine data, social network data, and payment transaction data to identify like groups of individuals who would respond favorably to particular types of benefits such as coupons and statement credits. Advertisement campaigns may be formulated to target the cluster of cardholders.

In one embodiment, search engine data is combined with social network data and/or the transaction data 109 to evaluate the effectiveness of the advertisements and/or conversion pattern of the advertisements. For example, after a search engine displays advertisements about flat panel televisions to a consumer, a social network that is used by a consumer may provide information about a related purchase made by the consumer. For example, the blog of the consumer, and/or the transaction data 109, may indicate that the flat panel television purchased by the consumer is from company B. Thus, the search engine data and the social network data and/or the transaction data 109 can be combined to correlate advertisements to purchases resulting from the advertisements and to determine the conversion pattern of the advertisement to the consumer. Adjustments to advertisements (e.g., placement, appearance, etc.) can be made to improve the effectiveness of the advertisements and thus increase sales.

Loyalty Program

In one embodiment, the transaction handler 103 uses the account data 111 to store information for third party loyalty programs. The transaction handler 103 processes payment transactions made via financial transaction cards, such as credit cards, debit cards, banking cards, etc.; and the financial transaction cards can be used as loyalty cards for the respective third party loyalty programs. Since the third party loyalty programs are hosted on the transaction handler 103, the consumers do not have to carry multiple, separate loyalty cards (e.g., one for each merchant that offers a loyalty program); and the merchants do not have to spend a large setup and investment fee to establish the loyalty program. The loyalty programs hosted on the transaction handler 103 can provide flexible awards for consumers, retailers, manufacturers, issuers, and other types of business entities involved in the loyalty programs. The integration of the loyalty programs into the accounts of the customers on the transaction handler 103 allows new offerings, such as merchant cross-offerings or bundling of loyalty offerings.

In one embodiment, an entity operating the transaction handler 103 hosts loyalty programs for third parties using the account data 111 of the users (e.g., 101). A third party, such as a merchant, a retailer, a manufacturer, an issuer or other entity that is interested in promoting certain activities and/or behaviors, may offer loyalty rewards on existing accounts of consumers. The incentives delivered by the loyalty programs can drive behavior changes without the hassle of loyalty card creation. In one embodiment, the loyalty programs hosted via the accounts of the users (e.g., 101) of the transaction handler 103 allow the consumers to carry fewer cards and may provide more data to the merchants than traditional loyalty programs.

The loyalty programs integrated with the accounts of the users (e.g., 101) of the transaction handler 103 can provide tools to enable nimble programs that are better aligned for driving changes in consumer behaviors across transaction channels (e.g., online, offline, via mobile devices). The loyalty programs can be ongoing programs that accumulate benefits for the customers (e.g., points, miles, cash back), and/or programs that provide one time benefits or limited time benefits (e.g., rewards, discounts, incentives).

Figure 14:
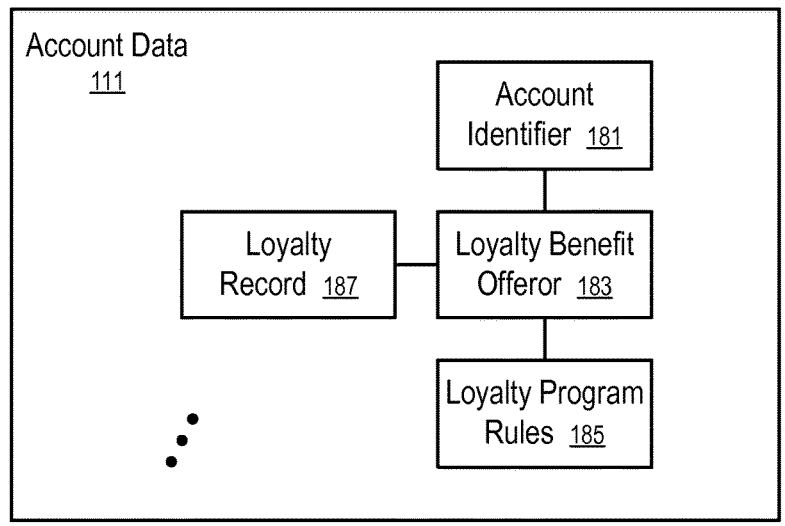
FIG. 14 shows the structure of account data for providing loyalty programs according to one embodiment.

FIG. 14 shows the structure of account data 111 for providing loyalty programs according to one embodiment. In FIG. 14, data related to a third party loyalty program may include an identifier of the loyalty benefit offeror 183 that is linked to a set of loyalty program rules 185 and loyalty record 187 for the loyalty program activities of the account identifier 181. In one embodiment, at least part of the data related to the third party loyalty program is stored under the account identifier 181 of the user 101, such as the loyalty record 187.

FIG. 14 illustrates the data related to one third party loyalty program of a loyalty benefit offeror 183. In one embodiment, the account identifier 181 may be linked to multiple loyalty benefit offerors (e.g., 183), corresponding to different third party loyalty programs.

In one embodiment, a third party loyalty program of the loyalty benefit offeror 183 provides the user 101, identified by the account identifier 181, with benefits, such as discounts, rewards, incentives, cash back, gifts, coupons, and/or privileges.

In one embodiment, the association between the account identifier 181 and the loyalty benefit offeror 183 in the account data 111 indicates that the user 101 having the account identifier 181 is a member of the loyalty program. Thus, the user 101 may use the account identifier 181 to access privileges afforded to the members of the loyalty programs, such as rights to access a member only area, facility, store, product or service, discounts extended only to members, or opportunities to participate in certain events, buy certain items, or receive certain services reserved for members.

In one embodiment, it is not necessary to make a purchase to use the privileges. The user 101 may enjoy the privileges based on the status of being a member of the loyalty program. The user 101 may use the account identifier 181 to show the status of being a member of the loyalty program.

For example, the user 101 may provide the account identifier 181 (e.g., the account number of a credit card) to the transaction terminal 105 to initiate an authorization process for a special transaction which is designed to check the member status of the user 101, as if the account identifier 181 were used to initiate an authorization process for a payment transaction. The special transaction is designed to verify the member status of the user 101 via checking whether the account data 111 is associated with the loyalty benefit offeror 183. If the account identifier 181 is associated with the corresponding loyalty benefit offeror 183, the transaction handler 103 provides an approval indication in the authorization process to indicate that the user 101 is a member of the loyalty program. The approval indication can be used as a form of identification to allow the user 101 to access member privileges, such as access to services, products, opportunities, facilities, discounts, permissions, which are reserved for members.

In one embodiment, when the account identifier 181 is used to identify the user 101 as a member to access member privileges, the transaction handler 103 stores information about the access of the corresponding member privilege in loyalty record 187. The profile generator 121 may use the information accumulated in the loyalty record 187 to enhance transaction profiles 127 and provide the user 101 with personalized/targeted advertisements, with or without further offers of benefit (e.g., discounts, incentives, rebates, cash back, rewards, etc.).

In one embodiment, the association of the account identifier 181 and the loyalty benefit offeror 183 also allows the loyalty benefit offeror 183 to access at least a portion of the account data 111 relevant to the loyalty program, such as the loyalty record 187 and certain information about the user 101, such as name, address, and other demographic data.

In one embodiment, the loyalty program allows the user 101 to accumulate benefits according to loyalty program rules 185, such as reward points, cash back, levels of discounts, etc. For example, the user 101 may accumulate reward points for transactions that satisfy the loyalty program rules 185; and the user 101 may use the reward points to redeem cash, gift, discounts, etc. In one embodiment, the loyalty record 187 stores the accumulated benefits; and the transaction handler 103 updates the loyalty record 187 associated with the loyalty benefit offeror 183 and the account identifier 181, when events that satisfy the loyalty program rules occur.

In one embodiment, the accumulated benefits as indicated in the loyalty record 187 can be redeemed when the account identifier 181 is used to perform a payment transaction, when the payment transaction satisfies the loyalty program rules. For example, the user 101 may redeem a number of points to offset or reduce an amount of the purchase price.

In one embodiment, when the user 101 uses the account identifier 181 to make purchases as a member, the merchant may further provide information about the purchases; and the transaction handler 103 can store the information about the purchases as part of the loyalty record 187. The information about the purchases may identify specific items or services purchased by the member. For example, the merchant may provide the transaction handler 103 with purchase details at stock-keeping unit (SKU) level, which are then stored as part of the loyalty record 187. The loyalty benefit offeror 183 may use the purchase details to study the purchase behavior of the user 101; and the profile generator 121 may use the SKU level purchase details to enhance the transaction profiles 127.

In one embodiment, the SKU level purchase details are requested from the merchants or retailers via authorization responses, when the account 146 of the user 101 is enrolled in a loyalty program that allows the transaction handler 103 (and/or the issuer processor 145) to collect the purchase details.

In one embodiment, the profile generator 121 may generate transaction profiles 127 based on the loyalty record 187 and provide the transaction profiles 127 to the loyalty benefit offeror 183 (or other entities when permitted).

In one embodiment, the loyalty benefit offeror 183 may use the transaction profiles (e.g., 127 or 131) to select candidates for membership offering. For example, the loyalty program rules 185 may include one or more criteria that can be used to identify which customers are eligible for the loyalty program. The transaction handler 103 may be configured to automatically provide the qualified customers with the offer of membership in the loyalty program when the corresponding customers are performing transactions via the transaction handler 103 and/or via points of interaction 107 accessible to the entity operating the transaction handler 103, such as ATMs, mobile phones, receipts, statements, websites, etc. The user 101 may accept the membership offer via responding to the advertisement. For example, the user 101 may load the membership into the account in the same way as loading a coupon into the account of the user 101.

In one embodiment, the membership offer is provided as a coupon or is associated with another offer of benefits, such as a discount, reward, etc. When the coupon or benefit is redeemed via the transaction handler 103, the account data 111 is updated to enroll the user 101 into the corresponding loyalty program.

In one embodiment, a merchant may enroll a user 101 into a loyalty program when the user 101 is making a purchase at the transaction terminal 105 of the merchant.

For example, when the user 101 is making a transaction at an ATM, performing a self-assisted check out on a POS terminal, or making a purchase transaction on a mobile phone or a computer, the user 101 may be prompted to join a loyalty program, while the transaction is being authorized by the transaction handler 103. If the user 101 accepts the membership offer, the account data 111 is updated to have the account identifier 181 associated with the loyalty benefit offeror 183.

In one embodiment, the user 101 may be automatically enrolled in the loyalty program, when the profile of the user 101 satisfies a set of conditions specified in the loyalty program rules 185. The user 101 may opt out of the loyalty program.

In one embodiment, the loyalty benefit offeror 183 may personalize and/or target loyalty benefits based on the transaction profile 131 specific to or linked to the user 101. For example, the loyalty program rules 185 may use the user specific profile 131 to select gifts, rewards, or incentives for the user 101 (e.g., to redeem benefits, such as reward points, accumulated in the loyalty record 187). The user specific profile 131 may be enhanced using the loyalty record 187, or generated based on the loyalty record 187. For example, the profile generator 121 may use a subset of transaction data 109 associated with the loyalty record 187 to generate the user specific profile 131, or provide more weight to the subset of the transaction data 109 associated with the loyalty record 187 while also using other portions of the transaction data 109 in deriving the user specific profile 131.

In one embodiment, the loyalty program may involve different entities. For example, a first merchant may offer rewards as discounts, or gifts from a second merchant that has a business relationship with the first merchant. For example, an entity may allow a user 101 to accumulate loyalty benefits (e.g., reward points) via purchase transactions at a group of different merchants. For example, a group of merchants may jointly offer a loyalty program, in which loyalty benefits (e.g., reward points) can be accumulated from purchases at any of the merchants in the group and redeemable in purchases at any of the merchants.

In one embodiment, the information identifying the user 101 as a member of a loyalty program is stored on a server connected to the transaction handler 103. Alternatively or in combination, the information identifying the user 101 as a member of a loyalty program can also be stored in the financial transaction card (e.g., in the chip, or in the magnetic strip).

In one embodiment, loyalty program offerors (e.g., merchants, manufactures, issuers, retailers, clubs, organizations, etc.) can compete with each other in making loyalty program related offers. For example, loyalty program offerors may place bids on loyalty program related offers; and the advertisement selector 133 (e.g., under the control of the entity operating the transaction handler 103, or a different entity) may prioritize the offers based on the bids. When the offers are accepted or redeemed by the user 101, the loyalty program offerors pay fees according to the corresponding bids. In one embodiment, the loyalty program offerors may place an auto bid or maximum bid, which specifies the upper limit of a bid; and the actual bid is determined to be the lowest possible bid that is larger than the bids of the competitors, without exceeding the upper limit.

In one embodiment, the offers are provided to the user 101 in response to the user 101 being identified by the user data 125. If the user specific profile 131 satisfies the conditions specified in the loyalty program rules 185, the offer from the loyalty benefit offeror 183 can be presented to the user 101. When there are multiple offers from different offerors, the offers can be prioritized according to the bids.

In one embodiment, the offerors can place bids based on the characteristics that can be used as the user data 125 to select the user specific profile 131. In another embodiment, the bids can be placed on a set of transaction profiles 127.

In one embodiment, the loyalty program based offers are provided to the user 101 just in time when the user 101 can accept and redeem the offers. For example, when the user 101 is making a payment for a purchase from a merchant, an offer to enroll in a loyalty program offered by the merchant or related offerors can be presented to the user 101. If the user 101 accepts the offer, the user 101 is entitled to receive member discounts for the purchase.

For example, when the user 101 is making a payment for a purchase from a merchant, a reward offer can be provided to the user 101 based on loyalty program rules 185 and the loyalty record 187 associated with the account identifier 181 of the user 101 (e.g., the reward points accumulated in a loyalty program). Thus, the user effort for redeeming the reward points can be reduced; and the user experience can be improved.

In one embodiment, a method to provide loyalty programs includes the use of a computing apparatus of a transaction handler 103. The computing apparatus processes 301 a plurality of payment card transactions. After the computing apparatus receives 303 a request to track transactions for a loyalty program, such as the loyalty program rules 185, the computing apparatus stores and updates 305 loyalty program information in response to transactions occurring in the loyalty program. The computing apparatus provides 307 to a customer (e.g., 101) an offer of a benefit when the customer satisfies a condition defined in the loyalty program, such as the loyalty program rules 185.

Examples of loyalty programs through collaboration between collaborative constituents in a payment processing system, including the transaction handler 103 in one embodiment are provided in U.S. patent application Ser. No. 11/767,202, filed Jun. 22, 2007, assigned Pub. No. 2008/0059312, and entitled "Loyalty Program Service," U.S. patent application Ser. No. 11/848,112, filed Aug. 30, 2007, assigned Pub. No. 2008/0059316, and entitled "Loyalty Program Incentive Determination," and U.S. patent application Ser. No. 11/848,179, filed Aug. 30, 2007, assigned Pub. No. 2008/0059307, and entitled "Loyalty Program Parameter Collaboration," the disclosures of which applications are hereby incorporated herein by reference.

Examples of processing the redemption of accumulated loyalty benefits via the transaction handler 103 in one embodiment are provided in U.S. patent application Ser. No. 11/835,100, filed Aug. 7, 2007, assigned Pub. No. 2008/

0059303, and entitled "Transaction Evaluation for Providing Rewards," the disclosure of which is hereby incorporated herein by reference.

In one embodiment, the incentive, reward, or benefit provided in the loyalty program is based on the presence of correlated related transactions. For example, in one embodiment, an incentive is provided if a financial payment card is used in a reservation system to make a reservation and the financial payment card is subsequently used to pay for the reserved good or service. Further details and examples of one embodiment are provided in U.S. patent application Ser. No. 11/945,907, filed Nov. 27, 2007, assigned Pub. No. 2008/0071587, and entitled "Incentive Wireless Communication Reservation," the disclosure of which is hereby incorporated herein by reference.

In one embodiment, the transaction handler 103 provides centralized loyalty program management, reporting and membership services. In one embodiment, membership data is downloaded from the transaction handler 103 to acceptance point devices, such as the transaction terminal 105. In one embodiment, loyalty transactions are reported from the acceptance point devices to the transaction handler 103; and the data indicating the loyalty points, rewards, benefits, etc. are stored on the account identification device 141. Further details and examples of one embodiment are provided in U.S. patent application Ser. No. 10/401,504, filed Mar. 27, 2003, assigned Pub. No. 2004/0054581, and entitled "Network Centric Loyalty System," the disclosure of which is hereby incorporated herein by reference.

In one embodiment, the portal 143 of the transaction handler 103 is used to manage reward or loyalty programs for entities such as issuers, merchants, etc. The cardholders, such as the user 101, are rewarded with offers/benefits from merchants. The portal 143 and/or the transaction handler 103 track the transaction records for the merchants for the reward or loyalty programs. Further details and examples of one embodiment are provided in U.S. patent application Ser. No. 11/688,423, filed Mar. 20, 2007, assigned Pub. No. 2008/0195473, and entitled "Reward Program Manager," the disclosure of which is hereby incorporated herein by reference.

In one embodiment, a loyalty program includes multiple entities providing access to detailed transaction data, which allows the flexibility for the customization of the loyalty program. For example, issuers or merchants may sponsor the loyalty program to provide rewards; and the portal 143 and/or the transaction handler 103 stores the loyalty currency in the data warehouse 149. Further details and examples of one embodiment are provided in U.S. patent application Ser. No. 12/177,530, filed Jul. 22, 2008, assigned Pub. No. 2009/0030793, and entitled "Multi-Vender Multi-Loyalty Currency Program," the disclosure of which is hereby incorporated herein by reference.

In one embodiment, an incentive program is created on the portal 143 of the transaction handler 103. The portal 143 collects offers from a plurality of merchants and stores the offers in the data warehouse 149. The offers may have associated criteria for their distributions. The portal 143 and/or the transaction handler 103 may recommend offers based on the transaction data 109. In one embodiment, the transaction handler 103 automatically applies the benefits of the offers during the processing of the transactions when the transactions satisfy the conditions associated with the offers. In one embodiment, the transaction handler 103 communicates with transaction terminals 105 to set up, customize, and/or update offers based on market focus, product categories, service categories, targeted consumer demographics, etc. Further details and examples of one embodiment are provided in U.S. patent application Ser. No. 12/413,097, filed Mar. 27, 2009, assigned Pub. No. 2010-0049620, and entitled "Merchant Device Support of an Integrated Offer Network," the disclosure of which is hereby incorporated herein by reference.

In one embodiment, the transaction handler 103 is configured to provide offers from merchants to the user 101 via the payment system, making accessing and redeeming the offers convenient for the user 101. The offers may be triggered by and/or tailored to a previous transaction, and may be valid only for a limited period of time starting from the date of the previous transaction. If the transaction handler 103 determines that a subsequent transaction processed by the transaction handler 103 meets the conditions for the redemption of an offer, the transaction handler 103 may credit the consumer account 146 for the redemption of the offer and/or provide a notification message to the user 101. Further details and examples of one embodiment are provided in U.S. patent application Ser. No. 12/566,350, filed Sep. 24, 2009 and entitled "Real-Time Statement Credits and Notifications," the disclosure of which is hereby incorporated herein by reference.

Details on loyalty programs in one embodiment are provided in U.S. patent application Ser. No. 12/896,632, filed Oct. 1, 2010 and entitled "Systems and Methods to Provide Loyalty Programs," the disclosure of which is hereby incorporated herein by reference.

SKU

In one embodiment, merchants generate stock-keeping unit (SKU) or other specific information that identifies the particular goods and services purchased by the user 101 or customer. The SKU information may be provided to the operator of the transaction handler 103 that processed the purchases. The operator of the transaction handler 103 may store the SKU information as part of transaction data 109, and reflect the SKU information for a particular transaction in a transaction profile (127 or 131) associated with the person involved in the transaction.

When a user 101 shops at a traditional retail store or browses a website of an online merchant, an SKU-level profile associated specifically with the user 101 may be provided to select an advertisement appropriately targeted to the user 101 (e.g., via mobile phones, POS terminals, web browsers, etc.). The SKU-level profile for the user 101 may include an identification of the goods and services historically purchased by the user 101. In addition, the SKU-level profile for the user 101 may identify goods and services that the user 101 may purchase in the future. The identification may be based on historical purchases reflected in SKU-level profiles of other individuals or groups that are determined to be similar to the user 101. Accordingly, the return on investment for advertisers and merchants can be greatly improved.

In one embodiment, the user specific profile 131 is an aggregated spending profile 341 that is generated using the SKU-level information. For example, in one embodiment, the factor values 344 correspond to factor definitions 331 that are generated based on aggregating spending in different categories of products and/or services. A typical merchant offers products and/or services in many different categories.

In one embodiment, the user 101 may enter into transactions with various online and "brick and mortar" merchants. The transactions may involve the purchase of various items of goods and services. The goods and services may be identified by SKU numbers or other information that specifically identifies the goods and services purchased by the user 101.

In one embodiment, the merchant may provide the SKU information regarding the goods and services purchased by the user 101 (e.g., purchase details at SKU level) to the operator of the transaction handler 103. In one embodiment, the SKU information may be provided to the operator of the transaction handler 103 in connection with a loyalty program, as described in more detail below. The SKU information may be stored as part of the transaction data 109 and associated with the user 101. In one embodiment, the SKU information for items purchased in transactions facilitated by the operator of the transaction handler 103 may be stored as transaction data 109 and associated with its associated purchaser. In one embodiment, the SKU level purchase details are requested from the merchants or retailers via authorization responses, when the account 146 of the user 101 is enrolled in a program that allows the transaction handler 103 (and/or the issuer processor 145) to collect the purchase details.

In one embodiment, based on the SKU information and perhaps other transaction data, the profile generator 121 may create an SKU-level transaction profile for the user 101. In one embodiment, based on the SKU information associated with the transactions for each person entering into transactions with the operator of the transaction handler 103, the profile generator 121 may create an SKU-level transaction profile for each person.

In one embodiment, the SKU information associated with a group of purchasers may be aggregated to create an SKU-level transaction profile that is descriptive of the group. The group may be defined based on one or a variety of considerations. For example, the group may be defined by common demographic features of its members. As another example, the group may be defined by common purchasing patterns of its members.

In one embodiment, the user 101 may later consider the purchase of additional goods and services. The user 101 may shop at a traditional retailer or an online retailer. With respect to an online retailer, for example, the user 101 may browse the website of an online retailer, publisher, or merchant. The user 101 may be associated with a browser cookie to, for example, identify the user 101 and track the browsing behavior of the user 101.

In one embodiment, the retailer may provide the browser cookie associated with the user 101 to the operator of the transaction handler 103. Based on the browser cookie, the operator of the transaction handler 103 may associate the browser cookie with a personal account number of the user 101. The association may be performed by the operator of the transaction handler 103 or another entity in a variety of manners such as, for example, using a look up table.

Based on the personal account number, the profile selector 129 may select a user specific profile 131 that constitutes the SKU-level profile associated specifically with the user 101. The SKU-level profile may reflect the individual, prior purchases of the user 101 specifically, and/or the types of goods and services that the user 101 has purchased.

The SKU-level profile for the user 101 may also include identifications of goods and services the user 101 may purchase in the future. In one embodiment, the identifications may be used for the selection of advertisements for goods and services that may be of interest to the user 101. In one embodiment, the identifications for the user 101 may be based on the SKU-level information associated with historical purchases of the user 101. In one embodiment, the identifications for the user 101 may be additionally or alternatively based on transaction profiles associated with others. The recommendations may be determined by predictive association and other analytical techniques.

For example, the identifications for the user 101 may be based on the transaction profile of another person. The profile selector 129 may apply predetermined criteria to identify another person who, to a predetermined degree, is deemed sufficiently similar to the user 101. The identification of the other person may be based on a variety of factors including, for example, demographic similarity and/or purchasing pattern similarity between the user 101 and the other person. As one example, the common purchase of identical items or related items by the user 101 and the other person may result in an association between the user 101 and the other person, and a resulting determination that the user 101 and the other person are similar. Once the other person is identified, the transaction profile constituting the SKU-level profile for the other person may be analyzed. Through predictive association and other modeling and analytical techniques, the historical purchases reflected in the SKU-level profile for the other person may be employed to predict the future purchases of the user 101.

As another example, the identifications of the user 101 may be based on the transaction profiles of a group of persons. The profile selector 129 may apply predetermined criteria to identify a multitude of persons who, to a predetermined degree, are deemed sufficiently similar to the user 101. The identification of the other persons may be based on a variety of factors including, for example, demographic similarity and/or purchasing pattern similarity between the user 101 and the other persons. Once the group constituting the other persons is identified, the transaction profile constituting the SKU-level profile for the group may be analyzed. Through predictive association and other modeling and analytical techniques, the historical purchases reflected in the SKU-level profile for the group may be employed to predict the future purchases of the user 101.

The SKU-level profile of the user 101 may be provided to select an advertisement that is appropriately targeted. Because the SKU-level profile of the user 101 may include identifications of the goods and services that the user 101 may be likely to buy, advertisements corresponding to the identified goods and services may be presented to the user 101. In this way, targeted advertising for the user 101 may be optimized. Further, advertisers and publishers of advertisements may improve their return on investment, and may improve their ability to cross-sell goods and services.

In one embodiment, SKU-level profiles of others who are identified to be similar to the user 101 may be used to identify a user 101 who may exhibit a high propensity to purchase goods and services. For example, if the SKU-level profiles of others reflect a quantity or frequency of purchase that is determined to satisfy a threshold, then the user 101 may also be classified or predicted to exhibit a high propensity to purchase. Accordingly, the type and frequency of advertisements that account for such propensity may be appropriately tailored for the user 101.

In one embodiment, the SKU-level profile of the user 101 may reflect transactions with a particular merchant or merchants. The SKU-level profile of the user 101 may be provided to a business that is considered a peer with or similar to the particular merchant or merchants. For example, a merchant may be considered a peer of the business because the merchant offers goods and services that are similar to or related to those of the business. The SKU-level profile reflecting transactions with peer merchants may be used by the business to better predict the purchasing behavior of the user 101 and to optimize the presentation of targeted advertisements to the user 101.

Details on SKU-level profile in one embodiment are provided in U.S. patent application Ser. No. 12/899,144, filed Oct. 6, 2010 and entitled "Systems and Methods for Advertising Services Based on an SKU-Level Profile," the disclosure of which is hereby incorporated herein by reference.

Real-Time Messages

In one embodiment, the transaction handler 103 is configured to cooperate with the media controller 115 to facilitate real-time interaction with the user 101 when the payment of the user 101 is being processed by the transaction handler 103. The real-time interaction provides the opportunity to impact the user experience during the purchase (e.g., at the time of card swipe), through delivering messages in real-time to a point of interaction 107, such as a mobile phone, a personal digital assistant, a portable computer, etc. The real-time message can be delivered via short message service (SMS), email, instant messaging, or other communications protocols.

In one embodiment, the real-time message is provided without requiring modifications to existing systems used by the merchants and/or issuers.

Figure 15:
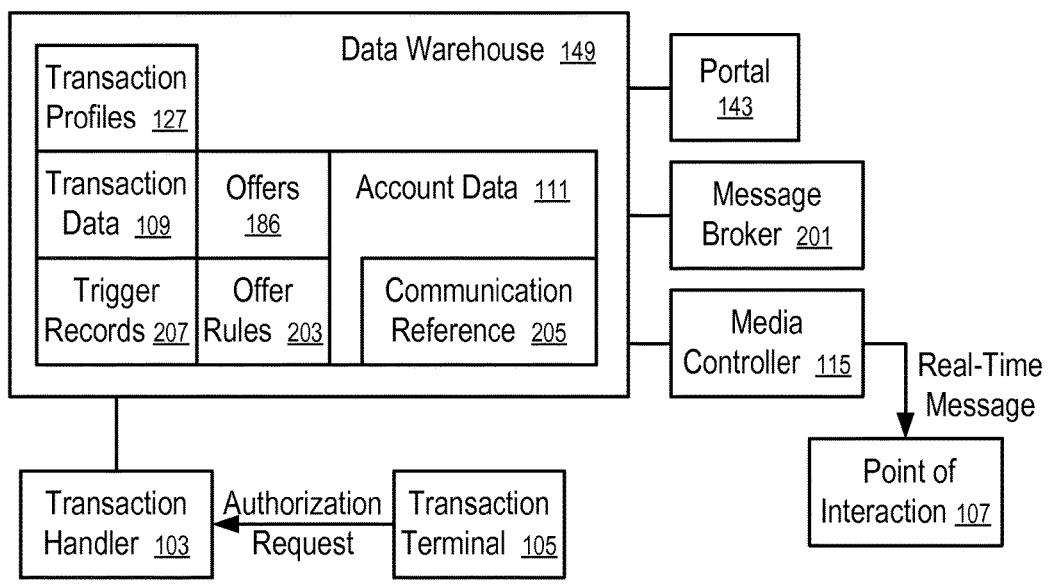
FIG. 15 shows a system to provide real-time messages according to one embodiment.

FIG. 15 shows a system to provide real-time messages according to one embodiment. In FIG. 15, the transaction handler 103 (or a separate computing system coupled with the transaction handler 103) is to detect the occurrence of certain transactions of interest during the processing of the authorization requests received from the transaction terminal 105; a message broker 201 is to identify a relevant message for the user 101 associated with the corresponding authorization request; and the media controller 115 is to provide the message to the user 101 at the point of interaction 107 via a communication channel separate from the channel used by the transaction handler 103 to respond to the corresponding authorization request submitted from the transaction terminal 105.

In one embodiment, the media controller 115 is to provide the message to the point of interaction 107 in parallel with the transaction handler 103 providing the response to the authorization request.

In one embodiment, the point of interaction 107 receives the message from the media controller 115 in real-time with the transaction handler 103 processing the authorization request. In one embodiment, the message is to arrive at the point of interaction 107 in the context of the response provided from the transaction handler 103 to the transaction terminal 105. For example, the message is to arrive at the point of interaction 107 substantially at the same time as the response to the authorization request arrives at the transaction terminal, or with a delay not long enough to cause the user 101 to have the impression that the message is in response to an action other that the payment transaction. For example, the message is to arrive at the point of interaction 107 prior to the user 101 completing the transaction and leaving the transaction terminal 105, or prior to the user 101 leaving the retail location of the merchant operating the transaction terminal 105.

In FIG. 15, the system includes a portal 143 to provide services to merchants and/or the user 101.

For example, in one embodiment, the portal 143 allows the user 101 to register the communication reference 205 in association with the account data 111, such as the account information 142 of the consumer account 146; and the media controller 115 is to use the communication reference 205 to deliver the message to the point of interaction 107. Examples of the communication reference 205 includes a mobile phone number, an email address, a user identifier of an instant messaging system, an IP address, etc.

In one embodiment, the portal 143 allows merchants and/or other parties to define rules 203 to provide offers 186 as real-time responses to authorization requests; and based on the offer rules 203, the message broker 201 is to generate, or instruct the media controller to generate, the real-time message to provide the offers 186 to the user 101. For example, the offer 186 may include a discount, an incentive, a reward, a rebate, a gift, or other benefit, which can be redeemed upon the satisfaction of certain conditions required by the offer rules 203. In one embodiment, based on the offer rules 203 the message broker 201 configures a message by selecting the appropriate message template from (an) existing message(s) template(s), and inserts any relevant data (e.g., the communication reference 205) into the selected template, then passes the configured message to the media controller 115, which delivers the message to the point of interaction 107. In one embodiment, the message broker 201 (or a subsystem) is used to manage message templates along with the rules for selecting the appropriate message template from among several potential choices.

In one embodiment, the offer rules 203 include offer details, targeting rules, advertisement campaign details, profile mapping, creative mapping, qualification rules, award/notify/fulfillment rules, approvals, etc. Creative elements for offers include text, images, channels, approvals, etc.

In one embodiment, when the offer rules 203 are activated by the merchant or advertiser via the portal 143, the message broker 201 is to generate trigger records 207 for the transaction handler 103. The transaction handler 103 is to monitor the incoming authorization requests to identify requests that satisfy the conditions specified in the trigger records 207 during the process of the authorization requests, and to provide the information about the identified requests to the message broker 201 for the transmission of an appropriate real-time message in accordance with the offer rules 203.

In one embodiment, the generation of the trigger records 207 for the transaction handler 103 is in real-time with the merchant or advertiser activating the offer rules 203. Thus, the offer rules 203 can be activated and used for the detection of the new authorization requests in real-time, while the transaction handler 103 continues to process the incoming authorization requests.

In one embodiment, the portal 143 provides information about the spending behaviors reflected in the transaction data 109 to assist the merchants or advertisers to target offers or advertisements. For example, in one embodiment, the portal 143 allows merchants to target the offers 186 based on transaction profiles 127. For example, the offer rules 203 are partially based on the values in a transaction profile 127, such as an aggregated spending profile 341. In one embodiment, the offer rules 203 are partially based on the information about the last purchase of the user 101 from the merchant operating the transaction terminal 105 (or another merchant), and/or the information about the location of the user 101, such as the location determined based on the location of the transaction terminal 105 and/or the location of the merchant operating the transaction terminal 105.

In one embodiment, the portal 143 provides transaction based statistics, such as merchant benchmarking statistics, industry/market segmentation, etc., to assist merchants and advertisers to identify customers.

Thus, the real-time messages can be used to influence customer behaviors while the customers are in the purchase mode.

In one embodiment, the benefit of the offers 186 can be redeemed via the transaction handler 103. The redemption of the offer 186 may or may not require the purchase details (e.g., SKU level purchase details). Details in one embodiment about redeeming offers 186 via the transaction handler 103 are provided in U.S. patent application Ser. No. 13/113, 710, filed May 23, 2011 and entitled "Systems and Methods for Redemption of Offers," the disclosure of which is hereby incorporated herein by reference.

In one embodiment, when the authorization request for a purchase indicates that the purchase qualifies the offer 186 for redemption if the purchase corresponding to the authorization request is completed, the message broker 201 is to construct a message and use the media controller 115 to deliver the message in real-time with the processing of the authorization request to the point of interaction 107. The message informs the user 101 that when the purchase is completed, the transaction handler 103 and/or the issuer processor 145 is to provide the benefit of the offer 186 to the user 101 via statement credit or some other settlement value, for example points in a registered loyalty program, or credit at the point of sale using a digital coupon delivered to the purchaser via cell phone.

In one embodiment, the settlement of the payment transaction corresponding to the authorization request does not occur in real-time with the processing of the authorization request. For example, the merchant may submit the complete purchases for settlement at the end of the day, or in accordance with a predetermined schedule. The settlement may occur one or more days after the processing of the authorization request.

In one embodiment, when transactions are settled, the settled transactions are matched to the authorization requests to identify offers 186 that are redeemable in view of the settlement. When the offer 186 is confirmed to be redeemable based on a record of successful settlement, the message broker 201 is to use the media controller 115 to provide a message to the point of interaction 107 of the user 101, such as the mobile phone of the user 101. In one embodiment, the message is to inform the user 101 of the benefit to be provided as statement credits and/or to provide additional offers. In one embodiment, the message to confirm the statement credits is transmitted in real-time with the completion of the transaction settlement.

In one embodiment, the message broker 201 is to determine the identity of the merchant based on the information included in the authorization request transmitted from the transaction terminal 105 to the transaction handler 103. In one embodiment, the identity of the merchant is normalized to allow the application of the offer rules 203 that are merchant specific.

In one embodiment, the portal 143 is to provide data insight to merchants and/or advertisers. For example, the portal 143 can provide the transaction profile 127 of the user 101, audience segmentation information, etc.

In one embodiment, the portal 143 is to allow the merchants and/or advertisers to define and manage offers for their creation, fulfillment and/or delivery in messages.

In one embodiment, the portal 143 allows the merchants and/or advertisers to test, run and/or monitor the offers 186 for their creation, fulfillment and/or delivery in messages.

In one embodiment, the portal 143 is to provide reports and analytics regarding the offers 186.

In one embodiment, the portal 143 provides operation facilities, such as onboarding, contact management, certification, file management, workflow, etc. to assist the merchants and/or advertisers to complete the tasks related to the offers 186.

In one embodiment, the portal 143 allows the user 101 to opt in or opt out of the real-time message delivery service.

In one embodiment, an advertiser or merchant can select an offer fulfillment method from a list of options, such as statement credits, points, gift cards, e-certificates, third party fulfillment, etc.

In one embodiment, the merchant or advertiser is to use the "off the rack" transaction profiles 127 available in the data warehouse 149. In one embodiment, the merchant or advertiser can further edit parameters to customize the generation of the transaction profiles 127 and/or develop custom transaction profiles from scratch using the portal 143.

In one embodiment, the portal 143 provides a visualization tool to allow the user to see clusters of data based on GeoCodes, proximity, transaction volumes, spending patterns, zip codes, customers, stores, etc.

In one embodiment, the portal 143 allows the merchant or advertiser to define cells for targeting the customers in the cells based on date/time, profile attributes, map to offer/channel/creative, condition testing, etc.

In one embodiment, the portal 143 allows the merchant or advertiser to monitor the system health, such as the condition of servers, files received or sent, errors, status, etc., the throughput by date or range, by program, by campaign, or by global view, and aspects of current programs/offers/campaigns, such as offer details, package audit reports, etc. In one embodiment, reporting includes analytics and metrics, such as lift, conversion, category differentials (e.g., spending patterns, transaction volumes, peer groups), and reporting by program, campaign, cell, GeoCode, proximity, ad-hoc, auditing, etc.

Figure 16:
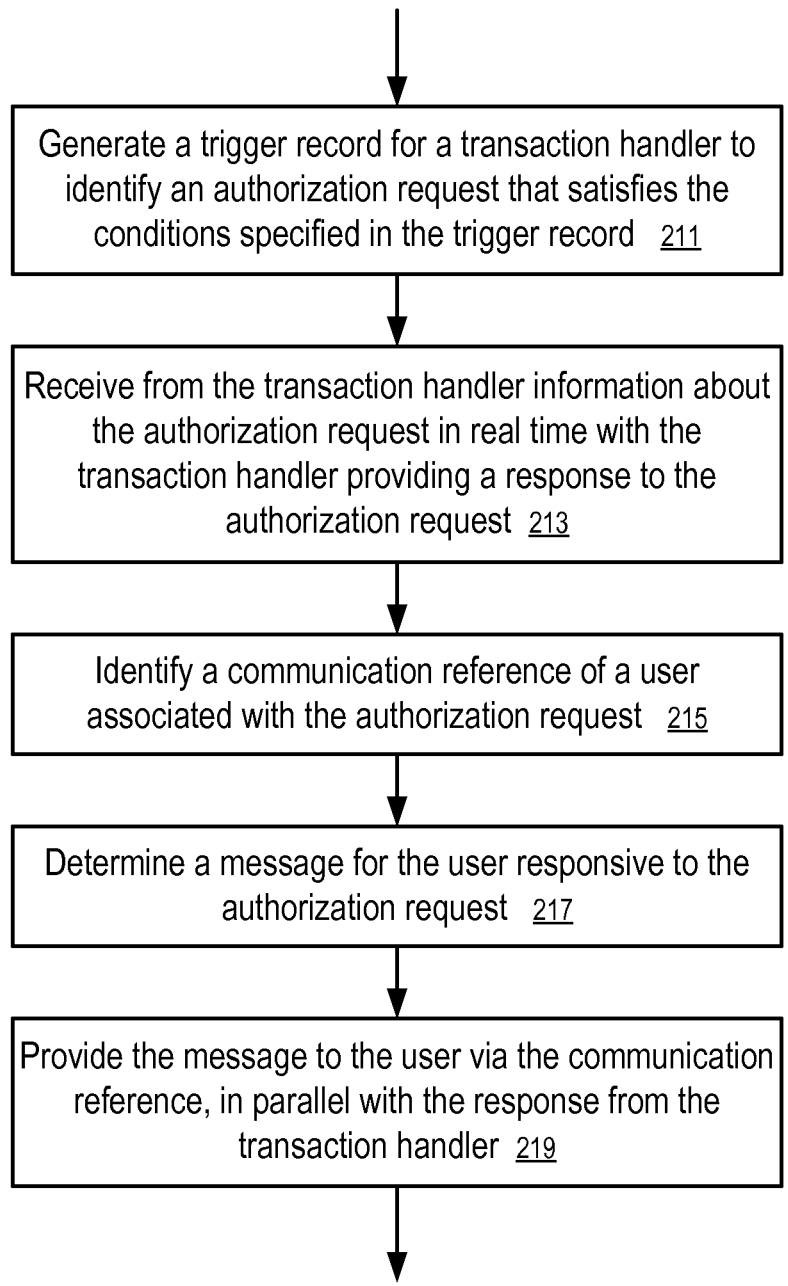
FIG. 16 shows a method to provide real-time messages according to one embodiment.

FIG. 16 shows a method to provide real-time messages according to one embodiment. In FIG. 16, a computing apparatus is to generate 211 a trigger record 207 for a transaction handler 103 to identify an authorization request that satisfies the conditions specified in the trigger record 207, receive 213 from the transaction handler 103 information about the authorization request in real-time with the transaction handler 103 providing a response to the authorization request to a transaction terminal 105, identify 215 a communication reference 205 of a user 101 associated with the authorization request, determine 217 a message for the user 101 responsive to the authorization request, and provide 219 the message to the user 101 at a point of interaction 107 via the communication reference 205, in parallel with the response from the transaction handler 103 to the transaction terminal 105.

In one embodiment, the computing apparatus includes at least one of: a transaction handler, a message broker 201, a media controller 115, a portal 143 and a data warehouse.

Variations

Some embodiments use more or fewer components than those illustrated in FIGS. 7 and 10-13. For example, in one embodiment, the user specific profile 131 is used by a search engine to prioritize search results. In one embodiment, the correlator 117 is to correlate transactions with online activities, such as searching, web browsing, and social networking, instead of or in addition to the user specific advertisement data 119. In one embodiment, the correlator 117 is to correlate transactions and/or spending patterns with news announcements, market changes, events, natural disasters, etc. In one embodiment, the data to be correlated by the correlator with the transaction data 109 may not be personalized via the user specific profile 131 and may not be user specific. In one embodiment, multiple different devices are used at the point of interaction 107 for interaction with the user 101; and some of the devices may not be capable of receiving input from the user 101. In one embodiment, there are transaction terminals 105 to initiate transactions for a plurality of users 101 with a plurality of different merchants. In one embodiment, the account information 142 is provided to the transaction terminal 105 directly (e.g., via phone or Internet) without the use of the account identification device 141.

In one embodiment, at least some of the profile generator 121, correlator 117, profile selector 129, and advertisement selector 133 are controlled by the entity that operates the transaction handler 103. In another embodiment, at least some of the profile generator 121, correlator 117, profile selector 129, and advertisement selector 133 are not controlled by the entity that operates the transaction handler 103.

For example, in one embodiment, the entity operating the transaction handler 103 provides the intelligence (e.g., transaction profiles 127 or the user specific profile 131) for the selection of the advertisement; and a third party (e.g., a web search engine, a publisher, or a retailer) may present the advertisement in a context outside a transaction involving the transaction handler 103 before the advertisement results in a purchase.

For example, in one embodiment, the customer may interact with the third party at the point of interaction 107; and the entity controlling the transaction handler 103 may allow the third party to query for intelligence information (e.g., transaction profiles 127, or the user specific profile 131) about the customer using the user data 125, thus informing the third party of the intelligence information for targeting the advertisements, which can be more useful, effective and compelling to the user 101. For example, the entity operating the transaction handler 103 may provide the intelligence information without generating, identifying or selecting advertisements; and the third party receiving the intelligence information may identify, select and/or present advertisements.

Through the use of the transaction data 109, account data 111, correlation results 123, the context at the point of interaction, and/or other data, relevant and compelling messages or advertisements can be selected for the customer at the points of interaction (e.g., 107) for targeted advertising. The messages or advertisements are thus delivered at the optimal time for influencing or reinforcing brand perceptions and revenue-generating behavior. The customers receive the advertisements in the media channels that they like and/or use most frequently.

In one embodiment, the transaction data 109 includes transaction amounts, the identities of the payees (e.g., merchants), and the date and time of the transactions. The identities of the payees can be correlated to the businesses, services, products and/or locations of the payees. For example, the transaction handler 103 maintains a database of merchant data, including the merchant locations, businesses, services, products, etc. Thus, the transaction data 109 can be used to determine the purchase behavior, pattern, preference, tendency, frequency, trend, budget and/or propensity of the customers in relation to various types of businesses, services and/or products and in relation to time.

In one embodiment, the products and/or services purchased by the user 101 are also identified by the information transmitted from the merchants or service providers. Thus, the transaction data 109 may include identification of the individual products and/or services, which allows the profile generator 121 to generate transaction profiles 127 with fine granularity or resolution. In one embodiment, the granularity or resolution may be at a level of distinct products and services that can be purchased (e.g., stock-keeping unit (SKU) level), or category or type of products or services, or vendor of products or services, etc.

The profile generator 121 may consolidate transaction data for a person having multiple accounts to derive intelligence information about the person to generate a profile for the person (e.g., transaction profiles 127, or the user specific profile 131).

The profile generator 121 may consolidate transaction data for a family having multiple accounts held by family members to derive intelligence information about the family to generate a profile for the family (e.g., transaction profiles 127, or the user specific profile 131).

Similarly, the profile generator 121 may consolidate transaction data for a group of persons, after the group is identified by certain characteristics, such as gender, income level, geographical location or region, preference, characteristics of past purchases (e.g., merchant categories, purchase types), cluster, propensity, demographics, social networking characteristics (e.g., relationships, preferences, activities on social networking websites), etc. The consolidated transaction data can be used to derive intelligence information about the group to generate a profile for the group (e.g., transaction profiles 127, or the user specific profile 131).

In one embodiment, the profile generator 121 may consolidate transaction data according to the user data 125 to generate a profile specific to the user data 125.

Since the transaction data 109 are records and history of past purchases, the profile generator 121 can derive intelligence information about a customer using an account, a customer using multiple accounts, a family, a company, or other groups of customers, about what the targeted audience is likely to purchase in the future, how frequently, and their likely budgets for such future purchases. Intelligence information is useful in selecting the advertisements that are most useful, effective and compelling to the customer, thus increasing the efficiency and effectiveness of the advertising process.

In one embodiment, the transaction data 109 are enhanced with correlation results 123 correlating past advertisements and purchases resulting at least in part from the advertisements. Thus, the intelligence information can be more accurate in assisting with the selection of the advertisements. The intelligence information may not only indicate what the audience is likely to purchase, but also how likely the audience is to be influenced by advertisements for certain purchases, and the relative effectiveness of different forms of advertisements for the audience. Thus, the advertisement selector 133 can select the advertisements to best use the opportunity to communicate with the audience. Further, the transaction data 109 can be enhanced via other data elements, such as program enrollment, affinity programs, redemption of reward points (or other types of offers), online activities, such as web searches and web browsing, social networking information, etc., based on the account data 111 and/or other data, such as non-transactional data discussed in U.S. patent application Ser. No. 12/614, 603, filed Nov. 9, 2009 and entitled "Analyzing Local Non-Transactional Data with Transactional Data in Predictive Models," the disclosure of which is hereby incorporated herein by reference.

In one embodiment, the entity operating the transaction handler 103 provides the intelligence information in real-time as the request for the intelligence information occurs. In other embodiments, the entity operating the transaction handler 103 may provide the intelligence information in batch mode. The intelligence information can be delivered via online communications (e.g., via an application programming interface (API) on a website, or other information server), or via physical transportation of a computer readable media that stores the data representing the intelligence information.

In one embodiment, the intelligence information is communicated to various entities in the system in a way similar to, and/or in parallel with the information flow in the transaction system to move money. The transaction handler 103 routes the information in the same way it routes the currency involved in the transactions.

In one embodiment, the portal 143 provides a user interface to allow the user 101 to select items offered on different merchant websites and store the selected items in a wish list for comparison, reviewing, purchasing, tracking, etc. The information collected via the wish list can be used to improve the transaction profiles 127 and derive intelligence on the needs of the user 101; and targeted advertisements can be delivered to the user 101 via the wish list user interface provided by the portal 143. Examples of user interface systems to manage wish lists are provided in U.S. patent application Ser. No. 12/683,802, filed Jan. 7, 2010 and entitled "System and Method for Managing Items of Interest Selected from Online Merchants," the disclosure of which is hereby incorporated herein by reference.

Aggregated Spending Profile

In one embodiment, the characteristics of transaction patterns of customers are profiled via clusters, factors, and/or categories of purchases. The transaction data 109 may include transaction records 301; and in one embodiment, an aggregated spending profile 341 is generated from the transaction records 301, in a way illustrated in FIG. 8, to summarize the spending behavior reflected in the transaction records 301.

In one embodiment, each of the transaction records 301 is for a particular transaction processed by the transaction handler 103. Each of the transaction records 301 provides information about the particular transaction, such as the account number 312 of the consumer account 146 used to pay for the purchase, the date 303 (and/or time) of the transaction, the amount 314 of the transaction, the ID 305 of the merchant who receives the payment, the category 316 of the merchant, the channel 307 through which the purchase was made, etc. Examples of channels include online, offline in-store, via phone, etc. In one embodiment, the transaction records 301 may further include a field to identify a type of transaction, such as card-present, card-not-present, etc.

In one embodiment, a "card-present" transaction involves physically presenting the account identification device 141, such as a financial transaction card, to the merchant (e.g., via swiping a credit card at a POS terminal of a merchant); and a "card-not-present" transaction involves presenting the account information 142 of the consumer account 146 to the merchant to identify the consumer account 146 without physically presenting the account identification device 141 to the merchant or the transaction terminal 105.

In one embodiment, certain information about the transaction can be looked up in a separate database based on other information recorded for the transaction. For example, a database may be used to store information about merchants, such as the geographical locations of the merchants, categories of the merchants, etc. Thus, the corresponding merchant information related to a transaction can be determined using the merchant ID 305 recorded for the transaction.

In one embodiment, the transaction records 301 may further include details about the products and/or services involved in the purchase. For example, a list of items purchased in the transaction may be recorded together with the respective purchase prices of the items and/or the respective quantities of the purchased items. The products and/or services can be identified via stock-keeping unit (SKU) numbers, or product category IDs. The purchase details may be stored in a separate database and be looked up based on an identifier of the transaction.

When there is voluminous data representing the transaction records 301, the spending patterns reflected in the transaction records 301 can be difficult to recognize by an ordinary person.

In one embodiment, the voluminous transaction records 301 are summarized 335 into aggregated spending profiles (e.g., 341) to concisely present the statistical spending characteristics reflected in the transaction records 301. The aggregated spending profile 341 uses values derived from statistical analysis to present the statistical characteristics of transaction records 301 of an entity in a way easy to understand by an ordinary person.

In FIG. 8, the transaction records 301 are summarized 335 via factor analysis 327 to condense the variables (e.g., 313, 315) and via cluster analysis 329 to segregate entities by spending patterns.

In FIG. 8, a set of variables (e.g., 311, 313, 315) are defined based on the parameters recorded in the transaction records 301. The variables (e.g., 311, 313, and 315) are defined in a way to have meanings easily understood by an ordinary person. For example, variables 311 measure the aggregated spending in super categories; variables 313 measure the spending frequencies in various areas; and variables 315 measure the spending amounts in various areas. In one embodiment, each of the areas is identified by a merchant category 316 (e.g., as represented by a merchant category code (MCC), a North American Industry Classification System (NAICS) code, or a similarly standardized category code). In other embodiments, an area may be identified by a product category, a SKU number, etc.

In one embodiment, a variable of a same category (e.g., frequency 313 or amount 315) is defined to be aggregated over a set of mutually exclusive areas. A transaction is classified in only one of the mutually exclusive areas. For example, in one embodiment, the spending frequency variables 313 are defined for a set of mutually exclusive merchants or merchant categories. Transactions falling with the same category are aggregated.

Examples of the spending frequency variables 313 and spending amount variables 315 defined for various merchant categories (e.g., 316) in one embodiment are provided in U.S. patent application Ser. No. 12/537,566, filed Aug. 7, 2009 and entitled "Cardholder Clusters," the disclosure of which application is hereby incorporated herein by reference.

In one embodiment, super categories 311 are defined to group the categories (e.g., 316) used in transaction records 301. The super categories 311 can be mutually exclusive. For example, each merchant category 316 is classified under only one super merchant category but not any other super merchant categories. Since the generation of the list of super categories typically requires deep domain knowledge about the businesses of the merchants in various categories, super categories 311 are not used in one embodiment.

In one embodiment, the aggregation 317 includes the application of the definitions 309 for these variables (e.g., 311, 313, and 315) to the transaction records 301 to generate the variable values 321. The transaction records 301 are aggregated to generate aggregated measurements (e.g., variable values 321) that are not specific to a particular transaction, such as frequencies of purchases made with different merchants or different groups of merchants, the amounts spent with different merchants or different groups of merchants, and the number of unique purchases across different merchants or different groups of merchants, etc. The aggregation 317 can be performed for a particular time period and for entities at various levels.

In one embodiment, the transaction records 301 are aggregated according to a buying entity. The aggregation 317 can be performed at account level, person level, family level, company level, neighborhood level, city level, region level, etc. to analyze the spending patterns across various areas (e.g., sellers, products or services) for the respective aggregated buying entity. For example, the transaction records 301 for a particular account (e.g., presented by the account number 312) can be aggregated for an account level analysis. To aggregate the transaction records 301 in account level, the transactions with a specific merchant or merchants in a specific category are counted according to the variable definitions 309 for a particular account to generate a frequency measure (e.g., 313) for the account relative to the specific merchant or merchant category; and the transaction amounts (e.g., 314) with the specific merchant or the specific category of merchants are summed for the particular account to generate an average spending amount for the account relative to the specific merchant or merchant category. For example, the transaction records 301 for a particular person having multiple accounts can be aggregated for a person level analysis, the transaction records 301 aggregated for a particular family for a family level analysis, and the transaction records 301 for a particular business aggregated for a business level analysis.

The aggregation 317 can be performed for a predetermined time period, such as for the transactions occurring in the past month, in the past three months, in the past twelve months, etc.

In another embodiment, the transaction records 301 are aggregated according to a selling entity. The spending patterns at the selling entity across various buyers, products or services can be analyzed. For example, the transaction records 301 for a particular merchant having transactions with multiple accounts can be aggregated for a merchant level analysis. For example, the transaction records 301 for a particular merchant group can be aggregated for a merchant group level analysis.

In one embodiment, the aggregation 317 is formed separately for different types of transactions, such as transactions made online, offline, via phone, and/or "card-present" transactions vs. "card-not-present" transactions, which can be used to identify the spending pattern differences among different types of transactions.

In one embodiment, the variable values (e.g., 323, 324, . . . , 325) associated with an entity ID 322 are considered the random samples of the respective variables (e.g., 311, 313, 315), sampled for the instance of an entity represented by the entity ID 322. Statistical analyses (e.g., factor analysis 327 and cluster analysis 329) are performed to identify the patterns and correlations in the random samples.

For example, a cluster analysis 329 can identify a set of clusters and thus cluster definitions 333 (e.g., the locations of the centroids of the clusters). In one embodiment, each entity ID 322 is represented as a point in a mathematical space defined by the set of variables; and the variable values (323, 324, . . . , 325) of the entity ID 322 determine the coordinates of the point in the space and thus the location of the point in the space. Various points may be concentrated in various regions; and the cluster analysis 329 is configured to formulate the positioning of the points to drive the clustering of the points. In other embodiments, the cluster analysis 329 can also be performed using the techniques of Self Organizing Maps (SOM), which can identify and show clusters of multi-dimensional data using a representation on a two-dimensional map.

Once the cluster definitions 333 are obtained from the cluster analysis 329, the identity of the cluster (e.g., cluster ID 343) that contains the entity ID 322 can be used to characterize spending behavior of the entity represented by the entity ID 322. The entities in the same cluster are considered to have similar spending behaviors.

Similarities and differences among the entities, such as accounts, individuals, families, etc., as represented by the entity ID (e.g., 322) and characterized by the variable values (e.g., 323, 324, . . . , 325) can be identified via the cluster analysis 329. In one embodiment, after a number of clusters of entity IDs are identified based on the patterns of the aggregated measurements, a set of profiles can be generated for the clusters to represent the characteristics of the clusters. Once the clusters are identified, each of the entity IDs (e.g., corresponding to an account, individual, family) can be assigned to one cluster; and the profile for the corresponding cluster may be used to represent, at least in part, the entity (e.g., account, individual, family). Alternatively, the relationship between an entity (e.g., an account, individual, family) and one or more clusters can be determined (e.g., based on a measurement of closeness to each cluster). Thus, the cluster related data can be used in a transaction profile (127 or 341) to provide information about the behavior of the entity (e.g., an account, an individual, a family).

In one embodiment, more than one set of cluster definitions 333 is generated from cluster analyses 329. For example, cluster analyses 329 may generate different sets of cluster solutions corresponding to different numbers of identified clusters. A set of cluster IDs (e.g., 343) can be used to summarize 335 the spending behavior of the entity represented by the entity ID 322, based on the typical spending behavior of the respective clusters. In one example, two cluster solutions are obtained; one of the cluster solutions has 17 clusters, which classify the entities in a relatively coarse manner; and the other cluster solution has 55 clusters, which classify the entities in a relative fine manner. A cardholder can be identified by the spending behavior of one of the 17 clusters and one of the 55 clusters in which the cardholder is located. Thus, the set of cluster IDs corresponding to the set of cluster solutions provides a hierarchical identification of an entity among clusters of different levels of resolution. The spending behavior of the clusters is represented by the cluster definitions 333, such as the parameters (e.g., variable values) that define the centroids of the clusters.

In one embodiment, the random variables (e.g., 313 and 315) as defined by the definitions 309 have certain degrees of correlation and are not independent from each other. For example, merchants of different merchant categories (e.g., 316) may have overlapping business, or have certain business relationships. For example, certain products and/or services of certain merchants have cause and effect relationships. For example, certain products and/or services of certain merchants are mutually exclusive to a certain degree (e.g., a purchase from one merchant may have a level of probability to exclude the user 101 from making a purchase from another merchant). Such relationships may be complex and difficult to quantify by merely inspecting the categories. Further, such relationships may shift over time as the economy changes.

In one embodiment, a factor analysis 327 is performed to reduce the redundancy and/or correlation among the variables (e.g., 313, 315). The factor analysis 327 identifies the definitions 331 for factors, each of which represents a combination of the variables (e.g., 313, 315).

In one embodiment, a factor is a linear combination of a plurality of the aggregated measurements (e.g., variables (313, 315)) determined for various areas (e.g., merchants or merchant categories, products or product categories). Once the relationship between the factors and the aggregated measurements is determined via factor analysis, the values for the factors can be determined from the linear combinations of the aggregated measurements and be used in a transaction profile (127 or 341) to provide information on the behavior of the entity represented by the entity ID (e.g., an account, an individual, a family).

Once the factor definitions 331 are obtained from the factor analysis 327, the factor definitions 331 can be applied to the variable values 321 to determine factor values 344 for the aggregated spending profile 341. Since redundancy and correlation are reduced in the factors, the number of factors is typically much smaller than the number of the original variables (e.g., 313, 315). Thus, the factor values 344 represent the concise summary of the original variables (e.g., 313, 315).

For example, there may be thousands of variables on spending frequency and amount for different merchant categories; and the factor analysis 327 can reduce the factor number to less than one hundred (and even less than twenty). In one example, a twelve-factor solution is obtained, which allows the use of twelve factors to combine the thousands of the original variables (313, 315); and thus, the spending behavior in thousands of merchant categories can be summarized via twelve factor values 344. In one embodiment, each factor is combination of at least four variables; and a typical variable has contributions to more than one factor.

In one example, hundreds or thousands of transaction records 301 of a cardholder are converted into hundreds or thousands of variable values 321 for various merchant categories, which are summarized 335 via the factor definitions 331 and cluster definitions 333 into twelve factor values 344 and one or two cluster IDs (e.g., 343). The summarized data can be readily interpreted by a human to ascertain the spending behavior of the cardholder. A user 101 may easily specify a spending behavior requirement formulated based on the factor values 344 and the cluster IDs (e.g., to query for a segment of customers, or to request the targeting of a segment of customers). The reduced size of the summarized data reduces the need for data communication bandwidth for communicating the spending behavior of the cardholder over a network connection and allows simplified processing and utilization of the data representing the spending behavior of the cardholder.

In one embodiment, the behavior and characteristics of the clusters are studied to identify a description of a type of representative entities that are found in each of the clusters. The clusters can be named based on the type of representative entities to allow an ordinary person to easily understand the typical behavior of the clusters.

In one embodiment, the behavior and characteristics of the factors are also studied to identify dominant aspects of each factor. The clusters can be named based on the dominant aspects to allow an ordinary person to easily understand the meaning of a factor value.

In FIG. 8, an aggregated spending profile 341 for an entity represented by an entity ID (e.g., 322) includes the cluster ID 343 and factor values 344 determined based on the cluster definitions 333 and the factor definitions 331. The aggregated spending profile 341 may further include other statistical parameters, such as diversity index 342, channel distribution 345, category distribution 346, zip code 347, etc., as further discussed below.

In one embodiment, the diversity index 342 may include an entropy value and/or a Gini coefficient, to represent the diversity of the spending by the entity represented by the entity ID 322 across different areas (e.g., different merchant categories (e.g., 316)). When the diversity index 342 indicates that the diversity of the spending data is under a predetermined threshold level, the variable values (e.g., 323, 324, . . . , 325) for the corresponding entity ID 322 may be excluded from the cluster analysis 329 and/or the factor analysis 327 due to the lack of diversity. When the diversity index 342 of the aggregated spending profile 341 is lower than a predetermined threshold, the factor values 344 and the cluster ID 343 may not accurately represent the spending behavior of the corresponding entity.

In one embodiment, the channel distribution 345 includes a set of percentage values that indicate the percentages of amounts spent in different purchase channels, such as online, via phone, in a retail store, etc.

In one embodiment, the category distribution 346 includes a set of percentage values that indicate the percentages of spending amounts in different super categories 311. In one embodiment, thousands of different merchant categories (e.g., 316) are represented by Merchant Category Codes (MCC), or North American Industry Classification System (NAICS) codes in transaction records 301. These merchant categories (e.g., 316) are classified or combined into less than one hundred super categories (or less than twenty). In one example, fourteen super categories are defined based on domain knowledge.

In one embodiment, the aggregated spending profile 341 includes the aggregated measurements (e.g., frequency, average spending amount) determined for a set of predefined, mutually exclusive merchant categories (e.g., super categories 311). Each of the super merchant categories represents a type of products or services a customer may purchase. A transaction profile (127 or 341) may include the aggregated measurements for each of the set of mutually exclusive merchant categories. The aggregated measurements determined for the predefined, mutually exclusive merchant categories can be used in transaction profiles (127 or 341) to provide information on the behavior of a respective entity (e.g., an account, an individual, or a family).

In one embodiment, the zip code 347 in the aggregated spending profile 341 represents the dominant geographic area in which the spending associated with the entity ID 322 occurred. Alternatively or in combination, the aggregated spending profile 341 may include a distribution of transaction amounts over a set of zip codes that account for a majority of the transactions or transaction amounts (e.g., 90%).

In one embodiment, the factor analysis 327 and cluster analysis 329 are used to summarize the spending behavior across various areas, such as different merchants characterized by merchant category 316, different products and/or services, different consumers, etc. The aggregated spending profile 341 may include more or fewer fields than those illustrated in FIG. 8. For example, in one embodiment, the aggregated spending profile 341 further includes an aggregated spending amount for a period of time (e.g., the past twelve months); in another embodiment, the aggregated spending profile 341 does not include the category distribution 346; and in a further embodiment, the aggregated spending profile 341 may include a set of distance measures to the centroids of the clusters. The distance measures may be defined based on the variable values (323, 324, . . . , 325), or based on the factor values 344. The factor values of the centroids of the clusters may be estimated based on the entity ID (e.g., 322) that is closest to the centroid in the respective cluster.

Other variables can be used in place of, or in additional to, the variables (311, 313, 315) illustrated in FIG. 8. For example, the aggregated spending profile 341 can be generated using variables measuring shopping radius/distance from the primary address of the account holder to the merchant site for offline purchases. When such variables are used, the transaction patterns can be identified based at least in part on clustering according to shopping radius/distance and geographic regions. Similarly, the factor definition 331 may include the consideration of the shopping radius/distance. For example, the transaction records 301 may be aggregated based on the ranges of shopping radius/distance and/or geographic regions. For example, the factor analysis can be used to determine factors that naturally combine geographical areas based on the correlations in the spending patterns in various geographical areas.

In one embodiment, the aggregation 317 may involve the determination of a deviation from a trend or pattern. For example, an account makes a certain number of purchases a week at a merchant over the past 6 months. However, in the past 2 weeks the number of purchases is less than the average number per week. A measurement of the deviation from the trend or pattern can be used (e.g., in a transaction profile (127 or 341) as a parameter, or in variable definitions 309 for the factor analysis 327 and/or the cluster analysis) to define the behavior of an account, an individual, a family, etc.

FIG. 9 shows a method to generate an aggregated spending profile according to one embodiment. In FIG. 9, computation models are established 351 for variables (e.g., 311, 313, and 315). In one embodiment, the variables are defined in a way to capture certain aspects of the spending statistics, such as frequency, amount, etc.

In FIG. 9, data from related accounts are combined 353. For example, when an account number change has occurred for a cardholder in the time period under analysis, the transaction records 301 under the different account numbers of the same cardholder are combined under one account number that represents the cardholder. For example, when the analysis is performed at a person level (or family level, business level, social group level, city level, or region level), the transaction records 301 in different accounts of the person (or family, business, social group, city or region) can be combined under one entity ID 322 that represents the person (or family, business, social group, city or region).

In one embodiment, recurrent/installment transactions are combined 355. For example, multiple monthly payments may be combined and considered as one single purchase.

In FIG. 9, account data are selected 357 according to a set of criteria related to activity, consistency, diversity, etc.

For example, when a cardholder uses a credit card solely to purchase gas, the diversity of the transactions by the cardholder is low. In such a case, the transactions in the account of the cardholder may not be statistically meaningful to represent the spending pattern of the cardholder in various merchant categories. Thus, in one embodiment, if the diversity of the transactions associated with an entity ID 322 is below a threshold, the variable values (e.g., 323, 324, . . . , 325) corresponding to the entity ID 322 are not used in the cluster analysis 329 and/or the factor analysis 327. The diversity can be examined based on the diversity index 342 (e.g., entropy or Gini coefficient), or based on counting the different merchant categories in the transactions associated with the entity ID 322; and when the count of different merchant categories is fewer than a threshold (e.g., 5), the transactions associated with the entity ID 322 are not used in the cluster analysis 329 and/or the factor analysis 327 due to the lack of diversity.

For example, when a cardholder uses a credit card only sporadically (e.g., when running out of cash), the limited transactions by the cardholder may not be statistically meaningful in representing the spending behavior of the cardholder. Thus, in one embodiment, when the numbers of transactions associated with an entity ID 322 is below a threshold, the variable values (e.g., 323, 324, . . . , 325) corresponding to the entity ID 322 are not used in the cluster analysis 329 and/or the factor analysis 327.

For example, when a cardholder has only used a credit card during a portion of the time period under analysis, the transaction records 301 during the time period may not reflect the consistent behavior of the cardholder for the entire time period. Consistency can be checked in various ways. In one example, if the total number of transactions during the first and last months of the time period under analysis is zero, the transactions associated with the entity ID 322 are inconsistent in the time period and thus are not used in the cluster analysis 329 and/or the factor analysis 327. Other criteria can be formulated to detect inconsistency in the transactions.

In FIG. 9, the computation models (e.g., as represented by the variable definitions 309) are applied 359 to the remaining account data (e.g., transaction records 301) to obtain data samples for the variables. The data points associated with the entities, other than those whose transactions fail to meet the minimum requirements for activity, consistency, diversity, etc., are used in factor analysis 327 and cluster analysis 329.

In FIG. 9, the data samples (e.g., variable values 321) are used to perform 361 factor analysis 327 to identify factor solutions (e.g., factor definitions 331). The factor solutions can be adjusted 363 to improve similarity in factor values of different sets of transaction data 109. For example, factor definitions 331 can be applied to the transactions in the time period under analysis (e.g., the past twelve months) and be applied separately to the transactions in a prior time period (e.g., the twelve months before the past twelve months) to obtain two sets of factor values. The factor definitions 331 can be adjusted to improve the correlation between the two set of factor values.

The data samples can also be used to perform 365 cluster analysis 329 to identify cluster solutions (e.g., cluster definitions 333). The cluster solutions can be adjusted 367 to improve similarity in cluster identifications based on different sets of transaction data 109. For example, cluster definitions 333 can be applied to the transactions in the time period under analysis (e.g., the past twelve months) and be applied separately to the transactions in a prior time period (e.g., the twelve months before the past twelve months) to obtain two sets of cluster identifications for various entities. The cluster definitions 333 can be adjusted to improve the correlation between the two set of cluster identifications.

In one embodiment, the number of clusters is determined from clustering analysis. For example, a set of cluster seeds can be initially identified and used to run a known clustering algorithm. The sizes of data points in the clusters are then examined. When a cluster contains less than a predetermined number of data points, the cluster may be eliminated to rerun the clustering analysis.

In one embodiment, standardizing entropy is added to the cluster solution to obtain improved results.

In one embodiment, human understandable characteristics of the factors and clusters are identified 369 to name the factors and clusters. For example, when the spending behavior of a cluster appears to be the behavior of an internet loyalist, the cluster can be named "internet loyalist" such that if a cardholder is found to be in the "internet loyalist" cluster, the spending preferences and patterns of the cardholder can be easily perceived.

In one embodiment, the factor analysis 327 and the cluster analysis 329 are performed periodically (e.g., once a year, or six months) to update the factor definitions 331 and the cluster definitions 333, which may change as the economy and the society change over time.

In FIG. 9, transaction data 109 are summarized 371 using the factor solutions and cluster solutions to generate the aggregated spending profile 341. The aggregated spending profile 341 can be updated more frequently than the factor solutions and cluster solutions, when the new transaction data 109 becomes available. For example, the aggregated spending profile 341 may be updated quarterly or monthly.

Various tweaks and adjustments can be made for the variables (e.g., 313, 315) used for the factor analysis 327 and the cluster analysis 329. For example, the transaction records 301 may be filtered, weighted or constrained, according to different rules to improve the capabilities of the aggregated measurements in indicating certain aspects of the spending behavior of the customers.

For example, in one embodiment, the variables (e.g., 313, 315) are normalized and/or standardized (e.g., using statistical average, mean, and/or variance).

For example, the variables (e.g., 313, 315) for the aggregated measurements can be tuned, via filtering and weighting, to predict the future trend of spending behavior (e.g., for advertisement selection), to identify abnormal behavior (e.g., for fraud prevention), or to identify a change in spending pattern (e.g., for advertisement audience measurement), etc. The aggregated measurements, the factor values 344, and/or the cluster ID 343 generated from the aggregated measurements can be used in a transaction profile (127 or 341) to define the behavior of an account, an individual, a family, etc.

In one embodiment, the transaction data 109 are aged to provide more weight to recent data than older data. In other embodiments, the transaction data 109 are reverse aged. In further embodiments, the transaction data 109 are seasonally adjusted.

In one embodiment, the variables (e.g., 313, 315) are constrained to eliminate extreme outliers. For example, the minimum values and the maximum values of the spending amounts 315 may be constrained based on values at certain percentiles (e.g., the value at one percentile as the minimum and the value at 99 percentile as the maximum) and/or certain predetermined values. In one embodiment, the spending frequency variables 313 are constrained based on values at certain percentiles and median values. For example, the minimum value for a spending frequency variable 313 may be constrained at $P_1-k\times(M-P_1)$, where $P_1$ is the one percentile value, M the median value, and k a predetermined constant (e.g., 0.1). For example, the maximum value for a spending frequency variable 313 may be constrained at $P_{99}+a\times(P_{99}-M)$, where $P_{99}$ is the 99 percentile value, M the median value, and k a predetermined constant (e.g., 0.1).

In one embodiment, variable pruning is performed to reduce the number of variables (e.g., 313, 315) that have less impact on cluster solutions and/or factor solutions. For example, variables with standard variation less than a predetermined threshold (e.g., 0.1) may be discarded for the purpose of cluster analysis 329. For example, analysis of variance (ANOVA) can be performed to identify and remove variables that are no more significant than a predetermined threshold.

The aggregated spending profile 341 can provide information on spending behavior for various application areas, such as marketing, fraud detection and prevention, creditworthiness assessment, loyalty analytics, targeting of offers, etc.

For example, clusters can be used to optimize offers for various groups within an advertisement campaign. The use of factors and clusters to target advertisement can improve the speed of producing targeting models. For example, using variables based on factors and clusters (and thus eliminating the need to use a large number of convention variables) can improve predictive models and increase efficiency of targeting by reducing the number of variables examined. The variables formulated based on factors and/or clusters can be used with other variables to build predictive models based on spending behaviors.

In one embodiment, the aggregated spending profile 341 can be used to monitor risks in transactions. Factor values are typically consistent over time for each entity. An abrupt change in some of the factor values may indicate a change in financial conditions, or a fraudulent use of the account. Models formulated using factors and clusters can be used to identify a series of transactions that do not follow a normal pattern specified by the factor values 344 and/or the cluster ID 343. Potential bankruptcies can be predicted by analyzing the change of factor values over time; and significant changes in spending behavior may be detected to stop and/or prevent fraudulent activities.

For example, the factor values 344 can be used in regression models and/or neural network models for the detection of certain behaviors or patterns. Since factors are relatively non-collinear, the factors can work well as independent variables. For example, factors and clusters can be used as independent variables in tree models.

For example, surrogate accounts can be selected for the construction of a quasi-control group. For example, for a given account A that is in one cluster, the account B that is closest to the account A in the same cluster can be selected as a surrogate account of the account B. The closeness can be determined by certain values in the aggregated spending profile 341, such as factor values 344, category distribution 346, etc. For example, a Euclidian distance defined based on the set of values from the aggregated spending profile 341 can be used to compare the distances between the accounts. Once identified, the surrogate account can be used to reduce or eliminate bias in measurements. For example, to determine the effect of an advertisement, the spending pattern response of the account A that is exposed to the advertisement can be compared to the spending pattern response of the account B that is not exposed to the advertisement.

For example, the aggregated spending profile 341 can be used in segmentation and/or filtering analysis, such as selecting cardholders having similar spending behaviors identified via factors and/or clusters for targeted advertisement campaigns, and selecting and determining a group of merchants that could be potentially marketed towards cardholders originating in a given cluster (e.g., for bundled offers). For example, a query interface can be provided to allow the query to identify a targeted population based on a set of criteria formulated using the values of clusters and factors.

For example, the aggregated spending profile 341 can be used in a spending comparison report, such as comparing a sub-population of interest against the overall population, determining how cluster distributions and mean factor values differ, and building reports for merchants and/or issuers for benchmarking purposes. For example, reports can be generated according to clusters in an automated way for the merchants. For example, the aggregated spending profile 341 can be used in geographic reports by identifying geographic areas where cardholders shop most frequently and comparing predominant spending locations with cardholder residence locations.

In one embodiment, the profile generator 121 provides affinity relationship data in the transaction profiles 127 so that the transaction profiles 127 can be shared with business partners without compromising the privacy of the users 101 and the transaction details.

For example, in one embodiment, the profile generator 121 is to identify clusters of entities (e.g., accounts, cardholders, families, businesses, cities, regions, etc.) based on the spending patterns of the entities. The clusters represent entity segments identified based on the spending patterns of the entities reflected in the transaction data 109 or the transaction records 301.

In one embodiment, the clusters correspond to cells or regions in the mathematical space that contain the respective groups of entities. For example, the mathematical space representing the characteristics of users 101 may be divided into clusters (cells or regions). For example, the cluster analysis 329 may identify one cluster in the cell or region that contains a cluster of entity IDs (e.g., 322) in the space having a plurality of dimensions corresponding to the variables (e.g., 313 and 315). For example, a cluster can also be identified as a cell or region in a space defined by the factors using the factor definitions 331 generated from the factor analysis 327.

In one embodiment, the parameters used in the aggregated spending profile 341 can be used to define a segment or a cluster of entities. For example, a value for the cluster ID 343 and a set of ranges for the factor values 344 and/or other values can be used to define a segment.

In one embodiment, a set of clusters are standardized to represent the predilection of entities in various groups for certain products or services. For example, a set of standardized clusters can be formulated for people who have shopped, for example, at home improvement stores. The cardholders in the same cluster have similar spending behavior.

In one embodiment, the tendency or likelihood of a user 101 being in a particular cluster (i.e. the user's affinity to the cell) can be characterized using a value, based on past purchases. The same user 101 may have different affinity values for different clusters.

For example, a set of affinity values can be computed for an entity, based on the transaction records 301, to indicate the closeness or predilection of the entity to the set of standardized clusters. For example, a cardholder who has a first value representing affinity of the cardholder to a first cluster may have a second value representing affinity of the cardholder to a second cluster. For example, if a consumer buys a lot of electronics, the affinity value of the consumer to the electronics cluster is high.

In one embodiment, other indicators are formulated across the merchant community and cardholder behavior and provided in the profile (e.g., 127 or 341) to indicate the risk of a transaction.

In one embodiment, the relationship of a pair of values from two different clusters provides an indication of the likelihood that the user 101 is in one of the two cells, if the user 101 is shown to be in the other cell. For example, if the likelihood of the user 101 to purchase each of two types of products is known, the scores can be used to determine the likelihood of the user 101 buying one of the two types of products if the user 101 is known to be interested in the other type of products. In one embodiment, a map of the values for the clusters is used in a profile (e.g., 127 or 341) to characterize the spending behavior of the user 101 (or other types of entities, such as a family, company, neighborhood, city, or other types of groups defined by other aggregate parameters, such as time of day, etc.).

In one embodiment, the clusters and affinity information are standardized to allow sharing between business partners, such as transaction processing organizations, search providers, and marketers. Purchase statistics and search statistics are generally described in different ways. For example, purchase statistics are based on merchants, merchant categories, SKU numbers, product descriptions, etc.; and search statistics are based on search terms. Once the clusters are standardized, the clusters can be used to link purchase information based merchant categories (and/or SKU numbers, product descriptions) with search information based on search terms. Thus, search predilection and purchase predilection can be mapped to each other.

In one embodiment, the purchase data and the search data (or other third party data) are correlated based on mapping to the standardized clusters (cells or segments). The purchase data and the search data (or other third party data) can be used together to provide benefits or offers (e.g., coupons) to consumers. For example, standardized clusters can be used as a marketing tool to provide relevant benefits, including coupons, statement credits, or the like to consumers who are within or are associated with common clusters. For example, a data exchange apparatus may obtain cluster data based on consumer search engine data and actual payment transaction data to identify like groups of individuals who may respond favorably to particular types of benefits, such as coupons and statement credits.

Details about aggregated spending profile 341 in one embodiment are provided in U.S. patent application Ser. No. 12/777,173, filed May 10, 2010 and entitled "Systems and Methods to Summarize Transaction Data," the disclosure of which is hereby incorporated herein by reference.

Transaction Data Based Portal

In FIG. 7, the transaction terminal 105 initiates the transaction for a user 101 (e.g., a customer) for processing by a transaction handler 103. The transaction handler 103 processes the transaction and stores transaction data 109 about the transaction, in connection with account data 111, such as the account profile of an account of the user 101. The account data 111 may further include data about the user 101, collected from issuers or merchants, and/or other sources, such as social networks, credit bureaus, merchant provided information, address information, etc. In one embodiment, a transaction may be initiated by a server (e.g., based on a stored schedule for recurrent payments).

Over a period of time, the transaction handler 103 accumulates the transaction data 109 from transactions initiated at different transaction terminals (e.g., 105) for different users (e.g., 101). The transaction data 109 thus includes information on purchases made by various users (e.g., 101) at various times via different purchases options (e.g., online purchase, offline purchase from a retail store, mail order, order via phone, etc.)

In one embodiment, the accumulated transaction data 109 and the corresponding account data 111 are used to generate intelligence information about the purchase behavior, pattern, preference, tendency, frequency, trend, amount and/or propensity of the users (e.g., 101), as individuals or as a member of a group. The intelligence information can then be used to generate, identify and/or select targeted advertisements for presentation to the user 101 on the point of interaction 107, during a transaction, after a transaction, or when other opportunities arise.

FIG. 10 shows a system to provide information based on transaction data 109 according to one embodiment. In FIG. 10, the transaction handler 103 is coupled between an issuer processor 145 and an acquirer processor 147 to facilitate authorization and settlement of transactions between a consumer account 146 and a merchant account 148. The transaction handler 103 records the transactions in the data warehouse 149. The portal 143 is coupled to the data warehouse 149 to provide information based on the transaction records 301, such as the transaction profiles 127 or aggregated spending profile 341. The portal 143 may be implemented as a web portal, a telephone gateway, a file/data server, etc.

In one embodiment, the portal 143 is configured to provide information, such as transaction profiles 127 to third parties. Further, the portal 143 may register certain users 101 for various programs, such as a loyalty program to provide rewards and/or offers to the users 101.

In one embodiment, the portal 143 is to register the interest of users 101, or to obtain permissions from the users 101 to gather further information about the users 101, such as data capturing purchase details, online activities, etc.

In one embodiment, the user 101 may register via the issuer; and the registration data in the consumer account 146 may propagate to the data warehouse 149 upon approval from the user 101.

In one embodiment, the portal 143 is to register merchants and provide services and/or information to merchants.

In one embodiment, the portal 143 is to receive information from third parties, such as search engines, merchants, web sites, etc. The third party data can be correlated with the transaction data 109 to identify the relationships between purchases and other events, such as searches, news announcements, conferences, meetings, etc., and improve the prediction capability and accuracy.

In FIG. 10, the consumer account 146 is under the control of the issuer processor 145. The consumer account 146 may be owned by an individual, or an organization such as a business, a school, etc. The consumer account 146 may be a credit account, a debit account, or a stored value account. The issuer may provide the consumer (e.g., user 101) an account identification device 141 to identify the consumer account 146 using the account information 142. The respective consumer of the account 146 can be called an account holder or a cardholder, even when the consumer is not physically issued a card, or the account identification device 141, in one embodiment. The issuer processor 145 is to charge the consumer account 146 to pay for purchases.

In one embodiment, the account identification device 141 is a plastic card having a magnetic strip storing account information 142 identifying the consumer account 146 and/or the issuer processor 145. Alternatively, the account identification device 141 is a smartcard having an integrated circuit chip storing at least the account information 142. In one embodiment, the account identification device 141 includes a mobile phone having an integrated smartcard.

In one embodiment, the account information 142 is printed or embossed on the account identification device 141. The account information 142 may be printed as a bar code to allow the transaction terminal 105 to read the information via an optical scanner. The account information 142 may be stored in a memory of the account identification device 141 and configured to be read via wireless, contactless communications, such as near field communications via magnetic field coupling, infrared communications, or radio frequency communications. Alternatively, the transaction terminal 105 may require contact with the account identification device 141 to read the account information 142 (e.g., by reading the magnetic strip of a card with a magnetic strip reader).

In one embodiment, the transaction terminal 105 is configured to transmit an authorization request message to the acquirer processor 147. The authorization request includes the account information 142, an amount of payment, and information about the merchant (e.g., an indication of the merchant account 148). The acquirer processor 147 requests the transaction handler 103 to process the authorization request, based on the account information 142 received in the transaction terminal 105. The transaction handler 103 routes the authorization request to the issuer processor 145 and may process and respond to the authorization request when the issuer processor 145 is not available. The issuer processor 145 determines whether to authorize the transaction based at least in part on a balance of the consumer account 146.

In one embodiment, the transaction handler 103, the issuer processor 145, and the acquirer processor 147 may each include a subsystem to identify the risk in the transaction and may reject the transaction based on the risk assessment.

In one embodiment, the account identification device 141 includes security features to prevent unauthorized uses of the consumer account 146, such as a logo to show the authenticity of the account identification device 141, encryption to protect the account information 142, etc.

In one embodiment, the transaction terminal 105 is configured to interact with the account identification device 141 to obtain the account information 142 that identifies the consumer account 146 and/or the issuer processor 145. The transaction terminal 105 communicates with the acquirer processor 147 that controls the merchant account 148 of a merchant. The transaction terminal 105 may communicate with the acquirer processor 147 via a data communication connection, such as a telephone connection, an Internet connection, etc. The acquirer processor 147 is to collect payments into the merchant account 148 on behalf of the merchant.

In one embodiment, the transaction terminal 105 is a POS terminal at a traditional, offline, "brick and mortar" retail store. In another embodiment, the transaction terminal 105 is an online server that receives account information 142 of the consumer account 146 from the user 101 through a web connection. In one embodiment, the user 101 may provide account information 142 through a telephone call, via verbal communications with a representative of the merchant; and the representative enters the account information 142 into the transaction terminal 105 to initiate the transaction.

In one embodiment, the account information 142 can be entered directly into the transaction terminal 105 to make payment from the consumer account 146, without having to physically present the account identification device 141. When a transaction is initiated without physically presenting an account identification device 141, the transaction is classified as a "card-not-present" (CNP) transaction.

In one embodiment, the issuer processor 145 may control more than one consumer account 146; the acquirer processor 147 may control more than one merchant account 148; and the transaction handler 103 is connected between a plurality of issuer processors (e.g., 145) and a plurality of acquirer processors (e.g., 147). An entity (e.g., bank) may operate both an issuer processor 145 and an acquirer processor 147.

In one embodiment, the transaction handler 103, the issuer processor 145, the acquirer processor 147, the transaction terminal 105, the portal 143, and other devices and/or services accessing the portal 143 are connected via communications networks, such as local area networks, cellular telecommunications networks, wireless wide area networks, wireless local area networks, an intranet, and Internet. In one embodiment, dedicated communication channels are used between the transaction handler 103 and the issuer processor 145, between the transaction handler 103 and the acquirer processor 147, and/or between the portal 143 and the transaction handler 103.

In one embodiment, the transaction handler 103 uses the data warehouse 149 to store the records about the transactions, such as the transaction records 301 or transaction data 109. In one embodiment, the transaction handler 103 includes a powerful computer, or cluster of computers functioning as a unit, controlled by instructions stored on a computer readable medium.

In one embodiment, the transaction handler 103 is configured to support and deliver authorization services, exception file services, and clearing and settlement services. In one embodiment, the transaction handler 103 has a subsystem to process authorization requests and another subsystem to perform clearing and settlement services.

In one embodiment, the transaction handler 103 is configured to process different types of transactions, such credit card transactions, debit card transactions, prepaid card transactions, and other types of commercial transactions.

In one embodiment, the transaction handler 103 facilitates the communications between the issuer processor 145 and the acquirer processor 147.

In one embodiment, the transaction terminal 105 is configured to submit the authorized transactions to the acquirer processor 147 for settlement. The amount for the settlement may be different from the amount specified in the authorization request. The transaction handler 103 is coupled between the issuer processor 145 and the acquirer processor 147 to facilitate the clearing and settling of the transaction. Clearing includes the exchange of financial information between the issuer processor 145 and the acquirer processor 147; and settlement includes the exchange of funds.

In one embodiment, the issuer processor 145 is to provide funds to make payments on behalf of the consumer account 146. The acquirer processor 147 is to receive the funds on behalf of the merchant account 148. The issuer processor 145 and the acquirer processor 147 communicate with the transaction handler 103 to coordinate the transfer of funds for the transaction. In one embodiment, the funds are transferred electronically.

In one embodiment, the transaction terminal 105 may submit a transaction directly for settlement, without having to separately submit an authorization request.

In one embodiment, the portal 143 provides a user interface to allow the user 101 to organize the transactions in one or more consumer accounts 145 of the user with one or more issuers. The user 101 may organize the transactions using information and/or categories identified in the transaction records 301, such as merchant category 316, transaction date 303, amount 314, etc. Examples and techniques in one embodiment are provided in U.S. patent application Ser. No. 11/378,215, filed Mar. 16, 2006, assigned Pub. No. 2007/0055597, and entitled "Method and System for Manipulating Purchase Information," the disclosure of which is hereby incorporated herein by reference.

In one embodiment, the portal 143 provides transaction based statistics, such as indicators for retail spending monitoring, indicators for merchant benchmarking, industry/market segmentation, indicators of spending patterns, etc. Further examples can be found in U.S. patent application Ser. No. 12/191,796, filed Aug. 14, 2008, assigned Pub. No. 2009/0048884, and entitled "Merchant Benchmarking Tool," U.S. patent application Ser. No. 12/940,562, filed Nov. 5, 2010, and U.S. patent application Ser. No. 12/940,664, filed Nov. 5, 2010, the disclosures of which applications are hereby incorporated herein by reference.

Transaction Terminal

FIG. 11 illustrates a transaction terminal according to one embodiment. In FIG. 11, the transaction terminal 105 is configured to interact with an account identification device 141 to obtain account information 142 about the consumer account 146.

In one embodiment, the transaction terminal 105 includes a memory 167 coupled to the processor 151, which controls the operations of a reader 163, an input device 153, an output device 165 and a network interface 161. The memory 167 may store instructions for the processor 151 and/or data, such as an identification that is associated with the merchant account 148.

In one embodiment, the reader 163 includes a magnetic strip reader. In another embodiment, the reader 163 includes a contactless reader, such as a radio frequency identification (RFID) reader, a near field communications (NFC) device configured to read data via magnetic field coupling (in accordance with ISO standard 14443/NFC), a Bluetooth transceiver, a WiFi transceiver, an infrared transceiver, a laser scanner, etc.

In one embodiment, the input device 153 includes key buttons that can be used to enter the account information 142 directly into the transaction terminal 105 without the physical presence of the account identification device 141. The input device 153 can be configured to provide further information to initiate a transaction, such as a personal identification number (PIN), password, zip code, etc. that may be used to access the account identification device 141, or in combination with the account information 142 obtained from the account identification device 141.

In one embodiment, the output device 165 may include a display, a speaker, and/or a printer to present information, such as the result of an authorization request, a receipt for the transaction, an advertisement, etc.

In one embodiment, the network interface 161 is configured to communicate with the acquirer processor 147 via a telephone connection, an Internet connection, or a dedicated data communication channel.

In one embodiment, the instructions stored in the memory 167 are configured at least to cause the transaction terminal 105 to send an authorization request message to the acquirer processor 147 to initiate a transaction. The transaction terminal 105 may or may not send a separate request for the clearing and settling of the transaction. The instructions stored in the memory 167 are also configured to cause the transaction terminal 105 to perform other types of functions discussed in this description.

In one embodiment, a transaction terminal 105 may have fewer components than those illustrated in FIG. 11. For example, in one embodiment, the transaction terminal 105 is configured for "card-not-present" transactions; and the transaction terminal 105 does not have a reader 163.

In one embodiment, a transaction terminal 105 may have more components than those illustrated in FIG. 11. For example, in one embodiment, the transaction terminal 105 is an ATM machine, which includes components to dispense cash under certain conditions.

Account Identification Device

FIG. 12 illustrates an account identifying device according to one embodiment. In FIG. 12, the account identification device 141 is configured to carry account information 142 that identifies the consumer account 146.

In one embodiment, the account identification device 141 includes a memory 167 coupled to the processor 151, which controls the operations of a communication device 159, an input device 153, an audio device 157 and a display device 155. The memory 167 may store instructions for the processor 151 and/or data, such as the account information 142 associated with the consumer account 146.

In one embodiment, the account information 142 includes an identifier identifying the issuer (and thus the issuer processor 145) among a plurality of issuers, and an identifier identifying the consumer account among a plurality of consumer accounts controlled by the issuer processor 145. The account information 142 may include an expiration date of the account identification device 141, the name of the consumer holding the consumer account 146, and/or an identifier identifying the account identification device 141 among a plurality of account identification devices associated with the consumer account 146.

In one embodiment, the account information 142 may further include a loyalty program account number, accumulated rewards of the consumer in the loyalty program, an address of the consumer, a balance of the consumer account 146, transit information (e.g., a subway or train pass), access information (e.g., access badges), and/or consumer information (e.g., name, date of birth), etc.

In one embodiment, the memory includes a nonvolatile memory, such as magnetic strip, a memory chip, a flash memory, a Read Only Memory (ROM), etc. to store the account information 142.

In one embodiment, the information stored in the memory 167 of the account identification device 141 may also be in the form of data tracks that are traditionally associated with credits cards. Such tracks include Track 1 and Track 2. Track 1 ("International Air Transport Association") stores more information than Track 2, and contains the cardholder's name as well as the account number and other discretionary data. Track 1 is sometimes used by airlines when securing reservations with a credit card. Track 2 ("American Banking Association") is currently most commonly used and is read by ATMs and credit card checkers. The ABA (American Banking Association) designed the specifications of Track 1 and banks abide by it. It contains the cardholder's account number, encrypted PIN, and other discretionary data.

In one embodiment, the communication device 159 includes a semiconductor chip to implement a transceiver for communication with the reader 163 and an antenna to provide and/or receive wireless signals.

In one embodiment, the communication device 159 is configured to communicate with the reader 163. The communication device 159 may include a transmitter to transmit the account information 142 via wireless transmissions, such as radio frequency signals, magnetic coupling, or infrared, Bluetooth or WiFi signals, etc.

In one embodiment, the account identification device 141 is in the form of a mobile phone, personal digital assistant (PDA), etc. The input device 153 can be used to provide input to the processor 151 to control the operation of the account identification device 141; and the audio device 157 and the display device 155 may present status information and/or other information, such as advertisements or offers. The account identification device 141 may include further components that are not shown in FIG. 12, such as a cellular communications subsystem.

In one embodiment, the communication device 159 may access the account information 142 stored on the memory 167 without going through the processor 151.

In one embodiment, the account identification device 141 has fewer components than those illustrated in FIG. 12. For example, an account identification device 141 does not have the input device 153, the audio device 157 and the display device 155 in one embodiment; and in another embodiment, an account identification device 141 does not have components (151-159).

For example, in one embodiment, an account identification device 141 is in the form of a debit card, a credit card, a smartcard, or a consumer device that has optional features such as magnetic strips, or smartcards.

An example of an account identification device 141 is a magnetic strip attached to a plastic substrate in the form of a card. The magnetic strip is used as the memory 167 of the account identification device 141 to provide the account information 142. Consumer information, such as account number, expiration date, and consumer name may be printed or embossed on the card. A semiconductor chip implementing the memory 167 and the communication device 159 may also be embedded in the plastic card to provide account information 142 in one embodiment. In one embodiment, the account identification device 141 has the semiconductor chip but not the magnetic strip.

In one embodiment, the account identification device 141 is integrated with a security device, such as an access card, a radio frequency identification (RFID) tag, a security card, a transponder, etc.

In one embodiment, the account identification device 141 is a handheld and compact device. In one embodiment, the account identification device 141 has a size suitable to be placed in a wallet or pocket of the consumer.

Some examples of an account identification device 141 include a credit card, a debit card, a stored value device, a payment card, a gift card, a smartcard, a smart media card, a payroll card, a health care card, a wrist band, a keychain device, a supermarket discount card, a transponder, and a machine readable medium containing account information 142.

Point of Interaction

In one embodiment, the point of interaction 107 is to provide an advertisement to the user 101, or to provide information derived from the transaction data 109 to the user 101.

In one embodiment, an advertisement is a marketing interaction which may include an announcement and/or an offer of a benefit, such as a discount, incentive, reward, coupon, gift, cash back, or opportunity (e.g., special ticket/ admission). An advertisement may include an offer of a product or service, an announcement of a product or service, or a presentation of a brand of products or services, or a notice of events, facts, opinions, etc. The advertisements can be presented in text, graphics, audio, video, or animation, and as printed matter, web content, interactive media, etc. An advertisement may be presented in response to the presence of a financial transaction card, or in response to a financial transaction card being used to make a financial transaction, or in response to other user activities, such as browsing a web page, submitting a search request, communicating online, entering a wireless communication zone, etc. In one embodiment, the presentation of advertisements may be not a result of a user action.

In one embodiment, the point of interaction 107 can be one of various endpoints of the transaction network, such as point of sale (POS) terminals, automated teller machines (ATMs), electronic kiosks (or computer kiosks or interactive kiosks), self-assist checkout terminals, vending machines, gas pumps, websites of banks (e.g., issuer banks or acquirer banks of credit cards), bank statements (e.g., credit card statements), websites of the transaction handler 103, websites of merchants, checkout websites or web pages for online purchases, etc.

In one embodiment, the point of interaction 107 may be the same as the transaction terminal 105, such as a point of sale (POS) terminal, an automated teller machine (ATM), a mobile phone, a computer of the user for an online transaction, etc. In one embodiment, the point of interaction 107 may be co-located with the transaction terminal 105, or produced by the transaction terminal (e.g., a receipt produced by the transaction terminal 105). In one embodiment, the point of interaction 107 may be separate from and not co-located with the transaction terminal 105, such as a mobile phone, a personal digital assistant, a personal computer of the user, a voice mail box of the user, an email inbox of the user, etc.

For example, the advertisements can be presented on a portion of media for a transaction with the customer, which portion might otherwise be unused and thus referred to as a "white space" herein. A white space can be on a printed matter (e.g., a receipt printed for the transaction, or a printed credit card statement), on a video display (e.g., a display monitor of a POS terminal for a retail transaction, an ATM for cash withdrawal or money transfer, a personal computer of the customer for online purchases), or on an audio channel (e.g., an interactive voice response (IVR) system for a transaction over a telephonic device).

In one embodiment, the white space is part of a media channel available to present a message from the transaction handler 103 in connection with the processing of a transaction of the user 101. In one embodiment, the white space is in a media channel that is used to report information about a transaction of the user 101, such as an authorization status, a confirmation message, a verification message, a user interface to verify a password for the online use of the account information 142, a monthly statement, an alert or a report, or a web page provided by the portal 143 to access a loyalty program associated with the consumer account 146 or a registration program.

In other embodiments, the advertisements can also be presented via other media channels which may not involve a transaction processed by the transaction handler 103. For example, the advertisements can be presented on publications or announcements (e.g., newspapers, magazines, books, directories, radio broadcasts, television, etc., which may be in an electronic form, or in a printed or painted form). The advertisements may be presented on paper, on websites, on billboards, or on audio portals.

In one embodiment, the transaction handler 103 purchases the rights to use the media channels from the owner or operators of the media channels and uses the media channels as advertisement spaces. For example, white spaces at a point of interaction (e.g., 107) with customers for transactions processed by the transaction handler 103 can be used to deliver advertisements relevant to the customers conducting the transactions; and the advertisement can be selected based at least in part on the intelligence information derived from the accumulated transaction data 109 and/or the context at the point of interaction 107 and/or the transaction terminal 105.

In general, a point of interaction (e.g., 107) may or may not be capable of receiving inputs from the customers, and may or may not co-located with a transaction terminal (e.g., 105) that initiates the transactions. The white spaces for presenting the advertisement on the point of interaction 107 may be on a portion of a geographical display space (e.g., on a screen), or on a temporal space (e.g., in an audio stream).

In one embodiment, the point of interaction 107 may be used to primarily to access services not provided by the transaction handler 103, such as services provided by a search engine, a social networking website, an online marketplace, a blog, a news site, a television program provider, a radio station, a satellite, a publisher, etc.

In one embodiment, a consumer device is used as the point of interaction 107, which may be a non-portable consumer device or a portable computing device. The consumer device is to provide media content to the user 101 and may receive input from the user 101.

Examples of non-portable consumer devices include a computer terminal, a television set, a personal computer, a set-top box, or the like. Examples of portable consumer devices include a portable computer, a cellular phone, a personal digital assistant (PDA), a pager, a security card, a wireless terminal, or the like. The consumer device may be implemented as a data processing system as illustrated in FIG. 13, with more or fewer components.

In one embodiment, the consumer device includes an account identification device 141. For example, a smart card used as an account identification device 141 is integrated with a mobile phone, or a personal digital assistant (PDA).

In one embodiment, the point of interaction 107 is integrated with a transaction terminal 105. For example, a self-service checkout terminal includes a touch pad to interact with the user 101; and an ATM machine includes a user interface subsystem to interact with the user 101.

Hardware

In one embodiment, a computing apparatus is configured to include some of the modules or components illustrated in FIGS. 7 and 10, such as the transaction handler 103, the profile generator 121, the media controller 115, the portal 143, the profile selector 129, the advertisement selector 133, the user tracker 113, the correlator, and their associated storage devices, such as the data warehouse 149.

In one embodiment, at least some of the modules or components illustrated in FIGS. 7 and 10, such as the transaction handler 103, the transaction terminal 105, the point of interaction 107, the user tracker 113, the media controller 115, the correlator 117, the profile generator 121, the profile selector 129, the advertisement selector 133, the portal 143, the issuer processor 145, the acquirer processor 147, and the account identification device 141, can be implemented as a computer system, such as a data processing system illustrated in FIG. 13, with more or fewer components. Some of the modules may share hardware or be combined on a computer system. In one embodiment, a network of computers can be used to implement one or more of the modules.

Further, the data illustrated in FIG. 7, such as transaction data 109, account data 111, transaction profiles 127, and advertisement data 135, can be stored in storage devices of one or more computers accessible to the corresponding modules illustrated in FIG. 7. For example, the transaction data 109 can be stored in the data warehouse 149 that can be implemented as a data processing system illustrated in FIG. 13, with more or fewer components.

In one embodiment, the transaction handler 103 is a payment processing system, or a payment card processor, such as a card processor for credit cards, debit cards, etc.

FIG. 13 illustrates a data processing system according to one embodiment. While FIG. 13 illustrates various components of a computer system, it is not intended to represent any particular architecture or manner of interconnecting the components. One embodiment may use other systems that have fewer or more components than those shown in FIG. 13.

In FIG. 13, the data processing system 170 includes an inter-connect 171 (e.g., bus and system core logic), which interconnects a microprocessor(s) 173 and memory 167. The microprocessor 173 is coupled to cache memory 179 in the example of FIG. 13.

In one embodiment, the inter-connect 171 interconnects the microprocessor(s) 173 and the memory 167 together and also interconnects them to input/output (I/O) device(s) 175 via I/O controller(s) 177. I/O devices 175 may include a display device and/or peripheral devices, such as mice, keyboards, modems, network interfaces, printers, scanners, video cameras and other devices known in the art. In one embodiment, when the data processing system is a server system, some of the I/O devices 175, such as printers, scanners, mice, and/or keyboards, are optional.

In one embodiment, the inter-connect 171 includes one or more buses connected to one another through various bridges, controllers and/or adapters. In one embodiment the I/O controllers 177 include a USB (Universal Serial Bus) adapter for controlling USB peripherals, and/or an IEEE-1394 bus adapter for controlling IEEE-1394 peripherals.

In one embodiment, the memory 167 includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Other Aspects

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method of generating a targeted communication comprising a list of a plurality of potential entities for a proposed transaction and causing the targeted communication to be displayed on a device of a first user, comprising:

generating, by a token processing system, a plurality of tokens for a plurality of users, the plurality of tokens including a first token;

storing, by the token processing system in a plurality of token data records of a database, token data for the plurality of users;

receiving from a transaction handler, information regarding a plurality of completed transactions for the plurality of users, the information comprising data associated with a first transaction to which the first token is applied by one of the plurality of users, the transaction handler configured to receive from acquirer processors authorization requests for payments to be made by issuer processors according to account identifiers of users;

in response to receiving information regarding the first transaction from the transaction handler, updating, by the token processing system in the database, a first token data record for the first token;

receiving, by at least one processor, a query from the first user regarding a proposed transaction;

receiving, by the at least one processor, from a social server, social data of the plurality of users;

associating, by the at least one processor, the first user with a first cluster;

selecting, by the at least one processor, a second cluster associated with the plurality of potential entities for the proposed transaction based on an affinity between the first cluster and the second cluster, the affinity being determined based on the information regarding the completed transactions received from the transaction handler, the social data from the social server, and the data stored by the token processing system regarding the network of users associated with the first token;

determining, by the at least one processor, at least one affinity between the first user and each of the plurality of potential entities associated with the second cluster based on the information regarding the completed transactions received from the transaction handler, the social data from the social server, and data stored by the token processing system regarding a network of users associated with the first token;

determining a ranking for each of the plurality of potential entities associated with the second cluster for the proposed transaction based on the at least one affinity, wherein determining the ranking comprises accessing the database to obtain information in the first token data record of the token processing system;

selecting a plurality of selected entities based on the ranking for each of the potential entities;

sending, in response to the query, the plurality of selected entities to the first user for display on the user device of the first user;

causing display on the user device of the ranking for each of the plurality of selected entities;

after the proposed transaction becomes a completed transaction via the transaction handler, receiving, based on input into a user interface of the user device, feedback information regarding the completed transaction; and updating, by the at least one processor, the at least one affinity based on the feedback information for use when causing displays on user devices in response to other queries regarding proposed transactions.

2. The method of claim 1, wherein the first cluster is a first network and the second cluster is a second network, the method further comprising defining the first network and the second network by the token processing system.

3. The method of claim 1, wherein the feedback information is a numerical ranking.

4. The method of claim 1, wherein the plurality of users comprises the plurality of potential entities.

5. A system for generating a targeted communication comprising a list of a plurality of potential entities for a proposed transaction and causing the targeted communication to be displayed on a device of a first user, comprising:
at least one processor; and
memory storing instructions configured to instruct the at least one processor to:
generate, by a token processing system, a plurality of tokens for a plurality of users, the plurality of tokens including a first token;
store, by the token processing system, token data for the plurality of users in a plurality of token data records of a database;
receive from a transaction handler, information regarding a plurality of completed transactions for the plurality of users, the information comprising data associated with a first transaction to which the first token is applied by one of the plurality of users, the transaction handler configured to receive from acquirer processors authorization requests for payments to be made by issuer processors according to account identifiers of users;
in response to receiving information regarding the first transaction, update, in the database, a first token data record for the first token;
receive a query from the first user regarding a proposed transaction;
receive from a social server, social data of the plurality of users;
associate the first user with a first cluster;
selecting a second cluster associated with the plurality of potential entities for the proposed transaction based on an affinity between the first cluster and the second cluster, the affinity being determined based on the information regarding the completed transactions received from the transaction handler, the social data from the social server, and the data stored by the token processing system regarding the network of users associated with the first token;
determine at least one affinity between the first user and each of the plurality of potential entities associated with the second cluster based on the information regarding the completed transactions received from the transaction handler, the social data from the social server, and data stored by the token processing system regarding a network of users associated with the first token;
determine a ranking for each of the plurality of potential entities associated with the second cluster for the proposed transaction based on the at least one affinity, wherein the determining the ranking comprises accessing the database to obtain information in the first token data record of the token processing system;
select a plurality of selected entities based on the ranking for each of the potential entities;
send, in response to the query, the plurality of selected entities to the first user for display on the user device of the first user;
cause display on the user device of the ranking for each of the plurality of selected entities;
after the proposed transaction becomes a completed transaction via the transaction handler, receive, based on input into a user interface of the user device, feedback information regarding the completed transaction; and
update the at least one affinity based on the feedback information for use when causing displays on user devices in response to other queries regarding proposed transactions.

6. The system of claim 5, wherein the first cluster is a first network and the second cluster is a second network, and wherein the instructions are further configured to instruct the at least one processor to define the first network and the second network by the token processing system.

7. The system of claim 5, wherein the plurality of users comprises the plurality of potential entities.

8. The system of claim 5, wherein the receiving the information comprises receiving transaction data for the plurality of transactions by a transaction handler configured to receive from acquirer processors authorization requests for payments to be made by issuer processors according to account identifiers of users.

9. A non-transitory computer-readable storage medium for generating a targeted communication comprising a list of a plurality of potential entities for a proposed transaction and causing the targeted communication to be displayed on a device of a first user, the non-transitory computer-readable storage medium storing computer-readable instructions, which when executed, cause a computer system to:
generate, by a token processing system, a plurality of tokens for a plurality of users, the plurality of tokens including a first token;
store, by the token processing system, token data for the plurality of users in a plurality of token data records of a database;
receive from a transaction handler, information regarding a plurality of completed transactions for the plurality of users, the information comprising data associated with a first transaction to which the first token is applied by one of the plurality of users, the transaction handler configured to receive from acquirer processors authorization requests for payments to be made by issuer processors according to account identifiers of users;
in response to receiving information regarding the first transaction, update, in the database, a first token data record for the first token;
receive, by a computing apparatus, a query from the first user regarding a proposed transaction;
receive, by the at least one processor, from a social server, social data of the plurality of users;
associate the first user with a first cluster;
select a second cluster associated with the plurality of potential entities for the proposed transaction based on an affinity between the first cluster and the second cluster, the affinity being determined based on the information regarding the completed transactions received from the transaction handler, the social data from the social server, and the data stored by the token processing system regarding the network of users associated with the first token;
determine, by the computing apparatus, at least one affinity between the first user and each of the plurality of potential entities associated with the second cluster based on the information regarding the completed transactions received from the transaction handler, the social data from the social server, and data stored by the token processing system regarding a network of users associated with the first token;

determine a ranking for each of the plurality of potential entities associated with the second cluster for the proposed transaction based on the at least one affinity, wherein the determining the ranking comprises accessing the database to obtain information in the first token data record of the token processing system;

select a plurality of selected entities based on the ranking for each of the potential entities;

send, in response to the query, the plurality of selected entities to the first user for display on the user device of the first user;

cause display on the user device of the ranking for each of the plurality of selected entities;

after the proposed transaction becomes a completed transaction via the transaction handler, receive, based on input into a user interface of the user device, feedback information regarding the completed transaction; and update the at least one affinity based on the feedback information for use when causing displays on user devices in response to other queries regarding proposed transactions.

10. The method of claim 1, wherein the social data comprises a social graph.

* * * * *